US010042129B2

(12) United States Patent
Taira et al.

(10) Patent No.: US 10,042,129 B2
(45) Date of Patent: Aug. 7, 2018

(54) DUPLEX OPTICAL CONNECTOR PLUG AND POLARITY REVERSAL METHOD OF DUPLEX OPTICAL CONNECTOR PLUG

(71) Applicant: SEIKOH GIKEN Co., Ltd., Matsudo-shi, Chiba (JP)

(72) Inventors: Junji Taira, Matsudo (JP); Masayuki Jibiki, Matsudo (JP); Yohei Takaishi, Matsudo (JP); Norimasa Arai, Matsudo (JP)

(73) Assignee: SEIKOH GIKEN Co., Ltd., Matsudo-shi, Chiba (JP)

( * ) Notice: Subject to any disclaimer, the term of this patent is extended or adjusted under 35 U.S.C. 154(b) by 0 days.

(21) Appl. No.: 15/828,441

(22) Filed: Dec. 1, 2017

(65) Prior Publication Data

US 2018/0088288 A1 Mar. 29, 2018

Related U.S. Application Data

(63) Continuation of application No. PCT/JP2017/023507, filed on Jun. 27, 2017.

(30) Foreign Application Priority Data

Jun. 29, 2016 (JP) ................. 2016-129334
Feb. 1, 2017 (JP) ................. 2017-016754

(51) Int. Cl.
*G02B 6/38* (2006.01)

(52) U.S. Cl.
CPC ......... *G02B 6/3879* (2013.01); *G02B 6/3825* (2013.01); *G02B 6/3831* (2013.01);
(Continued)

(58) Field of Classification Search
CPC ... G02B 6/3825; G02B 6/3831; G02B 6/3879
See application file for complete search history.

(56) References Cited

U.S. PATENT DOCUMENTS 6,151,432 A * 11/2000 Nakajima ............ G02B 6/3831
385/55
7,150,567 B1 12/2006 Luther et al.
(Continued)

FOREIGN PATENT DOCUMENTS

JP 2014-516172 A 7/2014

OTHER PUBLICATIONS

International Search Report for PCT/JP2017/023507 dated Sep. 19, 2017.
(Continued)

*Primary Examiner* — Daniel Petkovsek
(74) *Attorney, Agent, or Firm* — Yokoi & Co., U.S.A.; Toshiyuki Yokoi

(57) ABSTRACT

In a duplex optical connector plug 10A, when one of first and second optical connector assemblies 11a, 11b is rotated around its axis in a clockwise direction or a counterclockwise direction, a rotational force of one of first and second gears is transmitted to the other of the gears by an intermediate gear. Thereby, interlockingly with the one of the optical connector assemblies 11a, 11b, the other of the optical connector assemblies 11a, 11b is rotated around its axis in the clockwise direction or the counterclockwise direction which is the same direction as the optical connector assemblies 11a, 11b.

20 Claims, 41 Drawing Sheets

(52) U.S. Cl.
CPC ......... *G02B 6/3885* (2013.01); *G02B 6/3887*
(2013.01); *G02B 6/3893* (2013.01); *G02B 6/3897* (2013.01); *G02B 6/3898* (2013.01)

(56) References Cited

U.S. PATENT DOCUMENTS

| | | | |
|---|---|---|---|
| 7,563,033 B2 * | 7/2009 | Adomeit | G02B 6/3897 385/53 |
| 8,152,385 B2 | 4/2012 | de Jong et al. | |
| 9,625,658 B1 * | 4/2017 | Lin | G02B 6/387 |
| 9,678,283 B1 * | 6/2017 | Chang | G02B 6/3831 |
| 9,829,650 B2 * | 11/2017 | Irwin | G02B 6/3879 |
| 2006/0269194 A1 | 11/2006 | Luther et al. | |
| 2010/0220961 A1 | 9/2010 | de Jong et al. | |
| 2012/0308183 A1 | 12/2012 | Irwin et al. | |
| 2014/0169727 A1 | 6/2014 | Veatch et al. | |
| 2016/0216458 A1 * | 7/2016 | Shih | G02B 6/3871 |
| 2017/0293089 A1 * | 10/2017 | Gustafson | G02B 6/3821 |
| 2017/0293090 A1 * | 10/2017 | Hopper | G02B 6/3821 |

OTHER PUBLICATIONS

PCT written opinion dated Sep. 19, 2017.
Japanese notice of the reason for refusal dated May 2, 2017.

\* cited by examiner

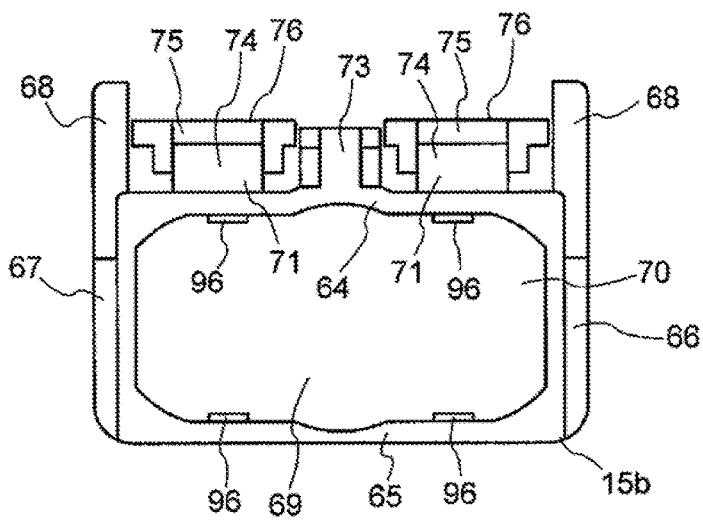
Fig. 45
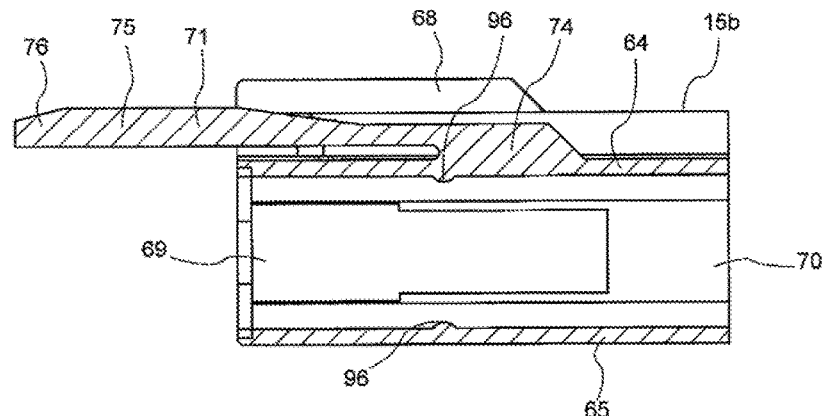
Fig. 46
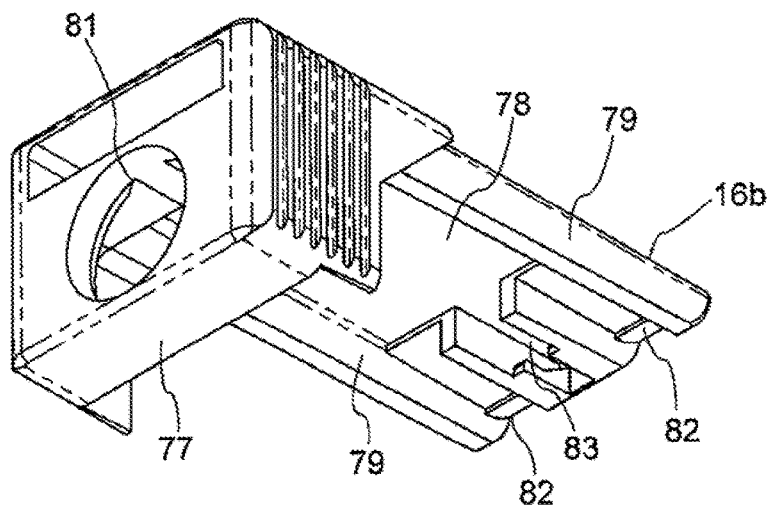

DUPLEX OPTICAL CONNECTOR PLUG AND POLARITY REVERSAL METHOD OF DUPLEX OPTICAL CONNECTOR PLUG

CROSS-REFERENCES TO RELATED APPLICATIONS

This Application claims the benefit of priority and is a Continuation application of the prior International Patent Application No. PCT/JP2017/023507, with an international filing date of Jun. 27, 2017, which designated the United States, and is related to the Japanese Patent Application No. 2016-129334 filed Jun. 29, 2016 and Japanese Patent Application No. 2017-016754 filed Feb. 1, 2017, the entire disclosures of all applications are expressly incorporated by reference in their entirety herein.

TECHNICAL FIELD

The preset invention relates to a duplex optical connector plug and also relates to a polarity reversal method for reversing a polarity of the duplex optical connector plug. Furthermore, the present invention relates to a ferrule polishing method for polishing first and second ferrules of the duplex optical connector plug by angled polishing.

BACKGROUND ART

It is disclosed that a duplex optical fiber connector having two optical connector assemblies arranged in the lateral direction and capable of independently rotating the optical connector assemblies in the opposite direction from each other (U.S. Pat. No. 8,152,385 B2). In the duplex optical fiber connector described above, the polarity of the optical connector assemblies can be reversed by separately rotating the optical connector assemblies by 180° in the opposite direction.

It is disclosed that an optical fiber connector having two outer housings arranged in the lateral direction and ferrule holders housed in the outer housings, wherein keys are formed on the outer housings and key slots are formed on the ferrule holders (U.S. Pat. No. 7,150,567 B1). In the optical fiber connector described above, the ferrule holders can be rotated by 90° with respect to the outer housings. By rotating the ferrule holders by 90°, the ferrules can be simultaneously polished by angled polishing.

PRIOR ART DOCUMENTS

Patent Documents

Patent Document 1: U.S. Pat. No. 8,152,385 B2
Patent Document 2: U.S. Pat. No. 7,150,567 B1

DISCLOSURE OF THE INVENTION

Problems to be Solved by the Invention

In the duplex optical fiber connector described in U.S. Pat. No. 8,152,385 B2, when shifting the polarity of the optical connector assemblies, it is necessary to rotate one of the optical connector assemblies in a clockwise direction and then rotate the other of the optical connector assemblies in a counterclockwise direction. Since the optical connector assemblies cannot be simultaneously rotated in the same direction, much labor and time is required to reverse the polarity.

In the optical fiber connector described in U.S. Pat. No. 7,150,567 B1, it is necessary to push the ferrule holders in the axial direction of the outer housings against a biasing force of a spring to release the engagement between the keys and the slots and it is necessary to rotate the ferrule holders by 90° in that state. Since the rotating operation of the ferrule holders is complicated, operability is further deteriorated in small optical fiber connectors.

A purpose of the present invention is to provide a duplex optical connector plug capable of rotating one of the first and second optical connector assemblies and simultaneously rotating the other of the optical connector assemblies in the same direction as the one of the optical connector assemblies. Another purpose of the present invention is to provide a polarity reversal method of the duplex optical connector plug capable of reversing the polarity by simultaneously rotating the first and second optical connector assemblies in the same direction without requiring labor and time. Another purpose of the present invention is to provide a ferrule polishing method capable of simultaneously rotating the first and second optical connector assemblies in the same direction by a quarter-rotation from a starting point of the rotation and capable of simultaneously polishing the first and second ferrules polished by angled polishing.

Means for Solving the Problem

The first precondition of the present invention to solve the above described problem is a duplex optical connector plug, comprising: a first optical connector assembly; and a second optical connector assembly which is in parallel with the first optical connector assembly, wherein the first optical connector assembly has: a first plug frame for housing a first ferrule which holds a first optical fiber and extends in an axial direction; a first stop ring which is engageably inserted into the first plug frame; and a first spring which is arranged between the first ferrule and the first stop ring for biasing the first ferrule forward in the axial direction, the second optical connector assembly has: a second plug frame for housing a second ferrule which holds a second optical fiber and extends in the axial direction; a second stop ring which is engageably inserted into the second plug frame; and a second spring which is arranged between the second ferrule and the second stop ring for biasing the second ferrule forward in the axial direction.

In the first precondition of the present invention, the first feature of the duplex optical connector plug is that when one of the first and second optical connector assemblies is rotated around its axis, the other of the optical connector assemblies is interlockingly rotated around its axis in the same direction as the one of the optical connector assemblies.

As an example of the duplex optical connector plug of the present invention, a first gear extending in the axial direction is formed on the rear end portion of the first stop ring, a second gear extending in the axial direction is formed on the rear end portion of the second stop ring, the duplex optical connector plug includes an intermediate gear which is interposed between the first gear and the second gear, extended in the axial direction, and circumscribed to the first and second gears, and the intermediate gear transmits a rotational force of one of the first and second gears to the other of the gears and rotates the other of the gears in the same direction as the one of the gears.

As another example of the duplex optical connector plug of the present invention, the duplex optical connector plug has gears which transmit a rotational force of one of the first and second optical connector assemblies to the other of the optical connector assemblies, and in the duplex optical connector plug, when one of the first and second optical connector assemblies is rotated around its axis, the other of the optical connector assemblies is rotated around its axis by the gears interlockingly with a rotation of the one of the optical connector assemblies.

As another example of the duplex optical connector plug of the present invention, the gears comprise: a first gear which is formed on the rear end portion of the first stop ring and extended in the axial direction; a second gear which is formed on the rear end portion of the second stop ring and extended in the axial direction; and an intermediate gear which is interposed between the first gear and the second gear, extended in the axial direction, and circumscribed to the first and second gears, and the intermediate gear transmits a rotational force of one of the first and second gears to the other of the gears and rotates the other of the gears in the same direction as the one of the gears.

As another example of the duplex optical connector plug of the present invention, a gear ratio of the first gear, the second gear and the intermediate gear is 1:1:1.

As another example of the duplex optical connector plug of the present invention, the duplex optical connector plug includes a first casing for housing: the rear end portion of the first stop ring on which the first gear is formed; the rear end portion of the second stop ring on which the second gear is formed; and the intermediate gear; and the first casing has a first gear housing portion for rotatably housing the rear end portion of the first stop ring, a second gear housing portion for rotatably housing the rear end portion of the second stop ring and an intermediate gear housing portion arranged between the first and second gear housing portions for rotatably housing the intermediate gear.

As another example of the duplex optical connector plug of the present invention, the duplex optical connector plug includes a rotating angle regulating unit which regulates a rotating angle of at least one of the first and second optical connector assemblies, the first casing has a first opening opened at the front end of the first casing for inserting the first stop ring and a second opening opened at the front end of the first casing for inserting the second stop ring, the rotating angle regulating unit comprises: a rotation regulating projection formed on at least one of the first and second openings, the rotation regulating projection projecting inward in the radial direction of the first and second openings; and an abutting projection formed on a peripheral surface of at least one of the first and second stop rings, the abutting projection projecting outward in the radial direction of the peripheral surface, in the duplex optical connector plug, the rotation of the first and second optical connector assemblies is prevented when the abutting projection abuts on the rotation regulating projection, and a rotation range from a starting point to a finishing point of the rotation of the first and second optical connector assemblies is a half-rotation when the rotation is regulated by the rotating angle regulating unit.

As another example of the duplex optical connector plug of the present invention, the duplex optical connector plug includes a rotating angle regulating unit which regulates a rotating angle of at least one of the first and second optical connector assemblies, the rotating angle regulating unit comprises: an abutting projection formed on at least one of the first and second gears, the abutting projection projecting outward in the radial direction of the first and second gears; and a rotation regulating projection formed on at least one of the first gear housing portion and the second gear housing portion of the first casing, the rotation regulating projection projecting inward in the radial direction of the first gear housing portion and the second gear housing portion, in the duplex optical connector plug, the rotation of the first and second optical connector assemblies is prevented when the abutting projection abuts on the rotation regulating projection, and a rotation range from a starting point to a finishing point of the rotation of the first and second optical connector assemblies is a half-rotation when the rotation is regulated by the rotating angle regulating unit.

As another example of the duplex optical connector plug of the present invention, the duplex optical connector plug includes a second casing for housing the first casing in the axial direction, the second casing has a front end opening opened at the front end of the second casing and an engagement latch extending in the axial direction from a top wall of the second casing so as to be exposed forward in the axial direction from the front end opening, and when the first and second optical connector assemblies are inserted into an optical connector adapter, the engagement latch is detachably engaged with the optical connector adapter to maintain the state that the first and second optical connector assemblies are inserted into the optical connector adapter.

As another example of the duplex optical connector plug of the present invention, the second casing can house the first casing in a state that the top wall of the second casing faces to the top wall of the first casing and the bottom wall of the second casing faces to the bottom wall of the first casing or in a state that the top wall of the second casing faces to the bottom wall of the first casing and the bottom wall of the second casing faces to the top wall of the first casing.

As another example of the duplex optical connector plug of the present invention, the duplex optical connector plug includes a slider located rearward in the axial direction of the second casing, the slider being connected to the second casing slidably in the axial direction, in the duplex optical connector plug, an engagement state of the engagement latch and the optical connector adapter is maintained when the slider is not slid rearward in the axial direction with respect to the second casing, and when the slider is slid rearward in the axial direction with respect to the second casing, the engagement latch is pushed down by the slider to release the engagement state of the engagement latch and the optical connector adapter.

As another example of the duplex optical connector plug of the present invention, the slider has a sliding top wall which is slidable on an upper surface of the engagement latch in the axial direction, the sliding top wall having an inclined plane gradually inclined downward from the front end of the slider to rearward in the axial direction, and in the duplex optical connector plug, when the slider is slid rearward in the axial direction with respect to the second casing, the engagement latch is pushed down by the inclined plane of the sliding top wall.

The second precondition of the present invention to solve the above described problem is a polarity reversal method for reversing a polarity of a duplex optical connector plug, the duplex optical connector plug, comprising: a first optical connector assembly; and a second optical connector assembly which is in parallel with the first optical connector assembly, wherein the first optical connector assembly has: a first plug frame for housing a first ferrule which holds a first optical fiber and extends in an axial direction; a first stop ring which is engageably inserted into the first plug frame; and a first spring which is arranged between the first ferrule and the first stop ring for biasing the first ferrule forward in the axial direction, the second optical connector assembly has: a second plug frame for housing a second ferrule which holds a second optical fiber and extends in the axial direction; a second stop ring which is engageably inserted into the second plug frame; and a second spring which is arranged between the second ferrule and the second stop ring for biasing the second ferrule forward in the axial direction.

In the second precondition of the present invention, the first feature of the polarity reversal method is that when one of the first and second optical connector assemblies is rotated around its axis from a starting point to a finishing point of a rotation by a half-rotation, the other of the optical connector assemblies is interlockingly rotated around its axis from the starting point to the finishing point of the rotation by a half-rotation in the same direction as the one of the optical connector assemblies and the polarity of the duplex optical connector plug is reversed by that.

As another example of the polarity reversal method of the present invention, in the duplex optical connector plug, a first gear extending in the axial direction is formed on the rear end portion of the first stop ring, a second gear extending in the axial direction is formed on the rear end portion of the second stop ring, and an intermediate gear which is interposed between the first gear and the second gear and extended in the axial direction is circumscribed to the first and second gears, in the polarity reversal method, the first and second optical connector assemblies are rotated from the starting point to the finishing point of the rotation by a half-rotation and the polarity of the duplex optical connector plug is reversed by transmitting a rotational force of the one of the first and second gears to the other of the gears using the intermediate gear to rotate both the first and second gears in the same direction by a half-rotation.

In the second precondition of the present invention, the second feature of the polarity reversal method is that the duplex optical connector plug has gears which transmit a rotational force of the one of the first and second optical connector assemblies to the other of the assemblies, and the polarity reversal method comprising the step of rotating one of the first and second optical connector assemblies around its axis from a starting point to a finishing point of a rotation by a half-rotation, wherein the other of the optical connector assemblies is rotated around its axis by the gears interlockingly with the rotation of the one of the optical connector assemblies from the starting point to the finishing point of the rotation by a half-rotation in the same direction as the one of the optical connector assemblies, and the polarity of the duplex optical connector plug is reversed by the rotation of the first and second optical connector assemblies.

As another example of the polarity reversal method of the present invention, the gears comprise: a first gear which is formed on the rear end portion of the first stop ring and extended in the axial direction; a second gear which is formed on the rear end portion of the second stop ring and extended in the axial direction; and an intermediate gear which is interposed between the first gear and the second gear, extended in the axial direction, and circumscribed to the first and second gears, the intermediate gear transmits a rotational force of one of the first and second gears to the other of the gears and rotates the other of the gears in the same direction as the one of the gears, and in the polarity reversal method, the first and second optical connector assemblies are rotated from the starting point to the finishing point of the rotation by a half-rotation and the polarity of the duplex optical connector plug is reversed by transmitting a rotational force of the one of the first and second gears to the other of the first and second gears using the intermediate gear to rotate both the first and second gears in the same direction by a half-rotation.

As another example of the polarity reversal method of the present invention, the duplex optical connector plug includes a first casing having a first gear housing portion for rotatably housing the rear end portion of the first stop ring on which the first gear is formed, a second gear housing portion for rotatably housing the rear end portion of the second stop ring on which the second gear is formed, and an intermediate gear housing portion located between the first and second gear housing portions for rotatably housing the intermediate gear, and in the polarity reversal method, the first and second optical connector assemblies are rotated from the starting point to the finishing point of the rotation by a half-rotation and the polarity of the duplex optical connector plug is reversed by transmitting the rotational force of the one of the first and second gears housed in the first and second gear housing portions to the other of the gears using the intermediate gear housed in the intermediate gear housing portion to rotate both the first and second gears in the same direction by a half-rotation.

As another example of the polarity reversal method of the present invention, the duplex optical connector plug includes a rotating angle regulating unit which regulates a rotating angle of at least one of the first and second optical connector assemblies, the first casing has a first opening opened at the front end of the first casing for inserting the first stop ring and a second opening opened at the front end of the first casing for inserting the second stop ring, the rotating angle regulating unit comprises: a rotation regulating projection formed on at least one of the first and second openings, the rotation regulating projection projecting inward in the radial direction of the first and second openings; and an abutting projection formed on a peripheral surface of at least one of the first and second stop rings, the abutting projection projecting outward in the radial direction of the peripheral surface, in the polarity reversal method, the rotation of the first and second optical connector assemblies is prevented and the rotation range of the first and second optical connector assemblies is limited to the half-rotation when the abutting projection abuts on the rotation regulating projection.

As another example of the polarity reversal method of the present invention, the duplex optical connector plug includes a rotating angle regulating unit which regulates a rotating angle of at least one of the first and second optical connector assemblies, the rotating angle regulating unit comprises: an abutting projection formed on a peripheral surface of at least one of the first gear and the second gear, the abutting projection projecting outward in the radial direction of the first and second gears; and a rotation regulating projection formed on at least one of the first gear housing portion and the second gear housing portion of the first casing, the rotation regulating projection projecting inward in the radial direction of the first gear housing portion and the second gear housing portion, in the polarity reversal method, the rotation of the first and second optical connector assemblies is prevented and the rotation range of the first and second optical connector assemblies is limited to the half-rotation when the abutting projection abuts on the rotation regulating projection.

As another example of the polarity reversal method of the present invention, the duplex optical connector plug includes a second casing for housing the first casing in the axial direction, the second casing has a front end opening opened at the front end of the second casing and an engagement latch extending in the axial direction from a top wall of the second casing so as to be exposed forward in the axial direction from the front end opening, and when the first and second optical connector assemblies are inserted into an optical connector adapter, the engagement latch is detachably engaged with the optical connector adapter to maintain the state that the first and second optical connector assemblies are inserted into the optical connector adapter.

As another example of the polarity reversal method of the present invention, the second casing can house the first casing in a state that the top wall of the second casing faces to the top wall of the first casing and the bottom wall of the second casing faces to the bottom wall of the first casing or in a state that the top wall of the second casing faces to the bottom wall of the first casing and the bottom wall of the second casing faces to the top wall of the first casing, thus the polarity of the duplex optical connector plug can be reversed.

As another example of the polarity reversal method of the present invention, the first casing is drawn out forward in the axial direction from the second casing and the one of the first and second optical connector assemblies is rotated around its axis from the starting point to the finishing point of the rotation by a half-rotation, the other of the optical connector assemblies is interlockingly rotated around its axis from the starting point to the finishing point of the rotation by a half-rotation, and the first casing is housed in the second casing so that the top wall of the second casing faces to the bottom wall of the first casing and the bottom wall of the second casing faces to the top wall of the first casing, thus the polarity of the duplex optical connector plug can be reversed.

The third precondition of the present invention to solve the above described problem is a ferrule polishing method for polishing first and second ferrules of a duplex optical connector plug by angled polishing, the duplex optical connector plug comprising: a first optical connector assembly; and a second optical connector assembly which is in parallel with the first optical connector assembly, wherein the first optical connector assembly has: a first plug frame for housing a first ferrule which holds a first optical fiber and extends in an axial direction; a first stop ring which is engageably inserted into the first plug frame; and a first spring which is arranged between the first ferrule and the first stop ring for biasing the first ferrule forward in the axial direction, the second optical connector assembly has: a second plug frame for housing a second ferrule which holds a second optical fiber and extends in the axial direction; a second stop ring which is engageably inserted into the second plug frame; a second spring which is arranged between the second ferrule and the second stop ring for biasing the second ferrule forward in the axial direction.

In the third precondition of the present invention, the feature of the ferrule polishing method is that when one of the first and second optical connector assemblies is rotated around its axis by a quarter-rotation from a starting point, the other of the optical connector assemblies is interlockingly rotated around its axis by a quarter-rotation from the starting point in the same direction as the one of the optical connector assemblies and the first and second ferrules are simultaneously polished by angled polishing using an optical fiber ferrule polishing device in a state that the first and second optical connector assemblies are rotated by a quarter-rotation from a use state of the duplex optical connector plug.

As an example of the ferrule polishing method of the present invention, in the duplex optical connector plug, a first gear extending in the axial direction is formed on the rear end portion of the first stop ring, a second gear extending in the axial direction is formed on the rear end portion of the second stop ring, and an intermediate gear which is interposed between the first gear and the second gear and extended in the axial direction is circumscribed to the first and second gears, and in the ferrule polishing method, a rotational force of the one of the first and second gears is transmitted to the other of the gears using the intermediate gear to rotate both the first and second gears in the same direction by a quarter-rotation to simultaneously polish the first and second optical connector assemblies by angled polishing.

As another example of the ferrule polishing method of the present invention, the duplex optical connector plug includes a first casing having a first gear housing portion for rotatably housing the rear end portion of the first stop ring on which the first gear is formed, a second gear housing portion for rotatably housing the rear end portion of the second stop ring on which the second gear is formed, and an intermediate gear housing portion located between the first and second gear housing portions for rotatably housing the intermediate gear, and in the ferrule polishing method, the rotational force of the one of the first and second gears housed in the first and second gear housing portions is transmitted to the other of the first and second gears using the intermediate gear housed in the intermediate gear housing portion to rotate both the first and second gears in the same direction by a quarter-rotation to simultaneously polish the first and second optical connector assemblies by angled polishing.

Effects of the Invention

By using the duplex optical connector plug of the present invention, when one of the first and second optical connector assemblies is rotated around its axis, the other of the optical connector assemblies is rotated around its axis. Thus, the other of the optical connector assemblies can be rotated only by rotating the one of the optical connector assemblies. In the duplex optical connector plug, when one of the optical connector assemblies is rotated, the other of the optical connector assemblies is rotated. Thus, the first and second optical connector assemblies can be rotated by one rotating operation (one action). Therefore, labor and time can be saved compared to the case of separately rotating the optical connector assemblies.

In the duplex optical connector plug, when one of the first and second optical connector assemblies is rotated around its axis in the clockwise direction or the counterclockwise direction, the other of the optical connector assemblies is interlockingly rotated around its axis in the same direction (clockwise direction or counterclockwise direction) as the one of the optical connector assemblies. Thus, only by rotating one of the optical connector assemblies, the other of the optical connector assemblies can be simultaneously rotated in the same direction as the one of the optical connector assemblies. In the duplex optical connector plug, the first and second optical connector assemblies are simultaneously rotated in the same direction. Thus, the first and second optical connector assemblies can be simultaneously rotated by one rotating operation (one action). Therefore, labor and time can be saved compared to the case of separately rotating the optical connector assemblies.

In the duplex optical connector plug, a first gear extending in the axial direction is formed on the rear end portion of the first stop ring, a second gear extending in the axial direction is formed on the rear end portion of the second stop ring, the duplex optical connector plug includes an intermediate gear which is interposed between the first gear and the second gear, extended in the axial direction, and circumscribed to the first and second gears, and the intermediate gear transmits a rotational force of one of the first and second gears to the other of the gears and rotates the other of the gears in the same direction as the one of the gears. When one of the first and second optical connector assemblies is rotated in a clockwise direction or a counterclockwise direction, the rotational force is transmitted from one of the first and second gears to the other of the gears via the intermediate gear. Thus, by using the gears, the other of the optical connector assemblies can be simultaneously rotated in the same direction as the one of the optical connector assemblies.

In the duplex optical connector plug, a gear ratio of the first gear, the second gear and the intermediate gear is 1:1:1. Since the gear ratio of the gears are configured to 1:1:1, when one of the first and second optical connector assemblies is rotated in a clockwise direction or a counterclockwise direction, the other of the optical connector assemblies is rotated at the same rotating angle as the one of the optical connector assemblies. Thus, the rotation range from the starting point to the finishing point of the rotation can be configured to be the same between the first and second optical connector assemblies. Therefore, when one of the optical connector assemblies is rotated, the other of the optical connector assemblies can be rotated to the same position as the one of the optical connector assemblies.

In the duplex optical connector plug, the duplex optical connector plug includes a first casing for housing the rear end portion of the first stop ring on which the first gear is formed, the rear end portion of the second stop ring on which the second gear is formed and the intermediate gear, and the first casing has a first gear housing portion for rotatably housing the rear end portion of the first stop ring, a second gear housing portion for rotatably housing the rear end portion of the second stop ring and an intermediate gear housing portion arranged between the first and second gear housing portions for rotatably housing the intermediate gear. When one of the first and second optical connector assemblies is rotated in a clockwise direction or a counterclockwise direction, the rotational force is transmitted from one of the first and second gears rotatably housed in the first and second gear housing portions to the other of the gears via the intermediate gear rotatably housed in the intermediate gear housing portion. Thus, by using the gears housed in the housing portions, the other of the optical connector assemblies can be simultaneously rotated in the same direction as the one of the optical connector assemblies.

In the duplex optical connector plug, the duplex optical connector plug includes a rotating angle regulating unit which regulates a rotating angle of at least one of the first and second optical connector assemblies, and a rotation range from a starting point to a finishing point of the rotation of the first and second optical connector assemblies is a half-rotation when the rotation is regulated by the rotating angle regulating unit. The rotation range from the starting point to the finishing point of the rotation of the first and second optical connector assemblies is limited to a half-rotation by the rotating angle regulating unit. When reversing the polarity of the duplex optical connector plug, for example, the polarity can be certainly and accurately reversed by stopping the rotation of the optical connector assemblies at the position where the optical connector assemblies are rotated by a half-rotation in the clockwise direction or the counterclockwise direction. On the contrary, the polarity of the duplex optical connector plug can be certainly and accurately returned to the original state by rotating the clockwisely rotated optical connector assemblies in the counterclockwise direction by a half-rotation. In addition, since the optical connector assemblies are prevented from being rotated endlessly, disconnection of the optical fiber caused by twisting can be prevented.

In the duplex optical connector plug, the first casing has a first opening opened at the front end of the first casing for inserting the first stop ring and a second opening opened at the front end of the first casing for inserting the second stop ring, and the rotating angle regulating unit comprises: a rotation regulating projection formed on at least one of the first and second openings, the rotation regulating projection projecting inward in the radial direction of the openings; and an abutting projection formed on a peripheral surface of at least one of the first and second stop rings, the abutting projection projecting outward in the radial direction of the peripheral surface, and the rotation of the first and second optical connector assemblies is prevented when the abutting projection abuts on the rotation regulating projection. Thus, the rotating angle of the optical connector assemblies can be regulated by using the rotation regulating projection projecting inward in the radial direction of the openings and the abutting projection projecting outward in the radial direction of the peripheral surface. For example, when the rotation range from the starting point to the finishing point of the rotation of the optical connector assemblies is specified to be a half-rotation, the rotation range of the optical connector assemblies from the starting point to the finishing point of the rotation can be accurately specified to be a half-rotation.

In the duplex optical connector plug, the rotating angle regulating unit comprises: an abutting projection formed on at least one of the first and second gears, the abutting projection projecting outward in the radial direction of the gears; and a rotation regulating projection formed on at least one of the first gear housing portion and the second gear housing portion of the first casing, the rotation regulating projection projecting inward in the radial direction of the first gear housing portion and the second gear housing portion, and the rotation of the first and second optical connector assemblies is prevented when the abutting projection abuts on the rotation regulating projection. Thus, the rotating angle of the optical connector assemblies can be regulated by using the abutting projection projecting outward in the radial direction of the gears and the rotation regulating projection projecting inward in the radial direction of the gear housing portions. For example, when the rotation range from the starting point to the finishing point of the rotation of the optical connector assemblies is specified to be a half-rotation, the rotation range of the optical connector assemblies from the starting point to the finishing point of the rotation can be accurately specified to be a half-rotation.

In the duplex optical connector plug, the duplex optical connector plug includes a second casing for housing the first casing in the axial direction, the second casing has a front end opening opened at the front end of the second casing and an engagement latch extending in the axial direction from a top wall of the second casing so as to be exposed forward in the axial direction from the front end opening, and when the first and second optical connector assemblies are inserted into an optical connector adapter, the engagement latch is detachably engaged with the optical connector adapter to maintain the state that the first and second optical connector assemblies are inserted into the optical connector adapter.

Thus, the stop rings of the optical connector plug can be maintained to be inserted into the optical connector adapter by using the engagement latch extending in the axial direction from the top wall of the second casing. Therefore, the first and second optical fibers can be maintained to be optically connected with the optical connectors. If the engagement latch is provided on the first and second plug frames of the first and second optical connector assemblies, the optical connector assemblies cannot be rotated in the same direction by being obstructed by the engagement latch. However, since the engagement latch is provided on the top wall of the second casing, the optical connector assemblies can be rotated in the same direction without being obstructed by the engagement latch.

In the duplex optical connector plug, the second casing can house the first casing in a state that the top wall of the second casing faces to the top wall of the first casing and the bottom wall of the second casing faces to the bottom wall of the first casing or in a state that the top wall of the second casing faces to the bottom wall of the first casing and the bottom wall of the second casing faces to the top wall of the first casing. When reversing the polarity of the duplex optical connector plug, for example, the polarity of the optical connector plug can be reversed by rotating one of the first and second optical connector assemblies. Otherwise, the polarity of the optical connector plug can be reversed by housing the first casing in the second casing in a state that the first casing is vertically reversed.

In the duplex optical connector plug, the duplex optical connector plug includes a slider located rearward in the axial direction of the second casing, the slider being connected to the second casing slidably in the axial direction, an engagement state of the engagement latch and the optical connector adapter is maintained when the slider is not slid rearward in the axial direction with respect to the second casing, and when the slider is slid rearward in the axial direction with respect to the second casing, the engagement latch is pushed down by the slider to release the engagement state of the engagement latch and the optical connector adapter. Thus, the engagement state of the engagement latch and the optical connector adapter is released by sliding the slider rearward in the axial direction with respect to the second casing so that the slider pushes down the engagement latch. Therefore, the optical connector assemblies of the optical connector plug can be pulled out of the optical connector adapter only by the operation of sliding the slider rearward in the axial direction. Consequently, the insertion state of the first and second optical connector assemblies with respect to the optical connector adapter can be easily released.

In the duplex optical connector plug, the slider has a sliding top wall which is slidable on an upper surface of the engagement latch in the axial direction, the sliding top wall having an inclined plane gradually inclined downward from the front end of the slider to rearward in the axial direction, and when the slider is slid rearward in the axial direction with respect to the second casing. Thus, the engagement latch is pushed down by the inclined plane of the sliding top wall, the engagement state of the engagement latch and the optical connector adapter is released by sliding the slider rearward in the axial direction so that the inclined plane of the sliding top wall gradually pushes down the engagement latch. Therefore, the optical connector assemblies of the optical connector plug can be pulled out of the optical connector adapter only by the operation of sliding the slider rearward in the axial direction. Consequently, the insertion state of the first and second optical connector assemblies with respect to the optical connector adapter can be easily released.

By using the polarity reversal method of the duplex optical connector plug of the present invention, when one of the first and second optical connector assemblies is rotated around its axis from the starting point to the finishing point of the rotation by a half-rotation, the other of the optical connector assemblies is rotated around its axis from the starting point to the finishing point of the rotation by a half-rotation and the polarity of the duplex optical connector plug is reversed. Thus, the polarity of the duplex optical connector plug can be reversed by one rotating operation (one action). Therefore, labor and time can be saved compared to the case of separately rotating the optical connector assemblies to reverse the polarity of the optical connector plug.

In the polarity reversal method of the duplex optical connector plug, when one of the first and second optical connector assemblies is rotated around its axis from a starting point to a finishing point of a rotation by a half-rotation, the other of the optical connector assemblies is interlockingly rotated around its axis from the starting point to the finishing point of the rotation by a half-rotation in the same direction as the one of the optical connector assemblies. Thus, the polarity of the duplex optical connector plug can be reversed only by rotating one of the first and second optical connector assemblies by a half-rotation. In the polarity reversal method, since the first and second optical connector assemblies are simultaneously rotated in the same direction, the polarity of the duplex optical connector plug can be reversed by one rotating operation (one action). Therefore, labor and time can be saved compared to the case of separately rotating the optical connector assemblies to reverse the polarity of the optical connector plug.

In the polarity reversal method of the duplex optical connector plug, a first gear extending in the axial direction is formed on the rear end portion of the first stop ring, a second gear extending in the axial direction is formed on the rear end portion of the second stop ring, and an intermediate gear which is interposed between the first gear and the second gear and extended in the axial direction is circumscribed to the first and second gears, and a rotational force of one of the first and second gears can be transmitted to the other of the gears by using the intermediate gear to rotate the other of the gears by a quarter-rotation in the same direction as the one of the gears. Thus, the other of the optical connector assemblies can be simultaneously rotated in the same direction as the one of the optical connector assemblies by using the gears. Therefore, the polarity of the duplex optical connector plug can be reversed by one rotating operation.

In the polarity reversal method of the duplex optical connector plug, the duplex optical connector plug includes a first casing having a first gear housing portion for rotatably housing the rear end portion of the first stop ring on which the first gear is formed, a second gear housing portion for rotatably housing the rear end portion of the second stop ring on which the second gear is formed, and an intermediate gear housing portion located between the first and second gear housing portions for rotatably housing the intermediate gear, and the first and second optical connector assemblies are rotated from the starting point to the finishing point of the rotation by a half-rotation and the polarity of the duplex optical connector plug is reversed by transmitting the rotational force of one of the first and second gears housed in the first and second gear housing portions to the other of the gears using the intermediate gear housed in the intermediate gear housing portion to rotate both the first and second gears in the same direction by a half-rotation. When one of the first and second optical connector assemblies is rotated in a clockwise direction or a counterclockwise direction, the rotational force is transmitted from one of the first and second gears rotatably housed in the first and second gear housing portions to the other of the gears via the intermediate gear rotatably housed in the intermediate gear housing portion. Thus, the other of the connector assemblies can be simultaneously rotated in the same direction as the one of the connector assemblies by a half-rotation by using the gears rotatably housed in the housing portions. Therefore, the polarity of the duplex optical connector plug can be reversed by one rotating operation.

In the polarity reversal method of the duplex optical connector plug, the duplex optical connector plug includes a rotating angle regulating unit which regulates a rotating angle of at least one of the first and second optical connector assemblies, the rotation range from the starting point to the finishing point of the rotation of the first and second optical connector assemblies is limited to the half-rotation by using the rotating angle regulating unit. Thus, the rotation range from the starting point to the finishing point of the rotation of the first and second optical connector assemblies is limited to a half-rotation by the rotating angle regulating unit. Therefore, the polarity of the duplex optical connector plug can be surely and accurately reversed by stopping the rotation of the optical connector assemblies at the position where the optical connector assemblies are rotated by a half-rotation in the clockwise direction. On the contrary, the polarity of the duplex optical connector plug can be certainly and accurately returned to the original state by rotating the clockwisely rotated optical connector assemblies in the counterclockwise direction by a half-rotation.

In the polarity reversal method of the duplex optical connector plug, the first casing has a first opening opened at the front end of the first casing for inserting the first stop ring and a second opening opened at the front end of the first casing for inserting the second stop ring, the rotating angle regulating unit comprises: a rotation regulating projection formed on at least one of the first and second openings, the rotation regulating projection projecting inward in the radial direction of the openings; and an abutting projection formed on a peripheral surface of at least one of the first and second stop rings, the abutting projection projecting outward in the radial direction of the peripheral surface, and the rotation of the first and second optical connector assemblies is prevented and the rotation range of the first and second optical connector assemblies is limited to the half-rotation when the abutting projection abuts on the rotation regulating projection. Thus, the rotating angle of the optical connector assemblies can be accurately limited to be a half-rotation by using the rotation regulating projection projecting inward in the radial direction of the openings and the abutting projection projecting outward in the radial direction of the peripheral surface. Therefore, the polarity of the duplex optical connector plug can be surely and accurately reversed by stopping the rotation of the optical connector assemblies at the position where the optical connector assemblies are rotated by a half-rotation in the clockwise direction. In addition, the polarity of the duplex optical connector plug can be certainly and accurately returned to the original state by rotating the clockwisely rotated optical connector assemblies in the counterclockwise direction by a half-rotation.

In the polarity reversal method of the duplex optical connector plug, the rotating angle regulating unit comprises: an abutting projection formed on a peripheral surface of at least one of the first gear and the second gear, the abutting projection projecting outward in the radial direction of the gears; and a rotation regulating projection formed on at least one of the first gear housing portion and the second gear housing portion of the first casing, the rotation regulating projection projecting inward in the radial direction of the housing portion, and the rotation of the first and second optical connector assemblies is prevented and the rotation range of the first and second optical connector assemblies is limited to the half-rotation when the abutting projection abuts on the rotation regulating projection. Thus, the rotating angle of the optical connector assemblies can be accurately limited to be a half-rotation by using the abutting projection projecting outward in the radial direction of the gears and the rotation regulating projection projecting inward in the radial direction of the gear housing portions. Therefore, the polarity of the duplex optical connector plug can be surely and accurately reversed by stopping the rotation of the optical connector assemblies at the position where the optical connector assemblies are rotated by a half-rotation in the clockwise direction. In addition, the polarity of the duplex optical connector plug can be certainly and accurately returned to the original state by rotating the clockwisely rotated optical connector assemblies in the counterclockwise direction by a half-rotation.

In the polarity reversal method of the duplex optical connector plug, the duplex optical connector plug includes a second casing for housing the first casing in the axial direction, the second casing has a front end opening opened at the front end of the second casing and an engagement latch extending in the axial direction from a top wall of the second casing so as to be exposed forward in the axial direction from the front end opening, and when the first and second optical connector assemblies are inserted into an optical connector adapter, the engagement latch is detachably engaged with the optical connector adapter to maintain the state that the first and second optical connector assemblies are inserted into the optical connector adapter. Thus, the stop rings of the optical connector plug can be maintained to be inserted into the optical connector adapter by using the engagement latch extending in the axial direction from the top wall of the second casing. Therefore, the first and second optical fibers can be maintained to be optically connected with the optical connectors before and after the polarity is reversed. If the engagement latch is provided on the first and second plug frames of the first and second optical connector assemblies, the optical connector assemblies cannot be rotated in the same direction by being obstructed by the engagement latch. However, since the engagement latch is provided on the top wall of the second casing, the optical connector assemblies can be rotated in the same direction without being obstructed by the engagement latch. Therefore, the polarity of the duplex optical connector plug can be surely reversed.

In the polarity reversal method of the duplex optical connector plug, the second casing can house the first casing in a state that the top wall of the second casing faces to the top wall of the first casing and the bottom wall of the second casing faces to the bottom wall of the first casing or in a state that the top wall of the second casing faces to the bottom wall of the first casing and the bottom wall of the second casing faces to the top wall of the first casing, thus the polarity of the duplex optical connector plug can be reversed. Therefore, the polarity of the optical connector assembly can be reversed by rotating one of the first and second optical connector assemblies. Otherwise, the polarity of the optical connector plug can be reversed by housing the first casing in the second casing in a state that the first casing is vertically reversed.

In the polarity reversal method of the duplex optical connector plug, the first casing is drawn out forward in the axial direction from the second casing and the one of the first and second optical connector assemblies is rotated around its axis from the starting point to the finishing point of the rotation by a half-rotation, the other of the optical connector assemblies is interlockingly rotated around its axis from the starting point to the finishing point of the rotation by a half-rotation, and the first casing is housed in the second casing so that the top wall of the second casing faces to the bottom wall of the first casing and the bottom wall of the second casing faces to the top wall of the first casing, thus the polarity of the duplex optical connector plug can be reversed. Therefore, the polarity of the optical connector assembly can be reversed by rotating one of the first and second optical connector assemblies. Otherwise, the polarity of the optical connector plug can be reversed by housing the first casing in the second casing in a state that the first casing is vertically reversed.

By using the ferrule polishing method of the first and second ferrules of the present invention, the first and second ferrules are simultaneously polished by angled polishing using an optical fiber ferrule polishing device in a state that the first and second optical connector assemblies are rotated by a quarter-rotation from a use state of the duplex optical connector plug. Thus, labor and time of separately polishing the first and second ferrules by angled polishing can be saved. Therefore, the ferrules can be rapidly and efficiently polished by angled polishing.

In the ferrule polishing method, when one of the first and second optical connector assemblies is rotated around its axis by a quarter-rotation from a starting point of a rotation, the other of the optical connector assemblies is interlockingly rotated around its axis by a quarter-rotation from the starting point of the rotation. Thus, the first and second optical connector assemblies can be simultaneously rotated by a quarter-rotation by one rotating operation (one action). Therefore, the first and second ferrules can be simultaneously polished by angled polishing by using the optical fiber ferrule polishing device. In the ferrule polishing method, labor and time of separately rotating the first and second optical connector assemblies to separately polish the first and second ferrules by angled polishing can be saved. Therefore, the ferrules can be rapidly and efficiently polished by angled polishing.

In the ferrule polishing method, a first gear extending in the axial direction is formed on the rear end portion of the first stop ring, a second gear extending in the axial direction is formed on the rear end portion of the second stop ring, and an intermediate gear which is interposed between the first gear and the second gear and extended in the axial direction is circumscribed to the first and second gears, and a rotational force of one of the first and second gears is transmitted to the other of the gears using the intermediate gear to rotate both the first and second gears in the same direction by a quarter-rotation to simultaneously polish the first and second optical connector assemblies by angled polishing. When one of the first and second optical connector assemblies is rotated in a clockwise direction or a counterclockwise direction, the rotational force is transmitted from one of the first and second gears to the other of the gears via the intermediate gear. Thus, the other of the connector assemblies can be simultaneously rotated in the same direction as the one of the connector assemblies by a half-rotation by using the gears. Therefore, the first and second ferrules can be simultaneously polished by angled polishing using the optical fiber ferrule polishing device.

In the ferrule polishing method, the duplex optical connector plug includes a first casing having a first gear housing portion for rotatably housing the rear end portion of the first stop ring on which the first gear is formed, a second gear housing portion for rotatably housing the rear end portion of the second stop ring on which the second gear is formed, and an intermediate gear housing portion located between the first and second gear housing portions for rotatably housing the intermediate gear, and a rotational force of one of the first and second gears housed in the first and second gear housing portions is transmitted to the other of the gears using the intermediate gear housed in the intermediate gear housing portion to rotate both the first and second gears in the same direction by a quarter-rotation to simultaneously polish the first and second optical connector assemblies by angled polishing. Thus, the rotational force is transmitted from one of the first and second gears rotatably housed in the first and second gear housing portions to the other of the gears via the intermediate gear rotatably housed in the intermediate gear housing portion. Therefore, by using the gears housed in the housing portions, the other of the optical connector assemblies can be simultaneously rotated in the same direction as the one of the optical connector assemblies by a quarter-rotation. Consequently, the first and second ferrules can be simultaneously polished by angled polishing using the optical fiber ferrule polishing device.

BRIEF DESCRIPTION OF THE DRAWINGS

FIG. 44 is a front view of the second casing of FIG. 43.

FIG. 45 is a cross-sectional view cut along an arrow XII-XII in FIG. 43.

FIG. 46 is a perspective view of the slider shown as another example.

MODES FOR CARRYING OUT THE INVENTION

Figure 1:
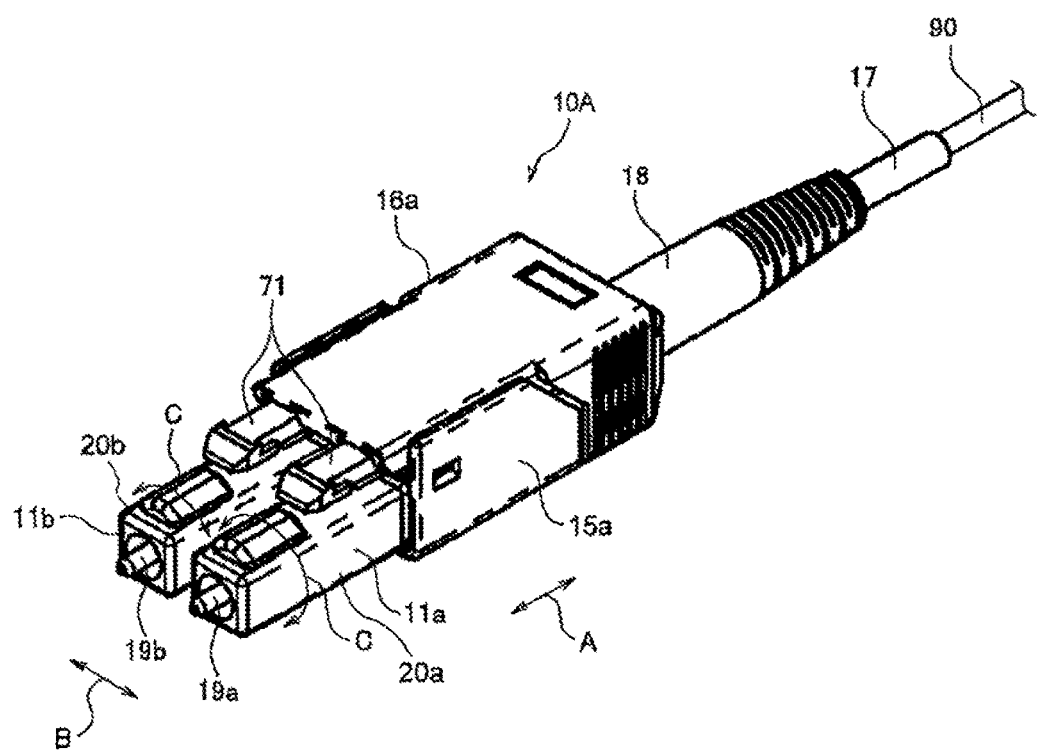
FIG. 1 is a perspective view of a duplex optical connector plug shown as an example.
Figure 2:
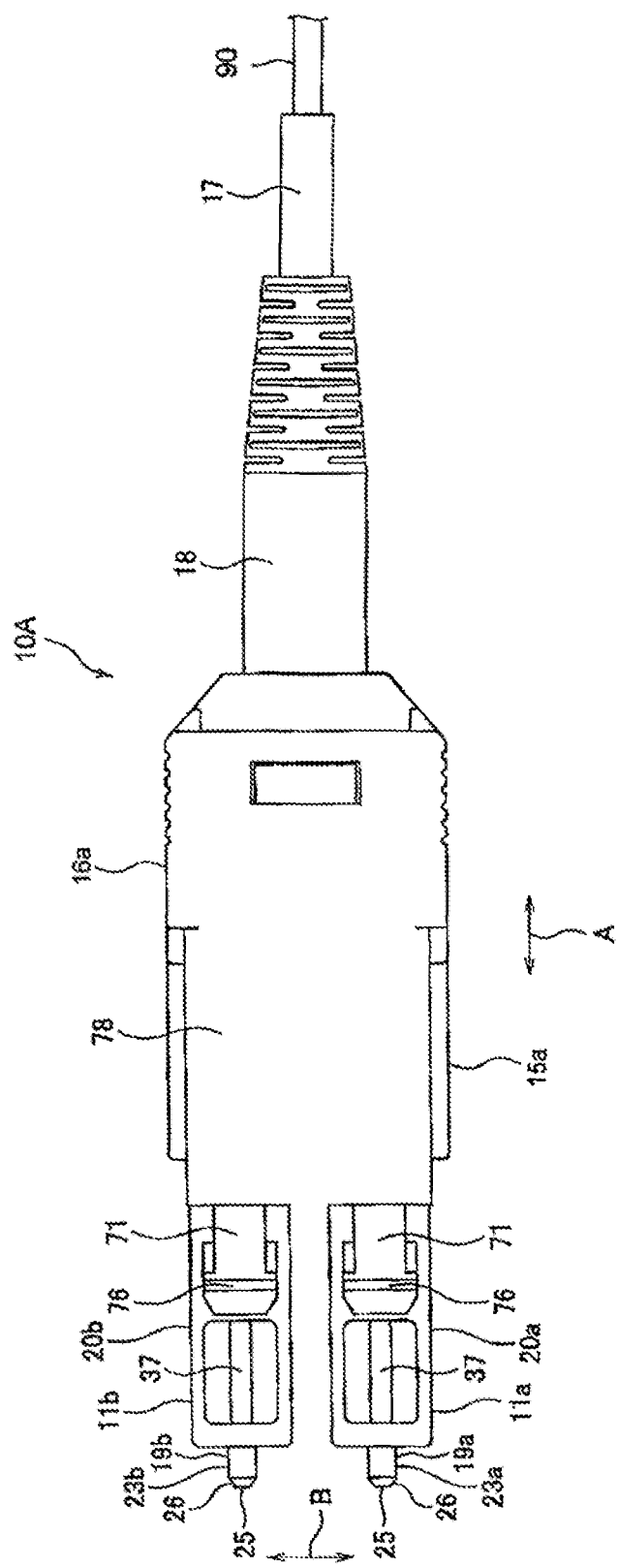
FIG. 2 is a top view of the duplex optical connector plug.
Figure 3:
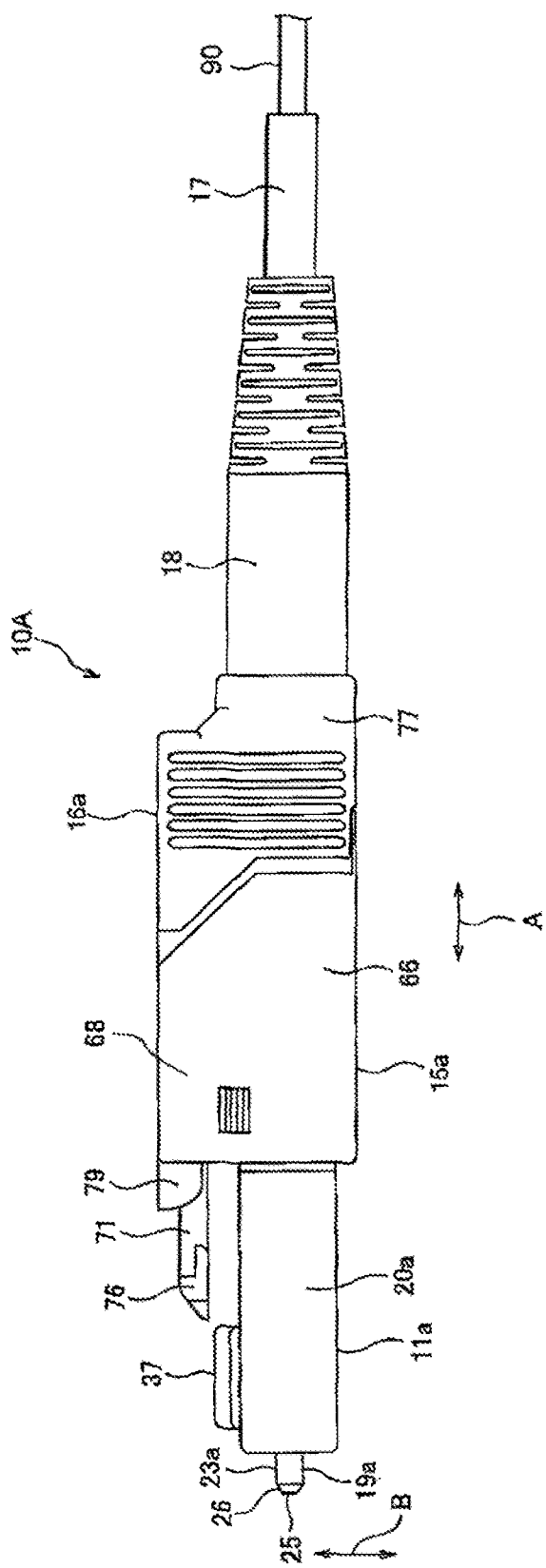
FIG. 3 is a side view of the duplex optical connector plug.
Figure 4:
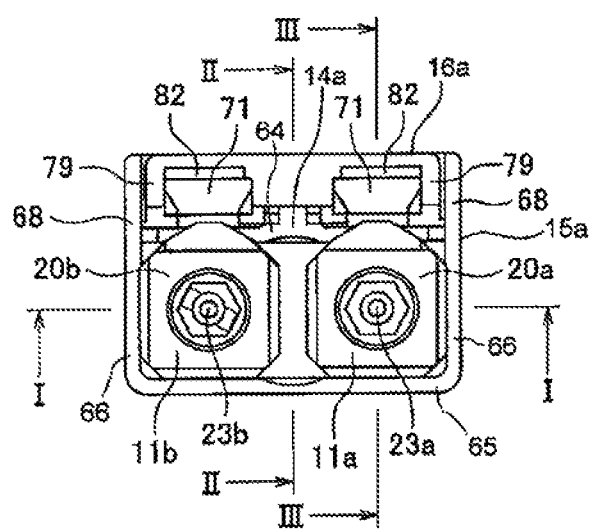
FIG. 4 is a front view of the duplex optical connector plug.
Figure 5:
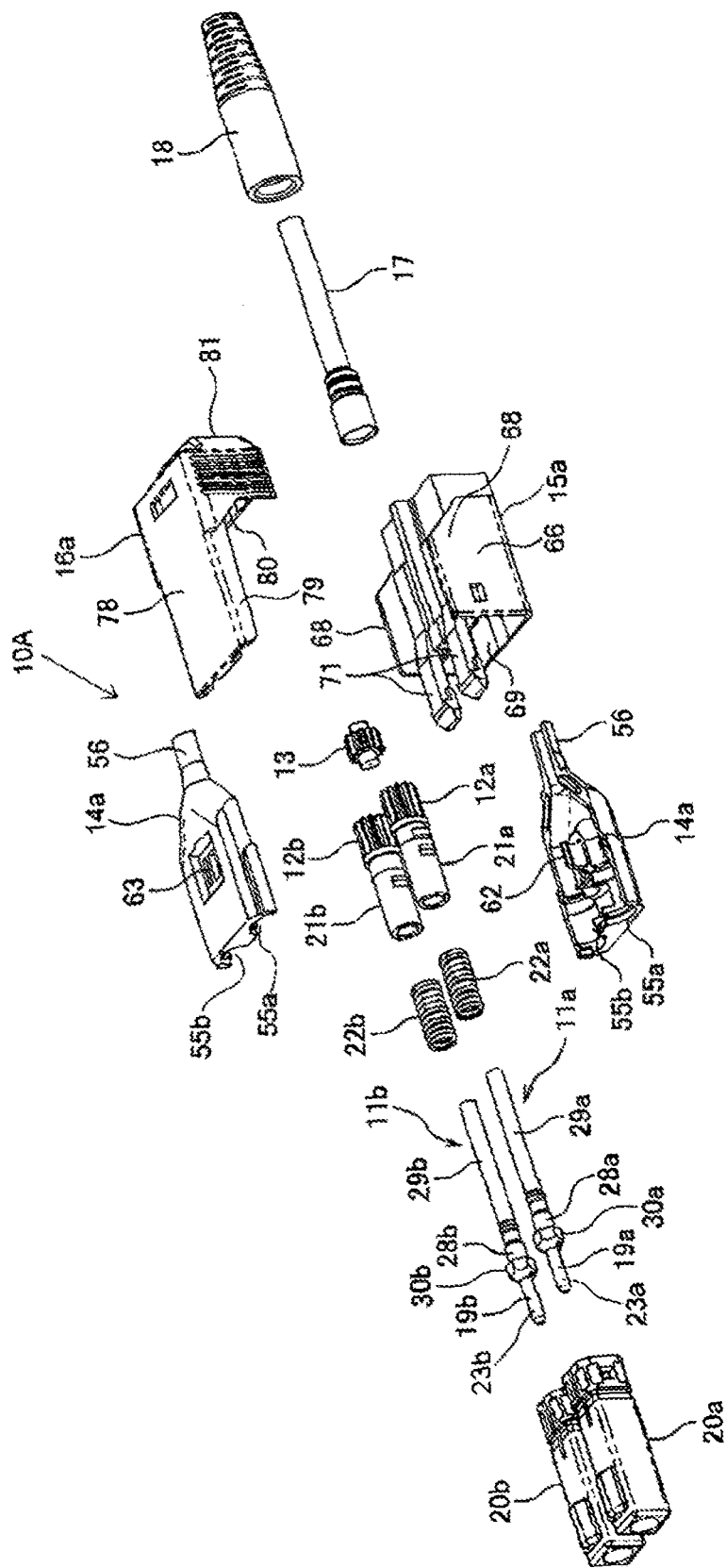
FIG. 5 is an exploded perspective view of the duplex optical connector plug.
Figure 6:
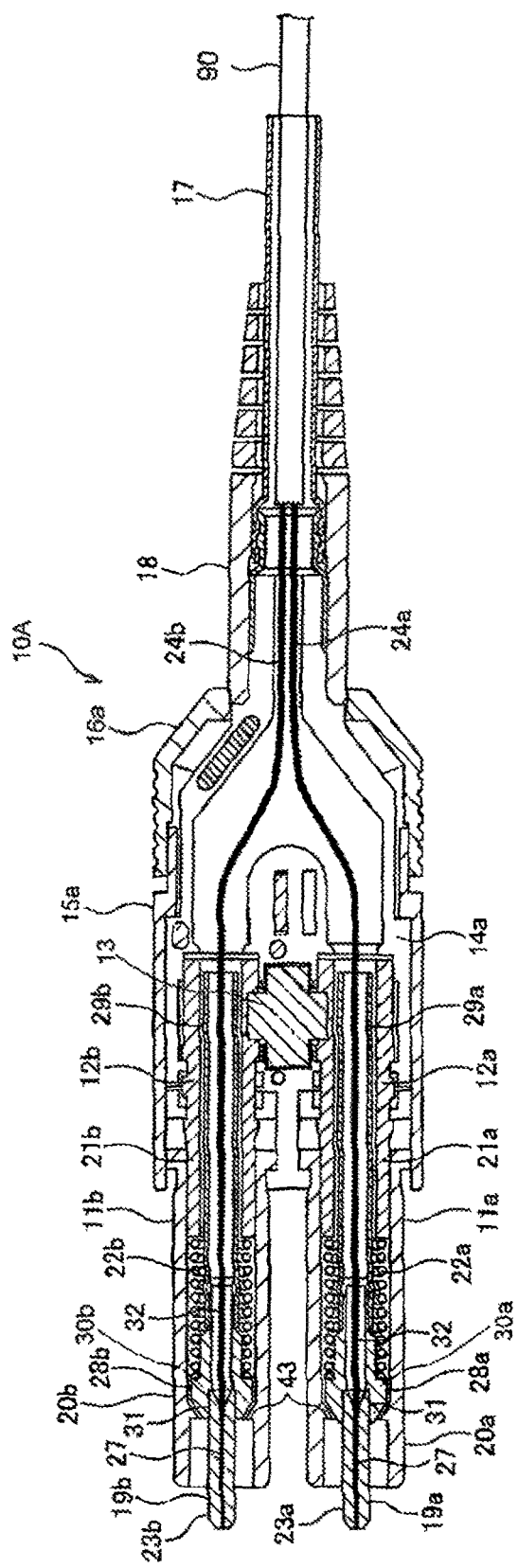
FIG. 6 is a cross-sectional view cut along an arrow I-I in FIG. 4.
Figure 7:
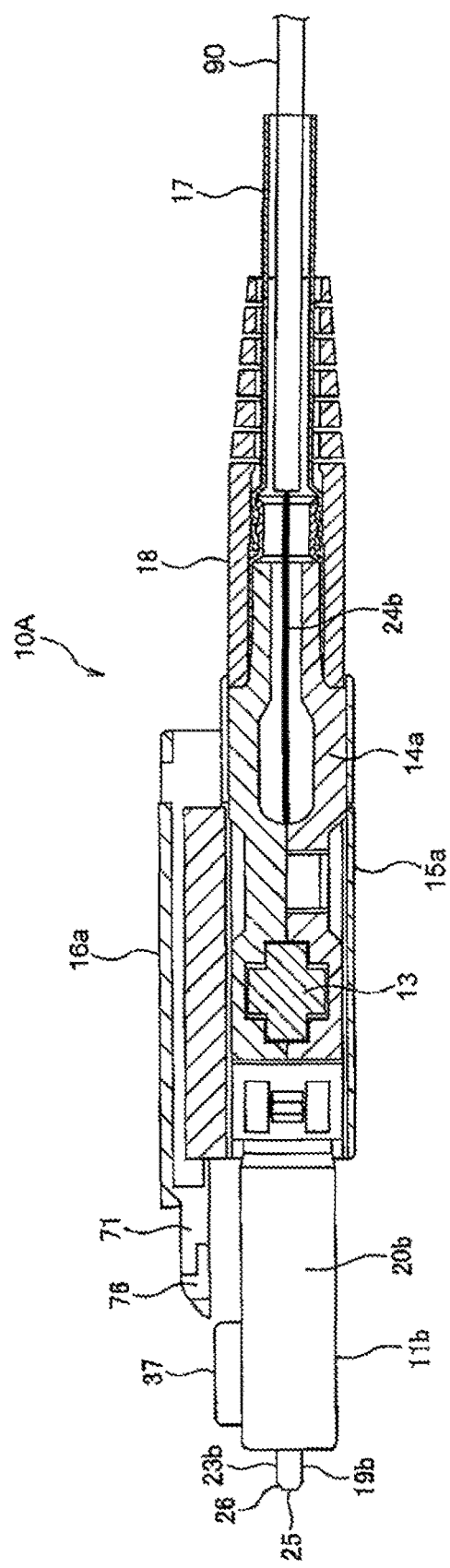
FIG. 7 is a cross-sectional view cut along an arrow II-II in FIG. 4.
Figure 8:
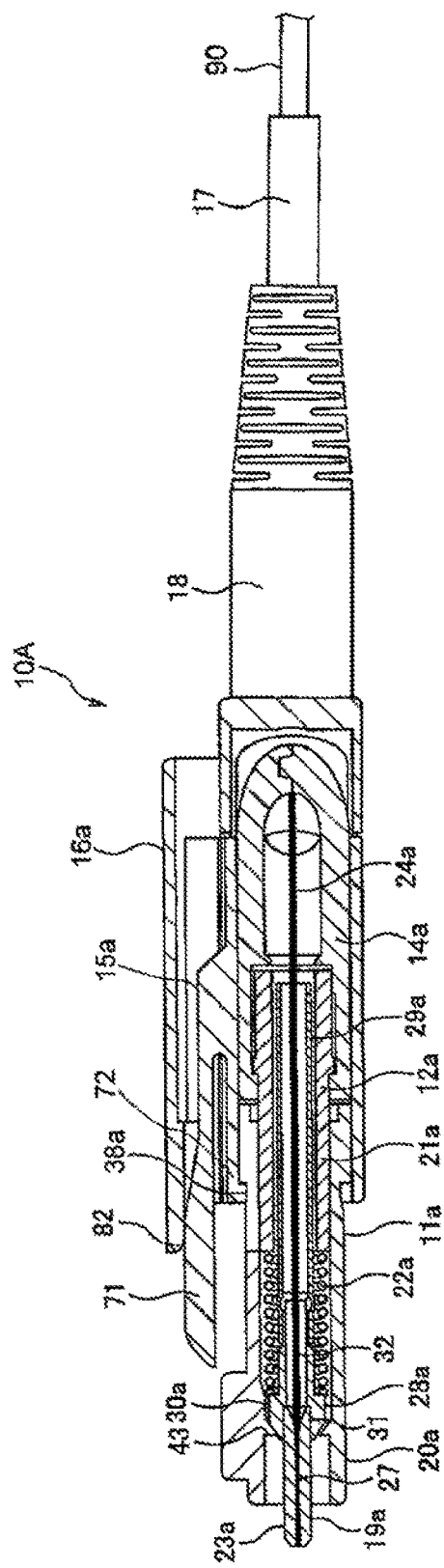
FIG. 8 is a cross-sectional view cut along an arrow III-III in FIG. 4.

Referring to the attached drawings such as FIG. 1 which is a perspective view of a duplex optical connector plug 10A shown as an example, the duplex optical connector plug and the polarity reversal method of the duplex optical connector plug will be explained below in detail. FIG. 2 is a top view of the duplex optical connector plug 10A. FIG. 3 is a side view of the duplex optical connector plug 10A. FIG. 4 is a front view of the duplex optical connector plug 10A. FIG. 5 is an exploded perspective view of the duplex optical connector plug 10A. FIG. 6 is a cross-sectional view cut along an arrow I-I in FIG. 4. FIG. 7 is a cross-sectional view cut along an arrow II-II in FIG. 4. FIG. 8 is a cross-sectional view cut along an arrow III-III in FIG. 4. In FIG. 1 to FIG. 3, an axial direction is shown by an arrow A, a radial direction (lateral direction or vertical direction) is shown by an arrow B, and a circumferential direction is shown by an arrow C.

The duplex optical connector plug 10A is used for an optical connection between the optical fibers by attaching the duplex optical connector plug 10A to an optical connector adapter (not illustrated). The optical connector plug 10A is formed by a first optical connector assembly 11a, a second optical connector assembly 11b, a first gear 12a, a second gear 12b, an intermediate gear 13, a first casing 14a, a second casing 15a, a slider 16a, a caulking ring 17 and a boot 18. In the optical connector plug 10A, as shown in the exploded perspective view of FIG. 5, the first and second casings 14a, 15a and the slider 16a are arranged on the rear side of the first and second optical connector assemblies 11a, 11b in the axial direction, and the caulking ring 17 and the boot 18 are arranged on the rear side of the slider 16a in the axial direction.

The first optical connector assembly 11a includes a first ferrule 19a extending in an axial direction, a first plug frame 20a for housing the first ferrule 19a, a first stop ring 21a which is engageably inserted into the first plug frame 20a, and a first spring 22a (coil spring). The first ferrule 19a is formed by a first capillary 23a extending in the axial direction and a cylindrically formed first sleeve 28a extending in the axial direction. At least one first optical fiber 24a is held by the first capillary 23a.

The first capillary 23a is formed in an approximately cylindrical shape extended in the axial direction. A tip surface 25 is provided on a tip in the axial direction of the first capillary 23a so that an end face of the first optical fiber 24a is exposed on the tip surface 25. A chamfered portion 26 is provided at an outer diameter region of the end face of the tip surface 25. The shape of the chamfered portion 26 can be any shape such as an angled surface and a round surface. The tip surface 25 is a surface extending perpendicularly to the radial direction. The chamfered portion 26 is gradually inclined outward in the radial direction from the tip surface 25 to the rear side in the axial direction.

The first capillary 23a is made of ceramic materials such as zirconia, plastic materials and glass materials such as crystallized glass, borosilicate glass and quartz, for example. A zirconia capillary made of zirconia is used for the first capillary 23a shown in the figures. An outer diameter of the first capillary 23a is 1.2485 mm to 1.2495 mm. Inside the first capillary 23a (ferrule), a first optical fiber insertion hole 27 extending in the axial direction is perforated. The first optical fiber 24a is inserted in the optical fiber insertion hole 27 perforated on the first capillary 23a.

The first sleeve 28a is connected to the rear side in the axial direction of the first capillary 23a (first ferrule 19a). A first core wire cover 29a (PTFE tube) covering an entire area of the outer periphery of the first optical fiber 24a and extending in the axial direction is connected to the rear side in the axial direction of the first sleeve 28a. At a front end of the first sleeve 28a, a first flange 30a having a polygonal cylindrical shape is integrally formed. A diameter of the first flange 30a is larger than diameters of the first capillary 23a and the first core wire cover 29a. The first sleeve 28a and the first flange 30a are made of metal materials such as stainless, brass, iron and steel or synthetic resin materials. Inside the first sleeve 28a, a capillary insertion hole 31 for inserting and holding the first capillary 23a and a core wire insertion hole 32 for inserting and holding the first optical fiber core wire incorporating the first optical fiber 24a are perforated.

The rear end portion of the first capillary 23a is inserted in the capillary insertion hole 31 of the first sleeve 28a, and the rear end portion of the first capillary 23a is fixed and held by the capillary insertion hole 31 of the first sleeve 28a. One end portion of the first optical fiber core wire is inserted in the core wire insertion hole 32 of the first sleeve 28a, and the one end portion of the first optical fiber core wire is fixed and held by the core wire insertion hole 32 of the first sleeve 28a. A cross-sectional shape in the axial direction of the first sleeve 28a is not limited to the cylindrical shape shown in the figures. A rectangular cylindrical shape extending in the axial direction can be also used.

Figure 9:
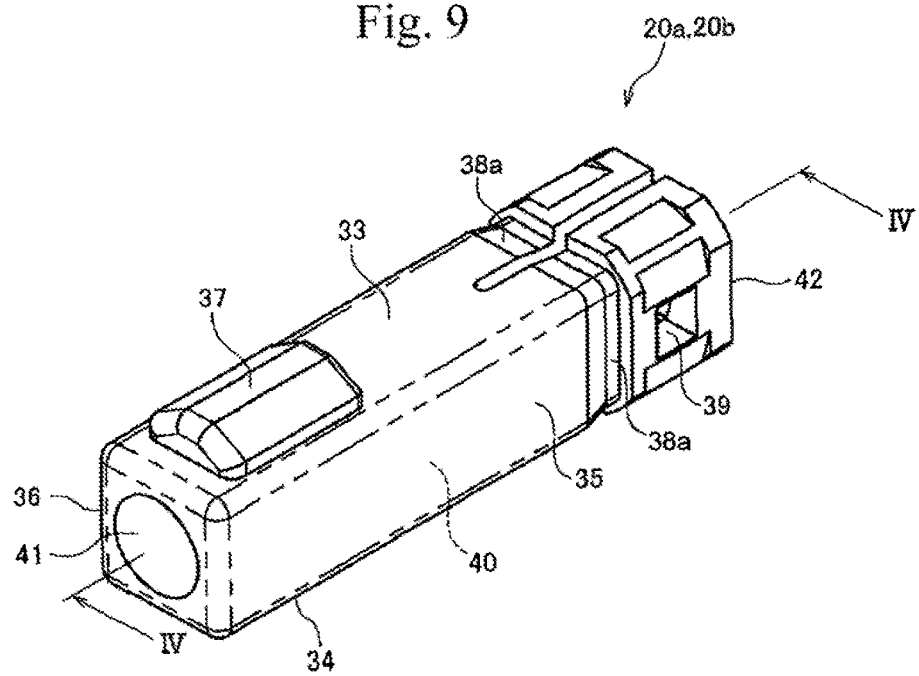
FIG. 9 is a perspective view of first and second plug frames.
Figure 10:
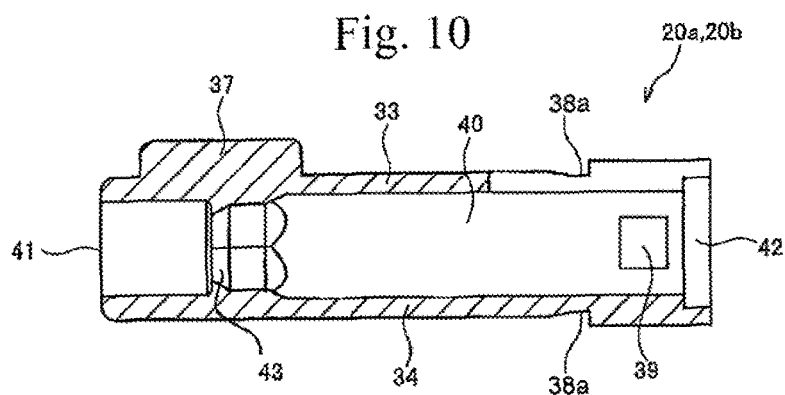
FIG. 10 is a cross-sectional view cut along an arrow IV-IV in FIG. 9.

FIG. 9 is a perspective view of first and second plug frames 20a, 20b. FIG. 10 is a cross-sectional view cut along an arrow Iv-Iv in FIG. 9. The first plug frame 20a is made of a synthetic resin material and formed in an approximately square columnar shape having a hollow. The first plug frame 20a includes a top wall 33 and a bottom wall 34 which are separately facing each other in the vertical direction and extending in the axial direction. The first plug frame 20a also includes side walls 35, 36 which are separately facing each other in the lateral direction and extending in the axial direction. A guide projection 37 extending in the axial direction is formed on the top wall 33 at the front side in the axial direction of the first plug frame 20a. Guide recesses 38a are formed on the walls 33 to 36 at the rear side in the axial direction of the first plug frame 20a to engage the later described engagement claws 72 formed on the front end of a top wall 64 of the second casings 15 with the guide recesses 38a. A fitting opening 39 having an approximately square shape is perforated on the side walls 35, 36 at the rear side in the axial direction of the first plug frame 20a.

A ferrule housing space 40 surrounded by the walls 33 to 36 and extending in the axial direction is formed in the first plug frame 20a. A front end exposure opening 41 is opened in the first plug frame 20a to expose a tip end portion of the first capillary 23a. A rear end insertion opening 42 is opened in the first plug frame 20a to insert the first ferrule 19a. On the rear side in the axial direction of the front end exposure opening 41 of the first plug frame 20a, an abutting portion 43 is extended from an inner peripheral surface of the ferrule housing space 40 to inward in the radial direction. The first flange 30a of the first sleeve 28a abuts on the abutting portion 43. Since the first flange 30a of the first sleeve 28a abuts on the abutting portion 43, the first sleeve 28a is prevented from being further moved to the front side in the axial direction with respect to the first plug frame 20a.

Figure 11:
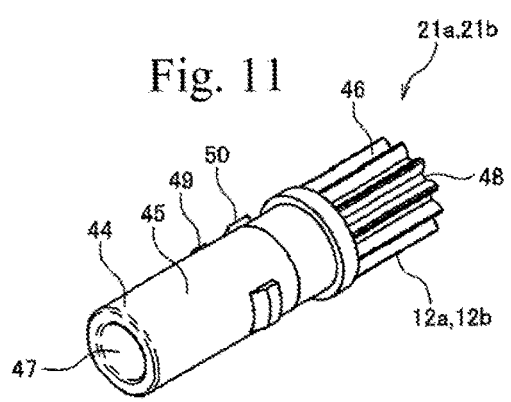
FIG. 11 is a perspective view of first and second stop rings.
Figure 12:
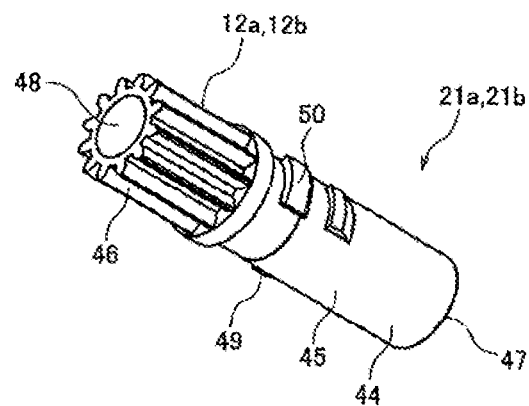
FIG. 12 is a perspective view of the first and second stop rings.

FIG. 11 is a perspective view of first and second stop rings 21a, 21b. FIG. 12 is a perspective view of the first and second stop rings 21a, 21b shown from another direction. The first stop ring 21a is made of metal materials or synthetic resin materials. The first stop ring 21a is formed in an approximately cylindrical shape and extending in the axial direction. The first stop ring 21a includes a front end portion 44 (front end tube) located at the front side in the axial direction, a rear end portion 46 (rear end tube) located at the rear side in the axial direction, and an intermediate portion 45 (intermediate tube) extending between the front end portion 44 and the rear end portion 46. A core wire exposure opening 47 is opened on the front end portion 44 of the first stop ring 21a to expose the first optical fiber core wire. A core wire insertion opening 48 is opened on the rear end portion 46 to insert the first optical fiber core wire.

A fitting projection 49 projecting outward in the radial direction is formed on an outer peripheral surface (peripheral surface) of the intermediate portion 45 of the first stop ring 21a. The fitting projection 49 is fitted in the fitting opening 39 perforated on the side walls 35, 36 of the first plug frame 20a. When the fitting projection 49 is fitted in the fitting opening 39, the first stop ring 21a is connected to the first plug frame 20a. An abutting projection 50 (rotating angle regulating unit) projecting outward in the radial direction is formed on an outer peripheral surface (peripheral surface) of the intermediate portion 45 of the first stop ring 21a at the rear side in the axial direction of the fitting projection 49. The abutting projection 50 is formed on an outer periphery facing the rotation regulating projection 57a which is formed on a later described first opening 55a of the first casing 14a.

The first spring 22a is arranged between the first ferrule 19a and the first stop ring 21a. The first spring 22a is inserted to the first core wire cover 29a and extending in the axial direction. A front end of the first spring 22a abuts on the first flange 30a of the first sleeve 28a, and a rear end of the first spring 22a abuts on the front end portion 44 of the first stop ring 21a. The first spring 22a biases the first ferrule 19a forward in the axial direction. The first gear 12a is formed on the rear end portion 46 of the first stop ring 21a and extending in the axial direction.

The second optical connector assembly 11b is adjacent to the first optical connector assembly 11a and extending in the axial direction in parallel with the first optical connector assembly 11a. The second optical connector assembly 11b includes a second ferrule 19b extending in an axial direction, a second plug frame 20b for housing the second ferrule 19b, a second stop ring 21b which is engageably inserted into the second plug frame 20b, and a second spring 22b (coil spring). The second ferrule 19b is formed by a second capillary 23b extending in the axial direction and a cylindrically formed second sleeve 28b extending in the axial direction. At least one second optical fiber 24b is held by the second capillary 23b.

The second capillary 23b is laterally adjacent to the first capillary 23a and extending in the axial direction in parallel with the first capillary 23a. The second capillary 23b is formed in an approximately cylindrical shape extended in the axial direction. A tip surface 25 is provided on a tip in the axial direction of the second capillary 23b so that an end face of the second optical fiber 24b is exposed on the tip surface 25. A chamfered portion 26 is provided at an outer diameter region of the end face of the tip surface 25. The tip surface 25 is a surface extending perpendicularly to the radial direction. The shape of the chamfered portion 26 is same as the shape of the tip surface of the first capillary 23a. Inside the second capillary 23b (ferrule), the optical fiber insertion hole 27 extending in the axial direction is perforated. The second optical fiber 24b is inserted in the optical fiber insertion hole 27 perforated on the second capillary 23b. The material and the outer diameter of the second capillary 23b are same as the material and the outer diameter of the first capillary 23a.

The second sleeve 28b is connected to the rear side in the axial direction of the second capillary 23b (second ferrule 19b). A second core wire cover 29b (PTFE tube) covering an entire area of the outer periphery of the second optical fiber 24b and extending in the axial direction is connected to the rear side in the axial direction of the second sleeve 28b. The second core wire cover 29b is laterally adjacent to the first core wire cover 29a and extending in the axial direction in parallel with the first core wire cover 29a.

At a front end of the second sleeve 28b, a second flange 30b having a polygonal cylindrical shape is integrally formed. A diameter of the second flange 30b is larger than diameters of the second capillary 23b and the second core wire cover 29b. The second flange is laterally adjacent to the first flange. Same as the first sleeve 28a and the first flange 30a, the second sleeve 28b and the second flange 30b are made of metal materials such as stainless, brass, iron and steel or synthetic resin materials. Inside the second sleeve 28b, a capillary insertion hole 31 for inserting and holding the second capillary 23b and a core wire insertion hole 32 for inserting and holding the second optical fiber core wire incorporating the second optical fiber 24b are perforated.

The rear end portion of the second capillary 23b is inserted in the capillary insertion hole 31 of the second sleeve 28b, and the rear end portion of the second capillary 23b is fixed and held by the capillary insertion hole 31 of the second sleeve 28b. One end portion of the second optical fiber core wire is inserted in the core wire insertion hole 32 of the second sleeve 28b, and the one end portion of the second optical fiber core wire is fixed and held by the core wire insertion hole 32 of the second sleeve 28b. A cross-sectional shape in the axial direction of the second sleeve 28b is not limited to the cylindrical shape shown in the figures. A rectangular cylindrical shape extending in the axial direction can be also used.

The second plug frame 20b is laterally adjacent to the first plug frame 20a and extending in the axial direction in parallel with the first plug frame 20a. The second plug frame 20b is made of a synthetic resin material and formed in an approximately square columnar shape having a hollow. The second plug frame 20b includes a top wall 33 and a bottom wall 34 which are separately facing each other in the vertical direction and extending in the axial direction. The second plug frame 20b also includes side walls 35, 36 which are separately facing each other in the lateral direction and extending in the axial direction. A guide projection 37 extending in the axial direction is formed on the top wall 33 at the front side in the axial direction of the second plug frame 20b. Guide recesses 38a are formed on the walls 33 to 36 at the rear side in the axial direction of the second plug frame 20b to engage engagement claws 72 formed on the front end of a top wall 64 of the second casings 15 with the guide recesses 38a. A fitting opening 39 having an approximately square shape is perforated on the side walls 35, 36 at the rear side in the axial direction of the second plug frame 20b.

A ferrule housing space 40 surrounded by the walls 33 to 36 and extending in the axial direction is formed in the second plug frame 20b. A front end exposure opening 41 is opened in the second plug frame 20b to expose a tip end portion of the second capillary 23b. A rear end insertion opening 42 is opened in the second plug frame 20b to insert the second ferrule 19b. On the rear side in the axial direction of the front end exposure opening 41 of the second plug frame 20b, an abutting portion 43 is extended from an inner peripheral surface of the ferrule housing space 40 to inward in the radial direction. The second flange 30b of the second sleeve 28b abuts on the abutting portion 43. Since the second flange 30b of the second sleeve 28b abuts on the abutting portion 43, the second sleeve 28b is prevented from being further moved to the front side in the axial direction with respect to the second plug frame 20b.

The second stop ring 21b is laterally adjacent to the first stop ring 21a and extending in the axial direction in parallel with the first stop ring 21a. Same as the first stop ring 21a, the second stop ring 21b is made of metal materials or synthetic resin materials and formed in an approximately cylindrical shape. The second stop ring 21b includes a front end portion 44 (front end tube) located at the front side in the axial direction, a rear end portion 46 (rear end tube) located at the rear side in the axial direction, and an intermediate portion 45 (intermediate tube) extending between the front end portion 44 and the rear end portion 46. A core wire exposure opening 47 is opened on the front end portion 44 of the second stop ring 21b to expose the second optical fiber core wire. A core wire insertion opening 48 is opened on the rear end portion 46 to insert the second optical fiber core wire.

A fitting projection 49 projecting outward in the radial direction is formed on an outer peripheral surface (peripheral surface) of the intermediate portion 45 of the second stop ring 21b. The fitting projection 49 is fitted in the fitting opening 39 perforated on the side walls 35, 36 of the second plug frame 20b. When the fitting projection 49 is fitted in the fitting opening 39, the second stop ring 21b is connected to the second plug frame 20b. An abutting projection 50 (rotating angle regulating unit) projecting outward in the radial direction is formed on an outer peripheral surface (peripheral surface) of the intermediate portion 45 of the second stop ring 21b at the rear side in the axial direction of the fitting projection 49. The abutting projection 50 is formed on an outer periphery facing the rotation regulating projection 57a which is formed on a later described second opening 55b of the first casing 14a.

The second spring 22b is arranged between the second ferrule 19b and the second stop ring 21b and inserted in the second core wire cover 29b. The second spring 22b is laterally adjacent to the first spring 22a and extending in the axial direction in parallel with the first spring 22a. A front end of the second spring 22b abuts on the second flange 30b of the second sleeve 28b, and a rear end of the second spring 22b abuts on the front end portion 44 of the second stop ring 21b. The second spring 22b biases the second ferrule 19b forward in the axial direction. The second gear 12b is formed on the rear end portion 46 of the second stop ring 21b and extending in the axial direction.

Figure 13:
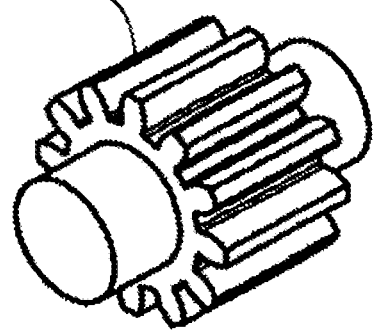
FIG. 13 is a perspective view of an intermediate gear.

FIG. 13 is a perspective view of the intermediate gear 13. The intermediate gear 13 is interposed between the first gear 12*a* and the second gear 12*b* and extending in the axial direction. The intermediate gear 13 is circumscribed to the first and second gears 12*a*, 12*b* to transfer a rotational force of one of the first and second gears 12*a*, 12*b* to the other of the gears and rotate the other of the gears in the same direction as the one of the gears. A gear ratio of the first gear 12*a*, the second gear 12*b* and the intermediate gear 13 is 1:1:1. Accordingly, when the first gear 12*a* is rotated by one rotation in the clockwise direction, the intermediate gear 13 is rotated by one rotation in the counterclockwise direction and the second gear 12*b* is rotated by one rotation in the clockwise direction. On the contrary, when the first gear 12*a* is rotated by one rotation in the counterclockwise direction, the intermediate gear 13 is rotated by one rotation in the clockwise direction and the second gear 12*b* is rotated by one rotation in the counterclockwise direction.

Figure 14:
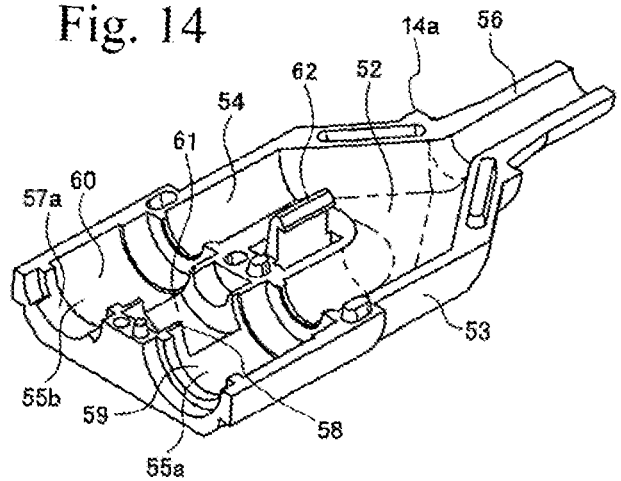
FIG. 14 is a perspective view of a first casing shown as an example.
Figure 15:
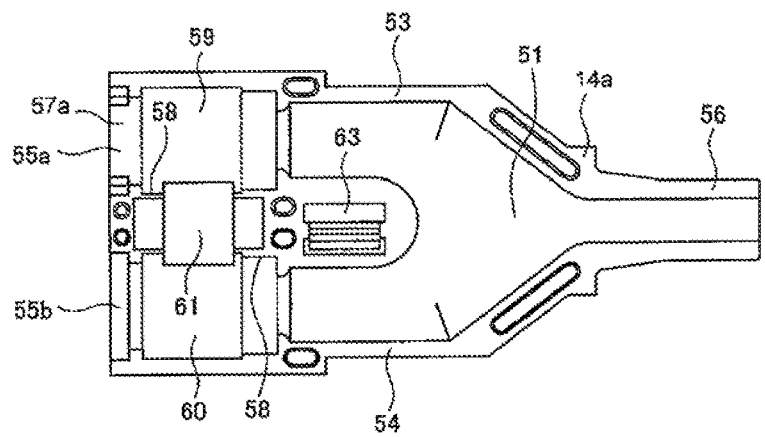
FIG. 15 is an inside view of the first casing in a state of being separated into two parts.
Figure 16:
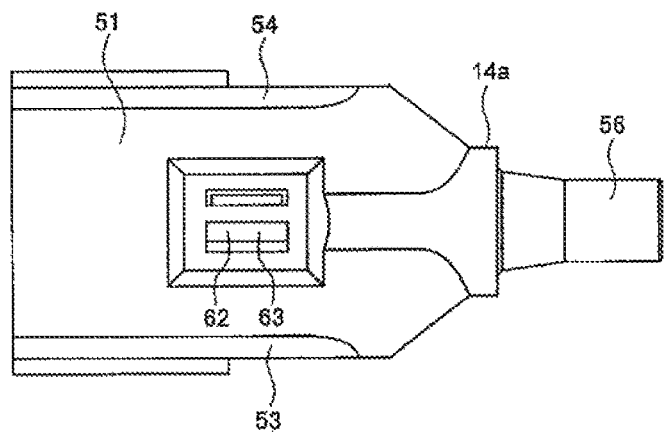
FIG. 16 is an outside view of the first casing.

FIG. 14 is a perspective view of the first casing 14*a* in a state of being separated into two parts. FIG. 15 is an inside view of the first casing 14*a* in a state of being separated into two parts. FIG. 16 is an outside view of the first casing 14*a*. The first casing 14*a* is made of a synthetic resin material and formed in a hollow shape. The first casing 14*a* includes a top wall 51 and a bottom wall 52 which are separately facing each other in the vertical direction and extending in the axial direction. The first casing 14*a* also includes side walls 53, 54 which are separately facing each other in the lateral direction and extending in the axial direction. The first casing 14*a* also includes a first opening 55*a* opened at the front end of the first casing 14*a* to insert the first stop ring 21*a*, and a second opening 55*b* opened at the front end of the first casing 14*a* to insert the second stop ring 21*b*.

At the rear side in the axial direction of the first casing 14*a*, a cylindrical portion 56 is connected to insert the caulking ring 17 and engage the boot 18 with the cylindrical portion 56. A rotation regulating projection 57*a* (rotating angle regulating unit) projecting inward in the radial direction of the first opening 55*a* is formed on the first opening 55*a* of the first casing 14*a*. A rotation regulating projection 57*a* (rotating angle regulating unit) projecting inward in the radial direction of the second opening 55*b* is formed on the second opening 55*b*.

Inside the first casing 14*a*, a first gear housing portion 59 surrounded by the walls 51 to 54 and a partition wall 58, a second gear housing portion 60 surrounded by the walls 51 to 54 and the partition wall 58, and an intermediate gear housing portion 61 surrounded by the partition walls 58 and located between the first and second gear housing portions 59, 60 are formed. The first gear 12*a* formed on the rear end portion 46 of the first stop ring 21*a* is rotatably housed in the first gear housing portion 59. The second gear 12*b* formed on the rear end portion 46 of the second stop ring 21*b* is rotatably housed in the second gear housing portion 60. The intermediate gear 13 is rotatably housed in the intermediate gear housing portion 61.

In the first casing 14*a*, the first and second gears 12*a*, 12*b* and the intermediate gear 13 are respectively housed in the first and second gear housing portions 59, 60 and the intermediate gear housing portion 61. Because of this, the gears 12*a*, 12*b*, 13 are laterally arranged, the first gear 12*a* and the intermediate gear 13 are circumscribed, and the second gear 12*b* and the intermediate gear 13 are circumscribed. As shown in FIG. 5, the first casing 14*a* is formed by connecting the first casings 14*a* which are separated into two parts in the vertical direction. When the casings 14*a* are connected, a fitting claw 62 formed on the lower casing 14*a* is engaged in a fitting hole 63 formed on the upper casing 14*a*. Thus, the casings 14*a* are integrated.

Figure 17:
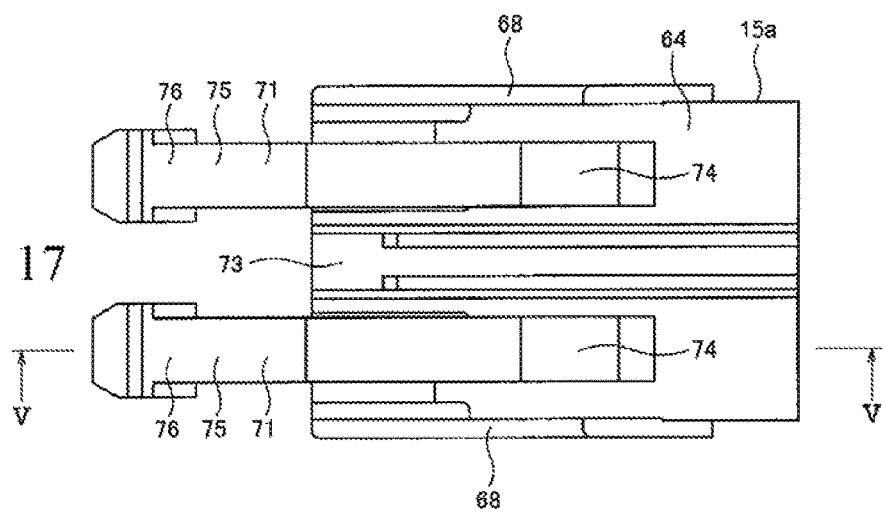
FIG. 17 is a top view of a second casing.
Figure 18:
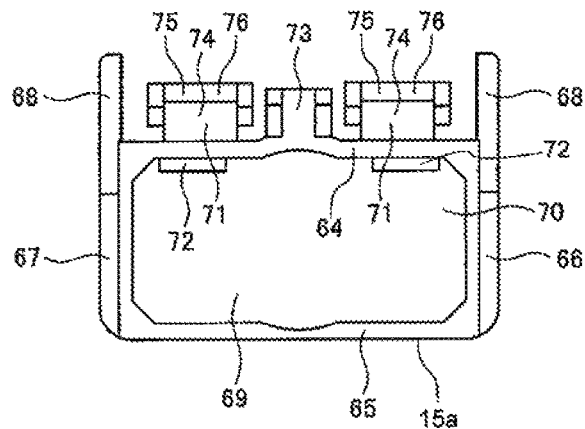
FIG. 18 is a front view of the second casing.
Figure 19:
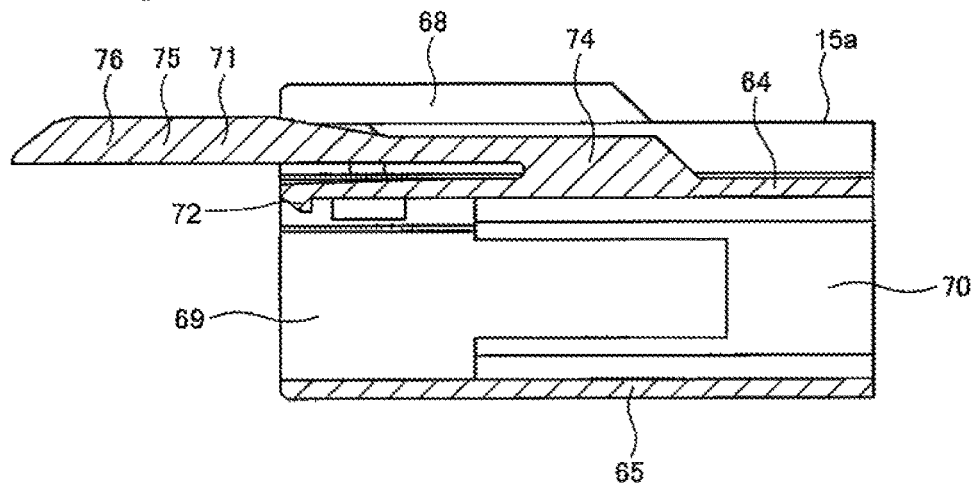
FIG. 19 is a cross-sectional view cut along an arrow V-V in FIG. 17.

FIG. 17 is a top view of the second casing 15*a*. FIG. 18 is a front view of the second casing 15*a*. FIG. 19 is a cross-sectional view cut along an arrow V-V in FIG. 17. The second casing 15*a* is made of a synthetic resin material. The second casing 15*a* includes a top wall 64 and a bottom wall 65 which are separately facing each other in the vertical direction and extending in the axial direction. The second casing 15*a* also includes side walls 66, 67 which are separately facing each other in the lateral direction and extending in the axial direction. The second casing 15*a* also includes a guide wall 68 extending upward from the side walls 66, 67 and extending in the axial direction. The second casing 15*a* includes a front end opening 69 opened at the front end of the second casing 15*a*, a rear end opening 70 opened at the rear end of the second casing 15*a*, and a pair of engagement latches 71 located at the top wall 64 of the second casing 15*a*. At a front end of the top wall 64 of the second casing 15*a*, the engagement claws 72 projecting downward are formed. At a tip of the center of the top wall 64 of the second casing 15*a*, an engagement-insertion key 73 extending in the axial direction is formed.

The engagement latches 71 are laterally separated with each other by a predetermined length and extending straightly in the axial direction in parallel with each other. The engagement latches 71 include a connection portion 74 connected to the top wall 64 of the second casing 15*a* and a free portion 75 extending in the axial direction from the connection portion 74 to be exposed (extended) from the front end opening 69 by a predetermined length forward in the axial direction. An engagement key 76 is formed on a tip of the free portion 75. The free portion 75 has a flexibility and capable of being elastically deformed downward.

The second casing 15*a* can house the first casing 14*a* in a state that the top wall 64 of the second casing 15*a* faces to the top wall 51 of the first casing 14*a* and the bottom wall 65 of the second casing 15*a* faces to the bottom wall 52 of the first casing 14*a*. On the contrary, the second casing 15*a* can house the first casing 14*a* in a state that the top wall 64 of the second casing 15*a* faces to the bottom wall 52 of the first casing 14*a* and the bottom wall 65 of the second casing 15*a* faces to the top wall 51 of the first casing 14*a*. The second casing 15*a* can house the first casing 14*a* in a state that the first casing 14*a* is vertically reversed (inversed).

Figure 20:
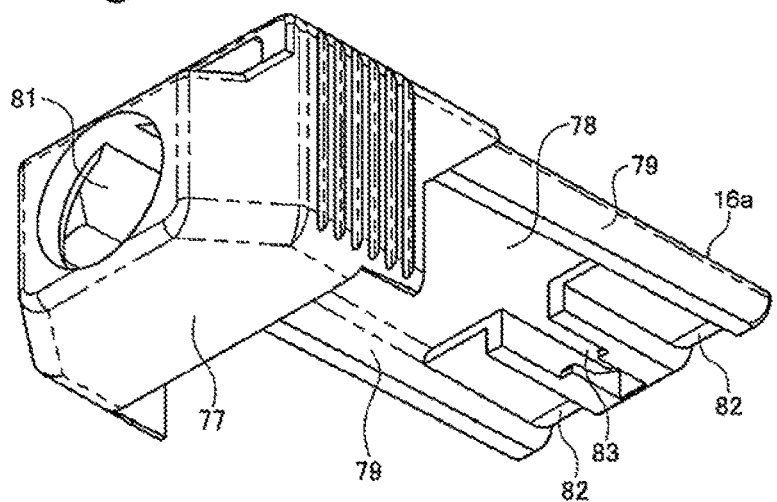
FIG. 20 is a perspective view of a slider.
Figure 21:
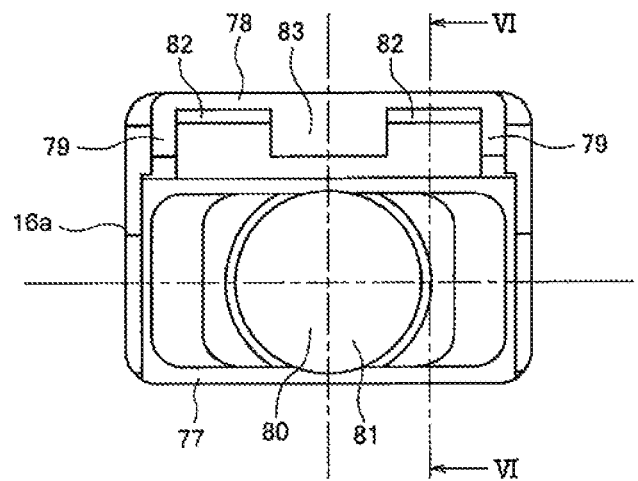
FIG. 21 is a front view of the slider.
Figure 22:
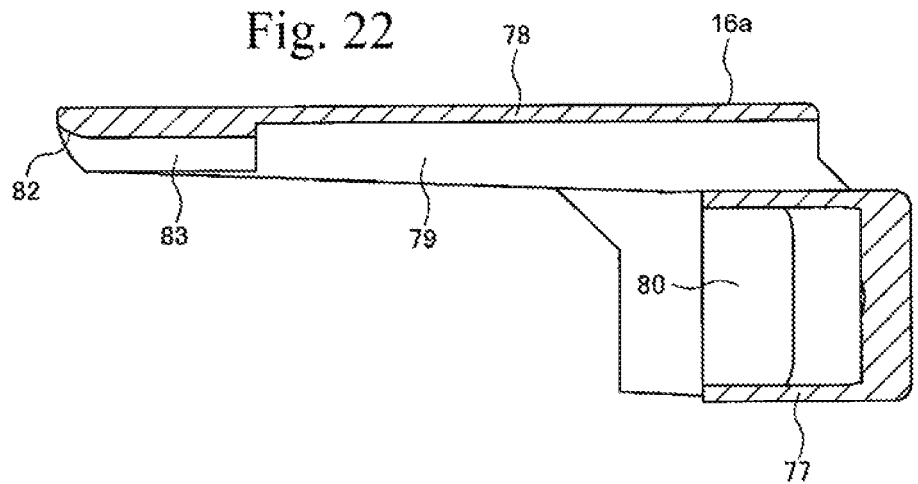
FIG. 22 is a cross-sectional view cut along an arrow VI-VI in FIG. 21.

FIG. 20 is a perspective view of the slider 16*a*. FIG. 21 is a front view of the slider 16*a*. FIG. 22 is a cross-sectional view cut along an arrow VI-VI in FIG. 21. The slider 16*a* is made of a synthetic resin material. The slider 16*a* includes a box 77 connected to the rear end portion of the second casing 15*a*, a sliding top wall 78 (sliding plate) extending forward in the axial direction from a top portion of the box 77, and a guide wall 79 extending downward and in the axial direction from both sides of the sliding top wall 78. The slider 16*a* includes a front end opening 80 opened at the front end of the box 77 and a rear end opening 81 opened at the rear end of the box 77. At both sides of the lower surface of the tip end portion of the sliding top wall 78, a pair of inclined planes 82 gradually inclined downward from the front end of the slider 16*a* to rearward in the axial direction is formed. At a center of the lower surface of the tip end portion of the sliding top wall 78, a key engagement portion 83 is formed to engageably insert the engagement-insertion key 73 of the top wall 64 of the second casing 15*a*.

The slider 16*a* is located at the rear side in the axial direction of the second casing 15*a*. The box 77 of the slider 16*a* is located at the rear side in the axial direction of the rear end portion of the second casing 15*a*. The slider 16*a* is connected to the second casing 15*a* slidably in the axial direction. In a state that the slider 16a is connected to the second casing 15a, the guide wall 79 of the slider 16a is located inside the guide wall 68 of the second casing 15a, the engagement-insertion key 73 is engageably inserted in the key engagement portion 83 of the sliding top wall 78 of the slider 16a, and the inclined planes 82 of the sliding top wall 78 of the slider 16a abuts on the upper surface of the engagement latches 71.

The slider 16a is slidable on an upper surface of the engagement latches 71 forward and backward in the axial direction. When the slider 16a is slid backward in the axial direction with respect to the second casing 15a, the inclined planes 82 of the slider 16a presses the engagement latches 71 downward and the inclined planes 82 pushes down the engagement latches 71.

The caulking ring 17 is inserted to the cylindrical portion 56 located at the rear side in the axial direction of the first casing 14a. The boot 18 is engaged with the cylindrical portion 56 of the first casing 14a via the caulking ring 17 so that an inner peripheral surface of the boot 18 is in close contact with an outer peripheral surface of the front end portion of the caulking ring 17. The first optical fiber core wire incorporating the first optical fiber 24a and the second optical fiber core wire incorporating the second optical fiber 24b are integrated into one in the first casing 14a to form an optical fiber cord 90. The optical fiber cord 90 is inserted in the caulking ring 17 and extended outward from the rear end of the caulking ring 17.

In the optical connector plug 10A, the rotation of the first optical connector assembly 11a (first stop ring 21a) is prevented when the abutting projection 50 (rotating angle regulating unit) formed on the intermediate portion 45 of the first stop ring 21a abuts on the rotation regulating projection 57a (rotating angle regulating unit) formed on the first opening 55a of the first casing 14a. In addition, the rotation of the second optical connector assembly 11b (second stop ring 21b) is prevented when the abutting projection 50 (rotating angle regulating unit) formed on the intermediate portion 45 of the second stop ring 21b abuts on the rotation regulating projection 57a (rotating angle regulating unit) formed on the second opening 55b of the first casing 14a.

The rotating angle of the first and second optical connector assemblies 11a, 11b (first and second stop rings 21a, 21b) is determined by a forming range of the rotation regulating projection 57a of the first opening 55a and the second opening 55b. In the optical connector plug 10A, the rotation range of the first and second optical connector assemblies 11a, 11b from a starting point to a finishing point of the rotation is limited to be a half-rotation (rotating angle is 180°).

Figure 23:
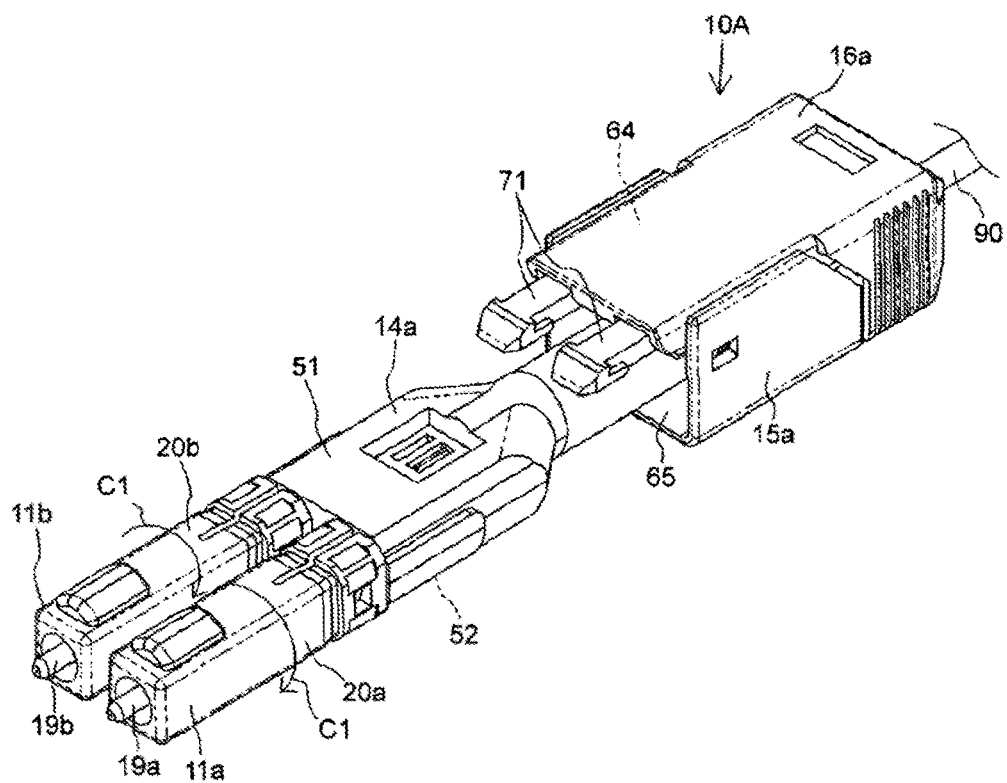
FIG. 23 is a perspective view for explaining a procedure of rotating first and second optical connector assemblies.
Figure 24:
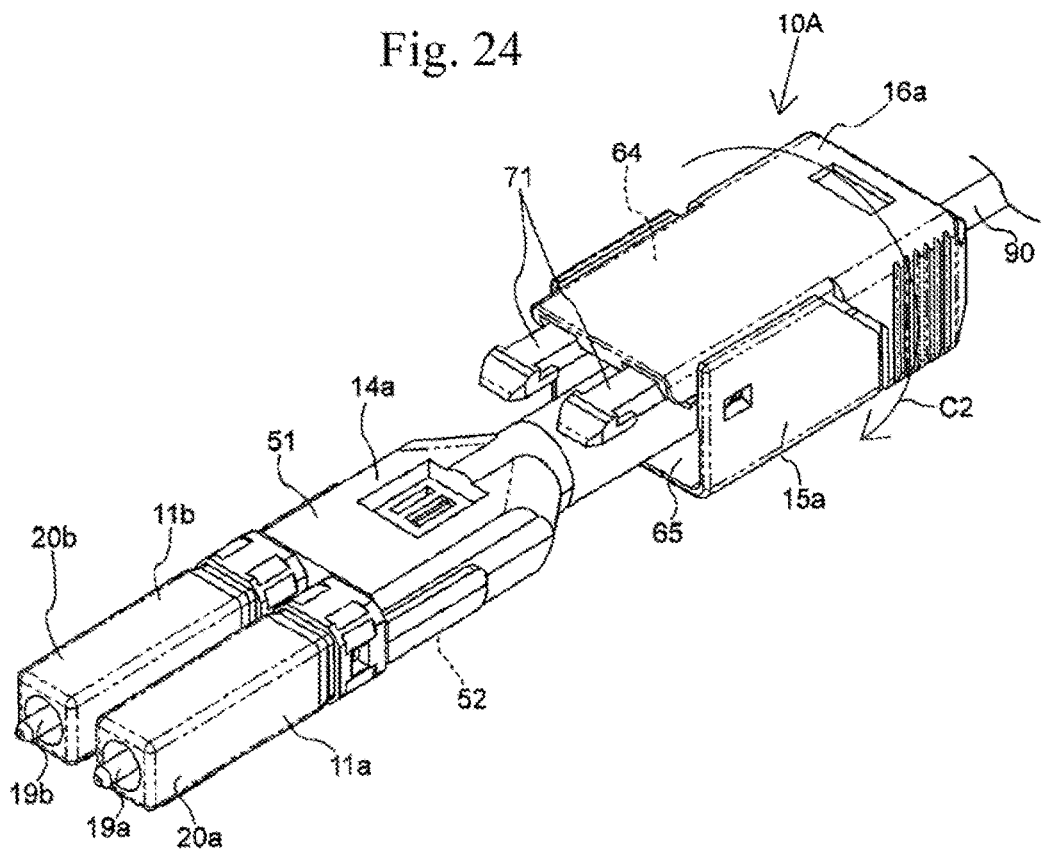
FIG. 24 is a perspective view explaining the following procedure continued from FIG. 23.
Figure 25:
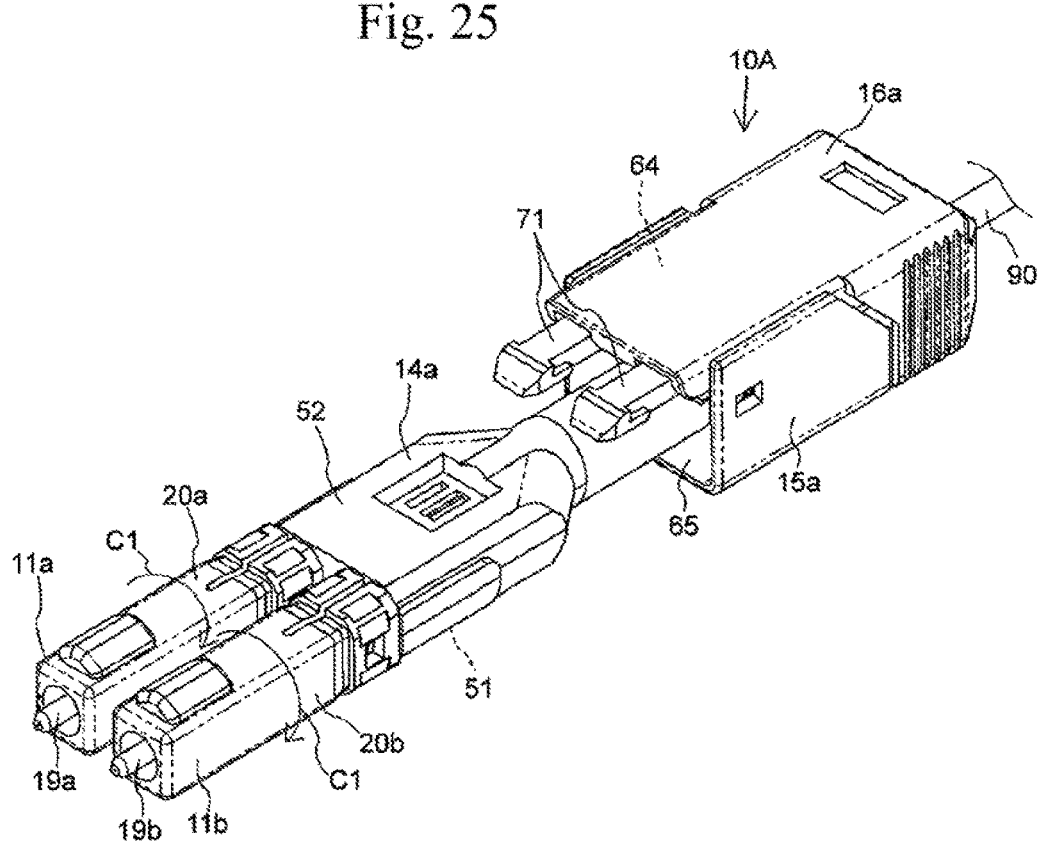
FIG. 25 is a perspective view explaining the following procedure continued from FIG. 24.
Figure 26:
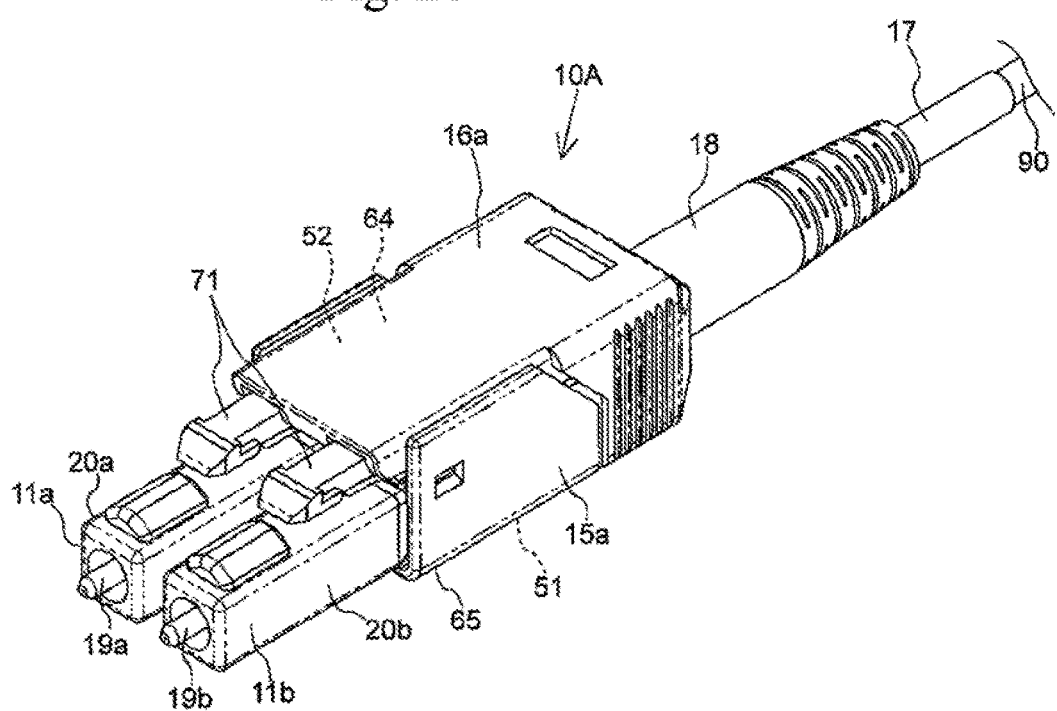
FIG. 26 is a perspective view showing a state after the first and second optical connector assemblies are rotated by a half-rotation (180°).

FIG. 23 is a perspective view for explaining a procedure of rotating the first and second optical connector assemblies 11a, 11b. FIG. 24 is a perspective view explaining the following procedure continued from FIG. 23. FIG. 25 is a perspective view explaining the following procedure continued from FIG. 24. FIG. 26 is a perspective view showing a state after the first and second optical connector assemblies 11a, 11b are rotated by a half-rotation (180°). The procedure of rotating the first and second optical connector assemblies 11a, 11b of the optical connector plug 10A will be explained below.

The engagement between the guide recesses 38 formed on the first and second plug frames 20a, 20b and the engagement claws 72 formed on the top wall 64 of the second casing 15a is released, and the first casing 14a is drawn out forward in the axial direction from the second casing 15a as shown in FIG. 23. After the first casing 14a is drawn out from the second casing 15a, the first optical connector assembly 11a (one of the optical connector assemblies) is rotated in the clockwise direction as shown as an arrow C1 in FIG. 23, for example.

In the optical connector plug 10A, when the first optical connector assembly 11a (one of the connector assemblies) is rotated around its axis in the clockwise direction, the first gear 12a (one of the gears) is rotated in the clockwise direction and the intermediate gear 13 is rotated in the counterclockwise direction by the rotation of the first gear 12a.

The rotational force (rotation) of the first gear 12a is transmitted to the second gear 12b (the other of the gears) by the intermediate gear 13, and the second gear 12b is rotated around its axis interlockingly with the first gear 12a in the same clockwise direction (same direction) as the first gear 12a. Thereby, the second optical connector assembly 11b is rotated in the clockwise direction. Since the gear ratio of the gears 12a, 12b, 13 is 1:1:1, when the first optical connector assembly 11a is rotated in the clockwise direction, the second optical connector assembly 11b (the other of the optical connector assemblies) is rotated in the clockwise direction by the same rotating angle as the first optical connector assembly 11a. When the second optical connector assembly 11b (one of the optical connector assemblies) is rotated in the rotated in the clockwise direction, the first optical connector assembly 11a (the other of the optical connector assemblies) is rotated in the clockwise direction by the same rotating angle as the second optical connector assembly 11b.

The rotational force of the first and second gears 12a, 12b rotatably housed in the first and second gear housing portions 59, 60 is transmitted from one of the first and second gears 12a, 12b to the other of the gears 12a, 12b via the intermediate gear 13 rotatably housed in the intermediate gear housing portion 61. Thus, by using the gears 12a, 12b, 13, the other of the optical connector assemblies 11a, 11b can be rotated in the same direction as the one of the optical connector assemblies 11a, 11b.

In addition, since the gear ratio of the gears 12a, 12b, 13 is 1:1:1, when one of the first and second optical connector assemblies 11a, 11b is rotated, the other of the optical connector assemblies 11a, 11b is rotated at the same rotating angle as the one of the optical connector assemblies 11a, 11b. Thus, the rotation range from the starting point to the finishing point of the rotation can be the same between the first and second optical connector assemblies 11a, 11b. When one of the optical connector assemblies 11a, 11b is rotated, the other of the optical connector assemblies 11a, 11b can be rotated to the same position as the one of the optical connector assemblies 11a, 11b.

In a state shown in FIG. 23, when the first and second optical connector assemblies 11a, 11b are rotated in the clockwise direction by a half-rotation (180°) (half-rotation from the starting point to the finishing point), the abutting projection 50 (rotating angle regulating unit) formed on the intermediate portion 45 of the first stop ring 21a abuts on the rotation regulating projection 57a (rotating angle regulating unit) formed on the first opening 55a of the first casing 14a. In addition, the abutting projection 50 (rotating angle regulating unit) formed on the intermediate portion 45 of the second stop ring 21b abuts on the rotation regulating projection 57a (rotating angle regulating unit) formed on the second opening 55b of the first casing 14a. Thus, the rotation of the first and second optical connector assemblies 11a, 11b in the clockwise direction is stopped.

After the first and second optical connector assemblies 11a, 11b are rotated in the clockwise direction by a half-rotation (180°) until the state shown in FIG. 24, the second casing 15a (including the slider 16a) is rotated in the clockwise direction (or counterclockwise direction) by a half-rotation (180°) as shown as the arrow mark C2 in FIG. 24. When the second casing 15a is rotated by a half-rotation (180°), the top wall 64 of the second casing 15a is positioned at the bottom wall 52 side of the first casing 14a and the bottom wall 65 of the second casing 15a is positioned at the top wall 51 side of the first casing 14a as shown in FIG. 25.

Then, the second casing 15a is moved forward in the longitudinal direction toward the first casing 14a, the first casing 14a is housed inside the second casing 15a so that the bottom wall 52 of the first casing 14a faces to the top wall 64 of the second casing 15a and the top wall 51 of the first casing 14a faces to the bottom wall 65 of the second casing 15a, and the guide recesses 38 are engaged with the engagement claws 72. The polarity reversal method for reversing the polarity of the duplex optical connector plug 10A is performed by simultaneously rotating the first and second optical connector assemblies 11a, 11b in the clockwise direction by a half-rotation (180°) from the state of FIG. 1 to the state of FIG. 26.

After the polarity of the duplex optical connector plug 10A is reversed, in the state shown in FIG. 26, the engagement between the guide recesses 38 and the engagement claws 72 is released, the first casing 14a is drawn out forward in the axial direction from the second casing 15a, and the second optical connector assembly 11b (one of the optical connector assemblies) is rotated in the counterclockwise direction. When the second optical connector assembly 11b (one of the optical connector assemblies 11a, 11b) is rotated around its axis in the counterclockwise direction, the second gear 12b (one of the gears) is rotated in the counterclockwise direction, and the intermediate gear 13 is rotated in the clockwise direction by the rotation of the second gear 12b.

The rotational force (rotation) of the second gear 12b is transmitted to the first gear 12a (the other of the gears) by the intermediate gear 13, and the first gear 12a is interlockingly rotated around its axis in the counterclockwise direction which is the same direction as the second gear 12b. Thereby, the first optical connector assembly 11a is rotated in the counterclockwise direction. Since the gear ratio of the gears is 1, when the second optical connector assembly 11b is rotated in the counterclockwise direction, the first optical connector assembly 11a is rotated in the counterclockwise direction by the same rotating angle as the second optical connector assembly 11b. When the first optical connector assembly 11a (one of the optical connector assemblies) is rotated in the counterclockwise direction, the second optical connector assembly 11b (the other of the optical connector assemblies) is rotated in the counterclockwise direction by the same rotating angle as the first optical connector assembly 11a.

When the first and second optical connector assemblies 11a, 11b are rotated in the counterclockwise direction by a half-rotation (180°), the abutting projection 50 (rotating angle regulating unit) abuts on the rotation regulating projection 57a (rotating angle regulating unit). Thus, the rotation of the first and second optical connector assemblies 11a, 11b in the counterclockwise direction is stopped. After the first and second optical connector assemblies 11a, 11b are rotated in the counterclockwise direction by a half-rotation (180°), the second casing 15a (including the slider 16a) is rotated in the counterclockwise direction (or the clockwise direction) by a half-rotation (180°). When the second casing 15a is rotated by a half-rotation (180°), the top wall 64 of the second casing 15a is positioned at the top wall 51 side of the first casing 14a and the bottom wall 65 of the second casing 15a is positioned at the bottom wall 52 side of the first casing 14a.

Then, the second casing 15a is moved forward in the longitudinal direction toward the first casing 14a, the first casing 14a is housed inside the second casing 15a so that the top wall 51 of the first casing 14a faces to the top wall 64 of the second casing 15a and the bottom wall 52 of the first casing 14a faces to the bottom wall 65 of the second casing 15a, and the guide recesses 38 are engaged with the engagement claws 72. The polarity reversal method for reversing the polarity of the duplex optical connector plug 10A is performed by simultaneously rotating the first and second optical connector assemblies 11a, 11b in the counterclockwise direction by a half-rotation (180°) from the state of FIG. 26 to the state of FIG. 1.

By performing the polarity reversal method, when one of the first and second optical connector assemblies 11a, 11b is rotated around its axis from the starting point to the finishing point of the rotation by a half-rotation (180°), the other of the optical connector assemblies 11a, 11b is interlockingly rotated around its axis from the starting point to the finishing point of the rotation by a half-rotation (180°) in the same direction as the one of the optical connector assemblies 11a, 11b. Thereby, the polarity of the duplex optical connector plug 10A can be reversed from the state of FIG. 1 to the state of FIG. 26, and the polarity of the duplex optical connector plug 10A can be reversed from the state of FIG. 26 to the state of FIG. 1.

Figure 27:
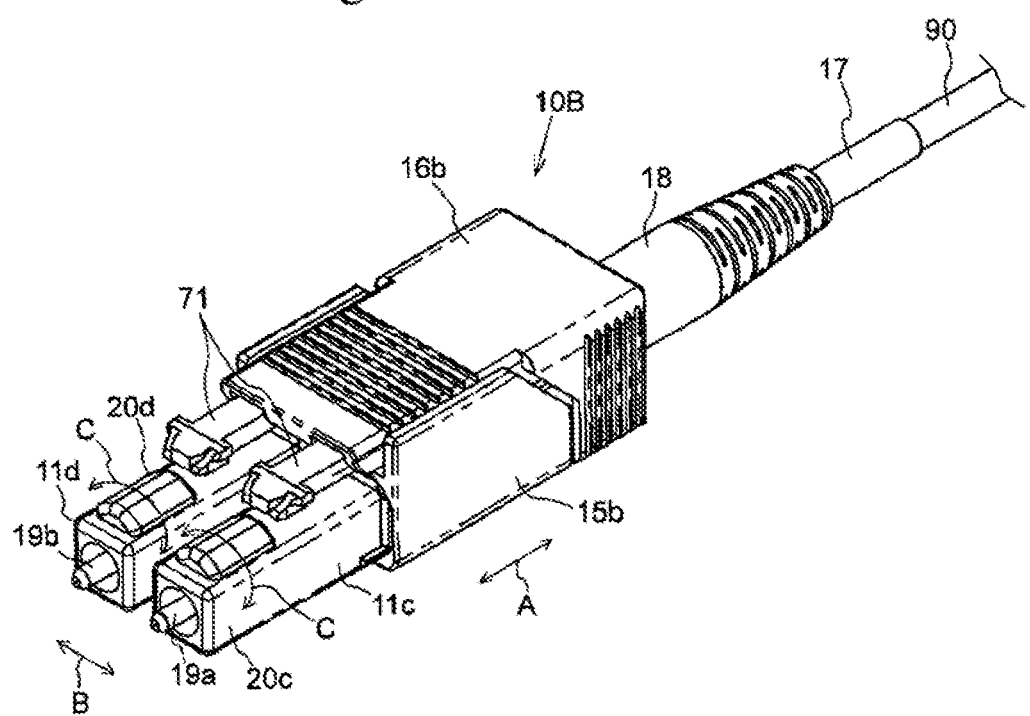
FIG. 27 is a perspective view of the duplex optical connector plug shown as another example.
Figure 28:
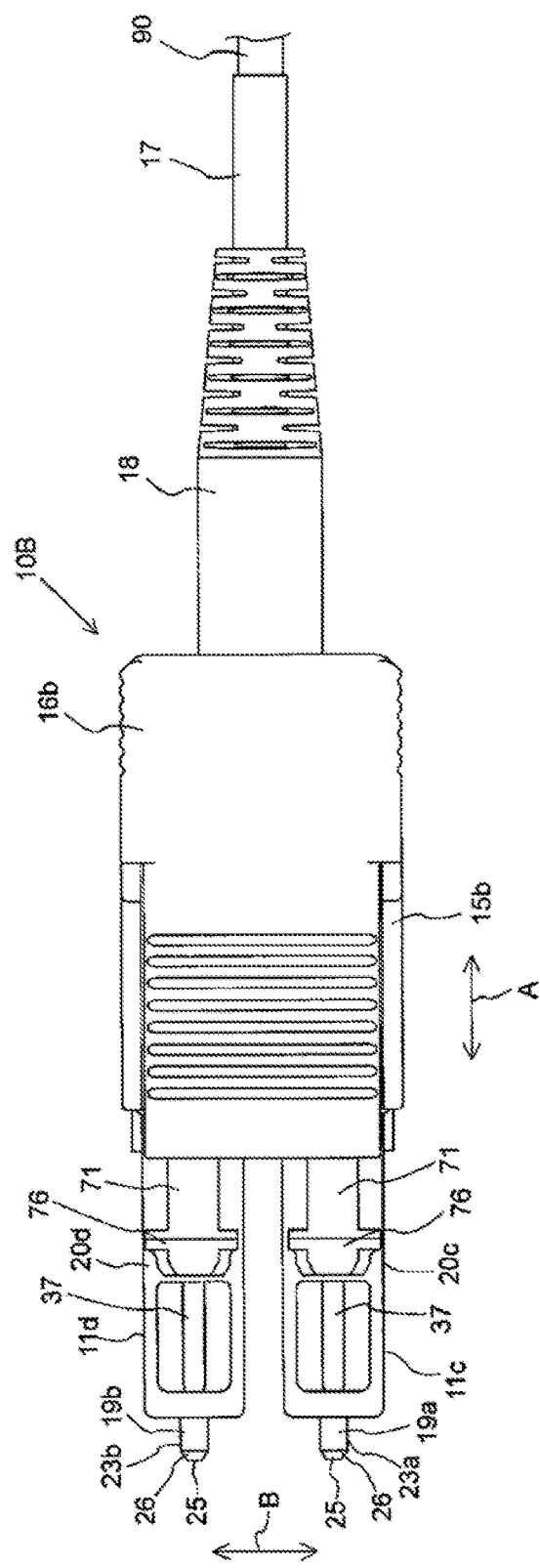
FIG. 28 is a top view of the duplex optical connector plug of FIG. 27.
Figure 29:
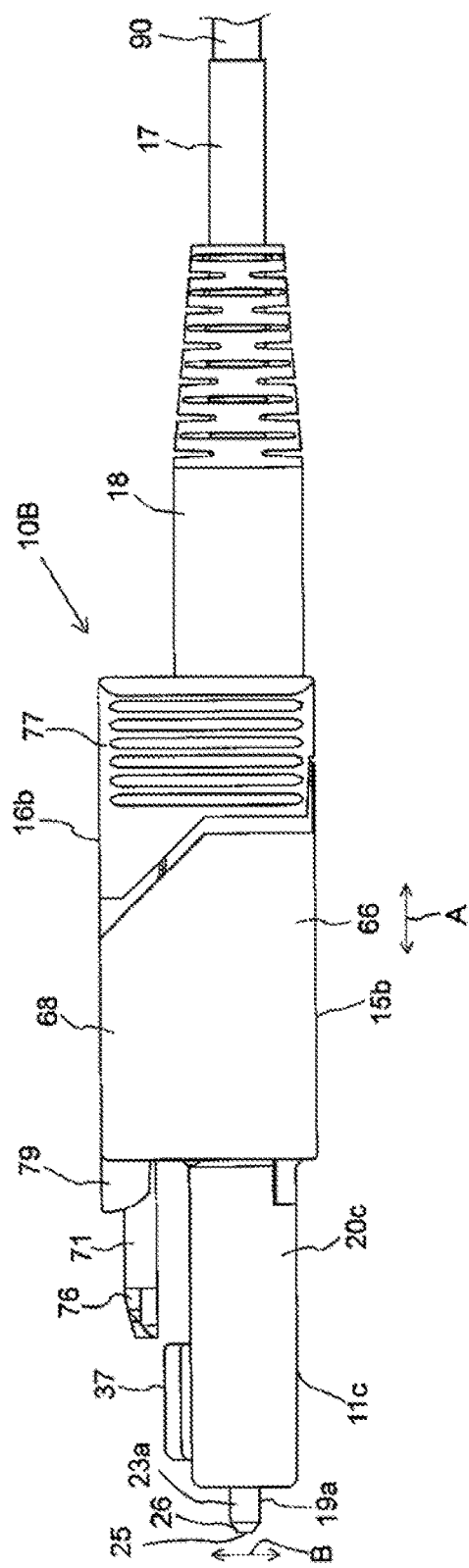
FIG. 29 is a side view of the duplex optical connector plug of FIG. 27.
Figure 30:
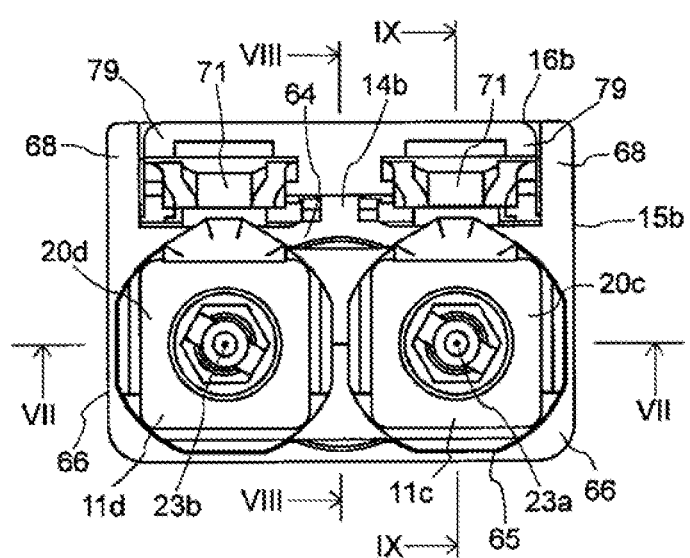
FIG. 30 is a front view of the duplex optical connector plug of FIG. 27.
Figure 31:
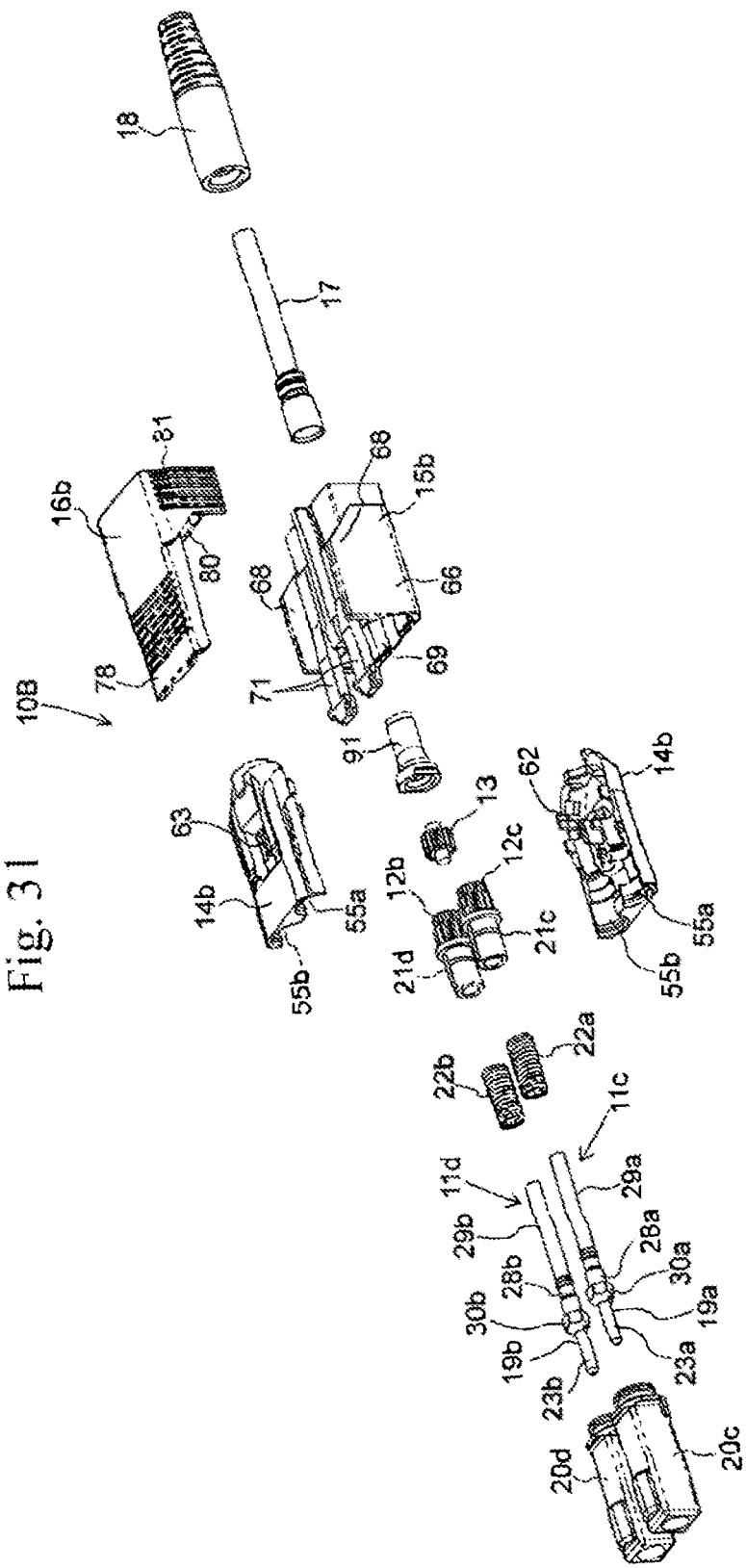
FIG. 31 is an exploded perspective view of the duplex optical connector plug of FIG. 27.
Figure 32:
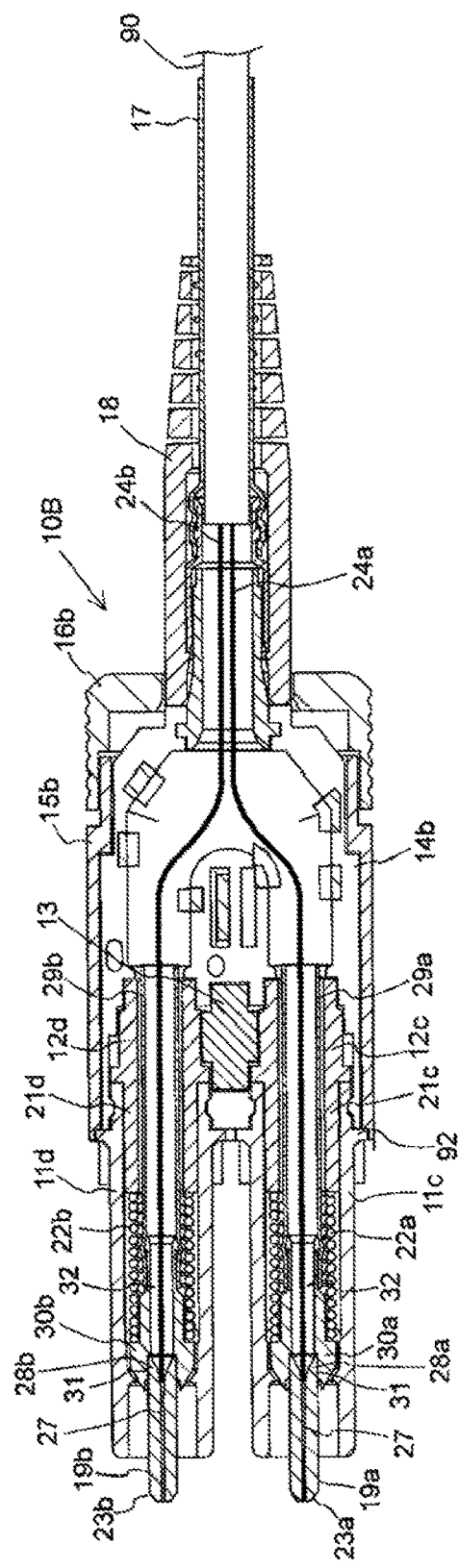
FIG. 32 is a cross-sectional view cut along an arrow VII-VII in FIG. 30.
Figure 33:
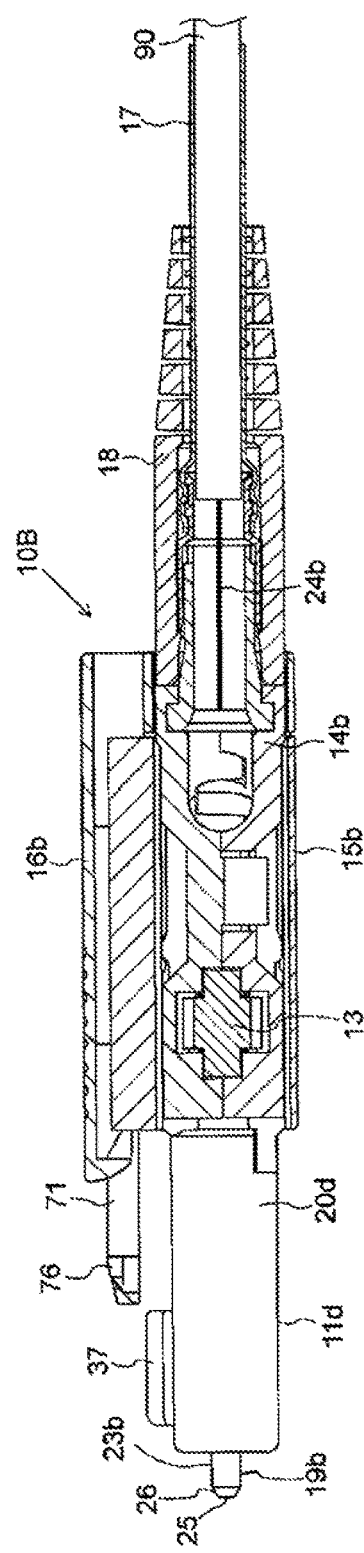
FIG. 33 is a cross-sectional view cut along an arrow VIII-VIII in FIG. 30.
Figure 34:
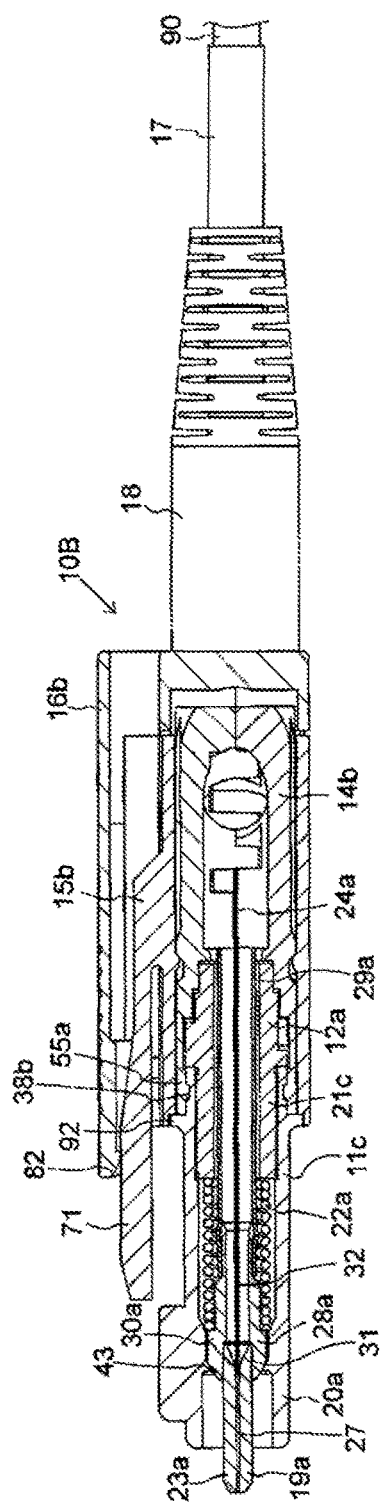
FIG. 34 is a cross-sectional view cut along an arrow IX-IX in FIG. 30.

FIG. 27 is a perspective view of a duplex optical connector plug 10B shown as another example. FIG. 28 is a top view of the duplex optical connector plug 10B. FIG. 29 is a side view of the duplex optical connector plug 10B. FIG. 30 is a front view of the duplex optical connector plug 10B. FIG. 31 is an exploded perspective view of the duplex optical connector plug 10B. FIG. 32 is a cross-sectional view cut along an arrow VII-VII in FIG. 30. FIG. 33 is a cross-sectional view cut along an arrow VIII-VIII in FIG. 30. FIG. 34 is a cross-sectional view cut along an arrow IX-IX in FIG. 30.

Figure 35:
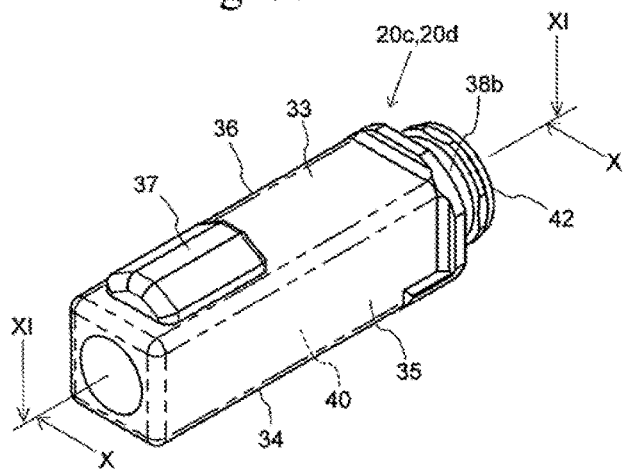
FIG. 35 is a perspective view of the first and second plug frames shown as another example.
Figure 36:
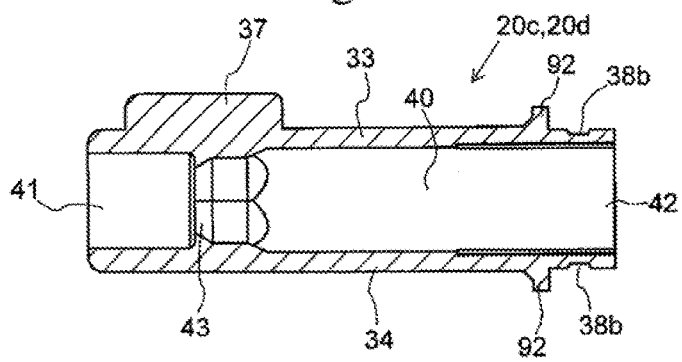
FIG. 36 is a cross-sectional view cut along an arrow X-X in FIG. 35.
Figure 37:
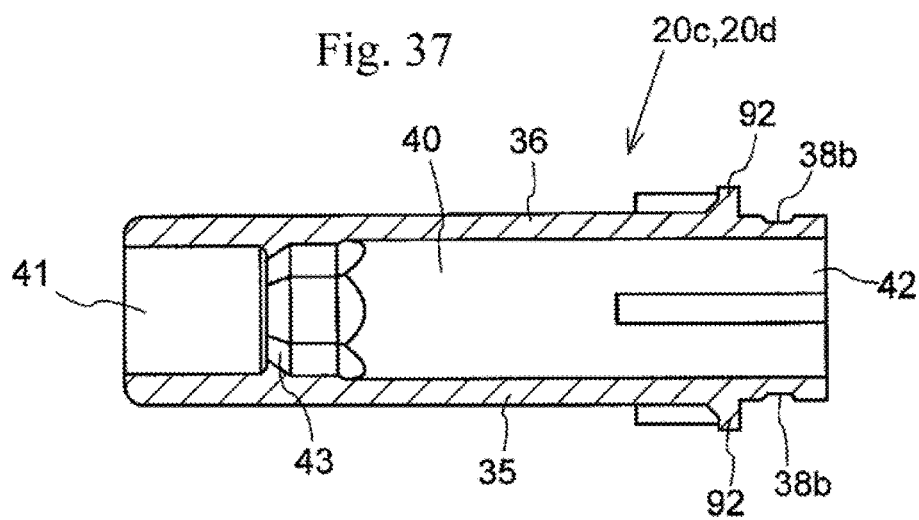
FIG. 37 is a cross-sectional view cut along an arrow XI-XI in FIG. 35.
Figure 38:
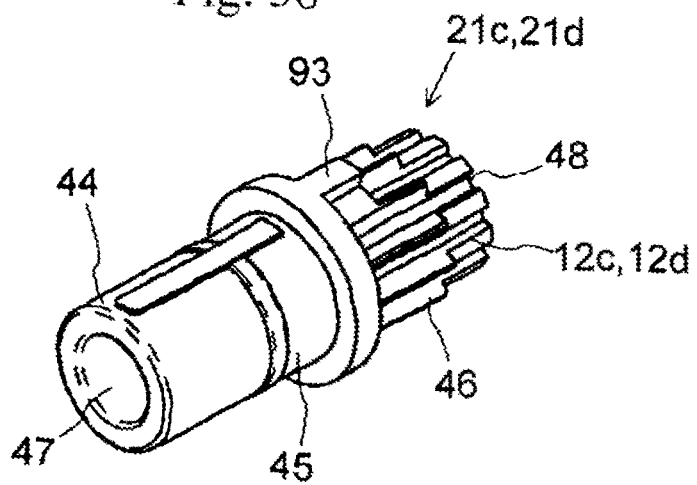
FIG. 38 is a perspective view of the first and second stop rings shown as another example.
Figure 39:
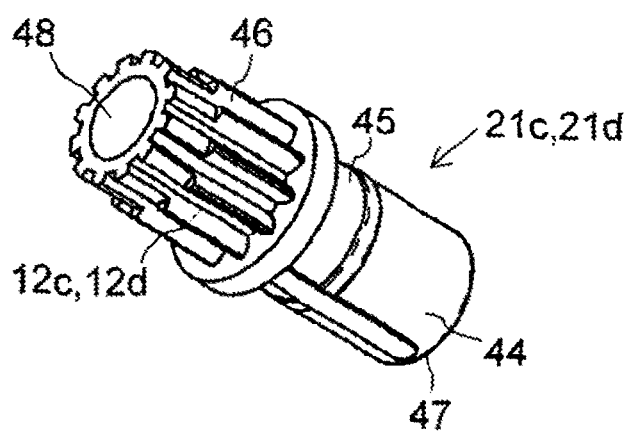
FIG. 39 is a perspective view of the first and second stop rings from another direction.

FIG. 35 is a perspective view of the first and second plug frames 20c, 20d. FIG. 36 is a cross-sectional view cut along an arrow X-X in FIG. 35. FIG. 37 is a cross-sectional view cut along an arrow XI-XI in FIG. 35. FIG. 38 is a perspective view of first and second stop rings 21c, 21d. FIG. 39 is a perspective view of the first and second stop rings 21c, 21d from another direction. In FIG. 27 to FIG. 29, the axial direction is shown as by an arrow A, the radial direction (lateral direction or vertical direction) is show by an arrow B, and a circumferential direction is shown by an arrow C.

Same as the optical connector plug 10A, the duplex optical connector plug 10B is used for an optical connection between the optical fibers by attaching the duplex optical connector plug 10B to an optical connector adapter (not illustrated). The optical connector plug 10B is formed by a first optical connector assembly 11c, a second optical connector assembly 11d, a first gear 12c, a second gear 12d, an intermediate gear 13, a first casing 14b, a second casing 15b, a slider 16b, a caulking ring 17, a boot 18 and a pipe 91. In the optical connector plug 10B, as shown in the exploded perspective view of FIG. 31, the first and second casings 14b, 15b, the pipe 91 and the slider 16b are arranged on the rear side of the first and second optical connector assemblies 11c, 11d in the axial direction, and the caulking ring 17 and the boot 18 are arranged on the rear side of the slider 16b.

The first optical connector assembly 11c includes a first ferrule 19a extending in the axial direction, a first plug frame 20c for housing the first ferrule 19a, a first stop ring 21c which is engageably inserted into the first plug frame 20c, and a first spring 22a (coil spring). The first ferrule 19a and the first spring 22a are same as those of the optical connector plug 10A.

The first plug frame 20c is made of a synthetic resin material and formed in an approximately square columnar shape having a hollow. The first plug frame 20c includes a top wall 33 and a bottom wall 34 which are separately facing each other in the vertical direction and extending in the axial direction. The first plug frame 20c also includes side walls 35, 36 which are separately facing each other in the lateral direction and extending in the axial direction. A guide projection 37 extending in the axial direction is formed on the top wall 33 at the front side in the axial direction of the first plug frame 20c. A fitting recess 38b is formed on the walls 33 to 36 at the rear side in the axial direction of the first plug frame 20c to fit an opening projection 57b formed on the below described first opening 55a of the first casing 14b into the fitting recess 38b.

A ferrule housing space 40 surrounded by the walls 33 to 36 and extending in the axial direction is formed in the first plug frame 20c. A front end exposure opening 41 is opened in the first plug frame 20c to expose a tip end portion of the first capillary 23a. A rear end insertion opening 42 is opened in the first plug frame 20c to insert the second ferrule 19b. On the rear side in the axial direction of the front end exposure opening 41 of the first plug frame 20c, an abutting portion 43 is extended from an inner peripheral surface of the ferrule housing space 40 to inward in the radial direction.

The first flange 30a of the first sleeve 28a abuts on the abutting portion 43. Since the first flange 30a of the first sleeve 28a abuts on the abutting portion 43, the first sleeve 28a is prevented from being further moved to the front side in the axial direction with respect to the first plug frame 20c. An abutting flange 92 projecting outward in the radial direction of the walls 33 to 36 is formed on the walls 33 to 36 located near the rear end insertion opening 42 of the first plug frame 20c. The abutting flange 92 slidably abuts on the front end edge of the first opening 55a of the first casing 14b.

The first stop ring 21c is made of metal materials or synthetic resin materials. The first stop ring 21c is formed in an approximately cylindrical shape and extending in the axial direction. The first stop ring 21c includes a front end portion 44 (front end tube) located at the front side in the axial direction, a rear end portion 46 (rear end tube) located at the rear side in the axial direction, and an intermediate portion 45 (intermediate tube) extending between the front end portion 44 and the rear end portion 46. A core wire exposure opening 47 is opened on the front end portion 44 of the first stop ring 21c to expose the first optical fiber core wire. A core wire insertion opening 48 is opened on the rear end portion 46 to insert the first optical fiber core wire.

In the first stop ring 21c, the front end portion 44 and the intermediate portion 45 are pressed inside the first plug frame 20c from the rear end insertion opening 42 of the first plug frame 20c, and outer peripheral surfaces of the front end portion 44 and the intermediate portion 45 are in close contact with an inner peripheral surface of the first plug frame 20c. The first stop ring 21c is connected to the first plug frame 20c so as not to be detached from the first plug frame 20c. The first stop ring 21c is rotated along with the rotation of the first plug frame 20c.

The first spring 22a is arranged between the first ferrule 19a and the first stop ring 21c. The first spring 22a is inserted to the first core wire cover 29a and extending in the axial direction. A front end of the first spring 22a abuts on the first flange 30a of the first sleeve 28a, and a rear end of the first spring 22a abuts on the front end portion 44 of the first stop ring 21c. The first spring 22a biases the first ferrule 19a forward in the axial direction. The first gear 12c is formed on the rear end portion 46 of the first stop ring 21c and extending in the axial direction. An abutting projection 93 (rotating regulating unit) projected outward in the radial direction is formed on the first gear 12c. The abutting projection 93 is more projected outward in the radial direction compared to teeth of the first gear 12c.

The second optical connector assembly 11d includes a second ferrule 19b extending in the axial direction, a second plug frame 20d for housing the second ferrule 19b, a second stop ring 21d which is engageably inserted into the second plug frame 20d, and the second spring 22b (coil spring). The second ferrule 19b and the second spring 22b are same as those of the optical connector plug 10A.

The second plug frame 20d is made of a synthetic resin material and formed in an approximately square columnar shape having a hollow. The second plug frame 20d includes a top wall 33 and a bottom wall 34 which are separately facing each other in the vertical direction and extending in the axial direction. The second plug frame 20d also includes side walls 35, 36 which are separately facing each other in the lateral direction and extending in the axial direction. A guide projection 37 extending in the axial direction is formed on the top wall 33 at the front side in the axial direction of the second plug frame 20d. A fitting recess 38b is formed on the walls 33 to 36 at the rear side in the axial direction of the second plug frame 20d to fit an opening projection 57b formed on the second opening 55b of the first casing 14b into the fitting recess 38b.

A ferrule housing space 40 surrounded by the walls 33 to 36 and extending in the axial direction is formed in the second plug frame 20d. A front end exposure opening 41 is opened in the second plug frame 20d to expose a tip end portion of the second capillary 23b. A rear end insertion opening 42 is opened in the second plug frame 20d to insert the second ferrule 19b. On the rear side in the axial direction of the front end exposure opening 41 of the second plug frame 20d, an abutting portion 43 is extended from an inner peripheral surface of the ferrule housing space 40 to inward in the radial direction.

The second flange 30b of the second sleeve 28b abuts on the abutting portion 43. Since the second flange 30b of the second sleeve 28b abuts on the abutting portion 43, the second sleeve 28b is prevented from being further moved to the front side in the axial direction with respect to the second plug frame 20d. An abutting flange 92 projecting outward in the radial direction of the walls 33 to 36 is formed on the walls 33 to 36 located near the rear end insertion opening 42 of the second plug frame 20d. The abutting flange 92 slidably abuts on the front end edge of the second opening 55b of the first casing 14b.

The second stop ring 21d is laterally adjacent to the first stop ring 21c and extending in the axial direction in parallel with the first stop ring 21c. The second stop ring 21d is made of metal materials or synthetic resin materials. The second stop ring 21d is formed in an approximately cylindrical shape and extending in the axial direction. The second stop ring 21d includes a front end portion 44 (front end tube) located at the front side in the axial direction, a rear end portion 46 (rear end tube) located at the rear side in the axial direction, and an intermediate portion 45 (intermediate tube) extending between the front end portion 44 and the rear end portion 46. A core wire exposure opening 47 is opened on the front end portion 44 of the second stop ring 21d to expose the second optical fiber core wire. A core wire insertion opening 48 is opened on the rear end portion 46 to insert the second optical fiber core wire.

In the second stop ring 21d, the front end portion 44 and the intermediate portion 45 are pressed inside the second stop ring 21d from the rear end insertion opening 42 of the second stop ring 21d, and outer peripheral surfaces of the front end portion 44 and the intermediate portion 45 are in close contact with an inner peripheral surface of the second plug frame 20d. The second stop ring 21d is connected to the second plug frame 20d so as not to be detached from the second plug frame 20d. The second stop ring 21d is rotated along with the rotation of the second plug frame 20d.

The second spring 22b is arranged between the second ferrule 19b and the second stop ring 21d. The second spring 22b is inserted to the second core wire cover 29b and extending in the axial direction. A front end of the second spring 22b abuts on the second flange 30b of the second sleeve 28b, and a rear end of the second spring 22b abuts on the front end portion 44 of the second stop ring 21d. The second spring 22b biases the second ferrule 19b forward in the axial direction. The second gear 12d is formed on the rear end portion 46 of the second stop ring 21d and extending in the axial direction. An abutting projection 93 (rotating regulating unit) projected outward in the radial direction is formed on the second gear 12d. The abutting projection 93 is more projected outward in the radial direction compared to teeth of the second gear 12d.

The intermediate gear 13 is same as the intermediate gear of the optical connector plug 10A (shown in FIG. 13). The intermediate gear 13 is circumscribed to the first gear 12c and the second gear 12d to transfer a rotational force of one of the first and second gears 12c, 12d to the other of the gears and rotate the other of the gears in the same direction as the one of the gears. A gear ratio of the first gear 12c, the second gear 12d and the intermediate gear 13 is 1:1:1. When the first gear 12c is rotated by one rotation in the clockwise direction, the intermediate gear 13 is rotated by one rotation in the counterclockwise direction and the second gear 12d is rotated by one rotation in the clockwise direction. On the contrary, when the first gear 12c is rotated by one rotation in the counterclockwise direction, the intermediate gear 13 is rotated by one rotation in the clockwise direction and the second gear 12d is rotated by one rotation in the counterclockwise direction.

Figure 40:
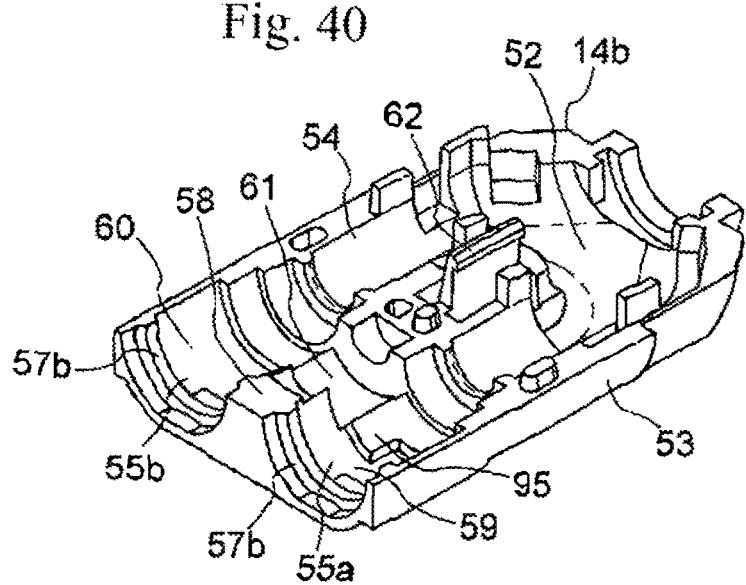
FIG. 40 is a perspective view of the first casing shown as another example.
Figure 41:
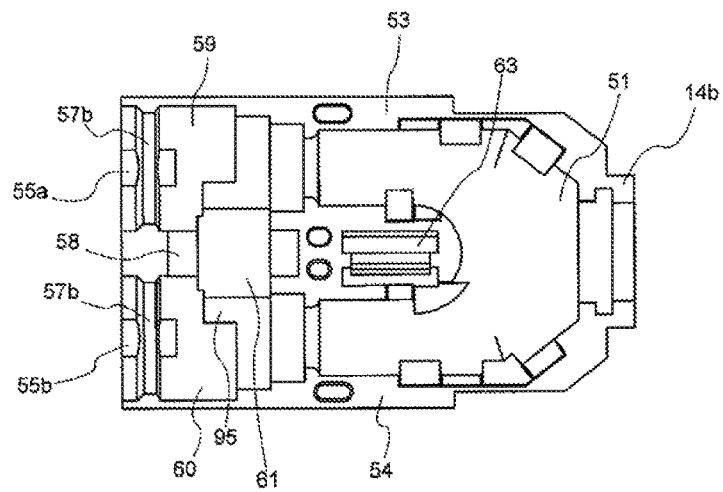
FIG. 41 is an inside view of the first casing of FIG. 40 in a state of being separated into two parts.
Figure 42:
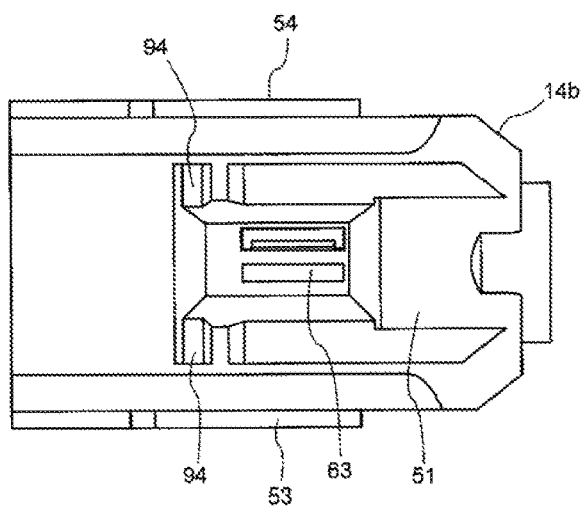
FIG. 42 is an outside view of the first casing of FIG. 40.

FIG. 40 is a perspective view of the first casing 14b in a state of being separated into two parts. FIG. 41 is an inside view of the first casing 14b in a state of being separated into two parts. FIG. 42 is an outside view of the top wall 51 of the first casing 14b. An outside view of the bottom wall 52 of the first casing 14b is same as FIG. 42. The first casing 14b is made of a synthetic resin material and formed in a hollow shape. The first casing 14b includes a top wall 51 and a bottom wall 52 which are separately facing each other in the vertical direction and extending in the axial direction. The first casing 14b also includes side walls 53, 54 which are separately facing each other in the lateral direction and extending in the axial direction. The first casing 14b also includes a first opening 55a opened at the front end of the first casing 14b to insert the first stop ring 21c, and a second opening 55b opened at the front end of the first casing 14b to insert the second stop ring 21d.

Engagement-insertion recesses 94 are formed on an approximately center of the top wall 51 of the first casing 14b to engageably insert the later described engagement-insertion projections 96 formed on an approximately center of the top wall 64 of the second casing 15b and formed on an approximately center of the bottom wall 65 of the second casing 15b. Engagement-insertion recesses 94 are formed on an approximately center of the bottom wall 52 of the first casing 14b to engageably insert the engagement-insertion projections 96 formed on an approximately center of the top wall 64 of the second casing 15b and formed on an approximately center of the bottom wall 65 of the second casing 15b (shown in FIG. 42).

An opening projection 57b projecting inward in the radial direction of the first opening 55a is formed on the first opening 55a of the first casing 14b. An opening projection 57b projecting inward in the radial direction of the second opening 55b is formed on the second opening 55b. Inside the first casing 14b, a first gear housing portion 59 surrounded by the walls 51 to 54 and a partition wall 58, a second gear housing portion 60 surrounded by the walls 51 to 54 and the partition wall 58, and an intermediate gear housing portion 61 surrounded by the partition walls 58 and located between the first and second gear housing portions 59, 60 are formed.

The first gear 12c formed on the rear end portion 46 of the first stop ring 21c is rotatably housed in the first gear housing portion 59. The second gear 12d formed on the rear end portion 46 of the second stop ring 21d is rotatably housed in the second gear housing portion 60. The intermediate gear 13 is rotatably housed in the intermediate gear housing portion 61. In the first casing 14b, the first and second gears 12c, 12d and the intermediate gear 13 are respectively housed in the first and second gear housing portions 59, 60 and the intermediate gear housing portion 61. Because of this, the gears 12c, 12d, 13 are laterally arranged, the first gear 12c and the intermediate gear 13 are circumscribed, and the second gear 12d and the intermediate gear 13 are circumscribed.

A rotation regulating projection 95 (rotating angle regulating unit) projecting inward in the radial direction of the housing portion 59 is formed on the first gear housing portion 59 (inner periphery surface of the first casing 14b). Since the abutting projection 93 formed on the first gear 12c abuts on the rotation regulating projection 95, the rotation of the first stop ring 21c (first plug frame 20c) is prevented. A rotation regulating projection 95 (rotating angle regulating unit) projecting inward in the radial direction of the housing portion 60 is formed on the second gear housing portion 60 (inner periphery surface of the first casing 14b). Since the abutting projection 93 formed on the second gear 12d abuts on the rotation regulating projection 95 of the second gear housing portion 60, the rotation of the second stop ring 21d (second plug frame 20d) is prevented.

The rotating angle of the first and second optical connector assemblies 11c, 11d (first and second stop rings 21c, 21d) is determined by a forming position of the rotation regulating projection 95 with respect to the first gear housing portion 59 and the second gear housing portion 60. In the optical connector plug 10B, the rotation range of the first and second optical connector assemblies 11c, 11d from a starting point to a finishing point of the rotation is limited to be a half-rotation (rotating angle is 180°).

As shown in FIG. 40, the first casing 14b is formed by connecting the first casings 14b which are separated into two parts in the vertical direction. When the casings 14b are connected, a fitting claw 62 formed on the lower casing 14b is engaged with a fitting hole 63 formed on the upper casing 14b. Thus, the casings 14b are integrated. The front end portion of the pipe 91 is engaged with the rear end portion of the first casing 14b.

Figure 43:
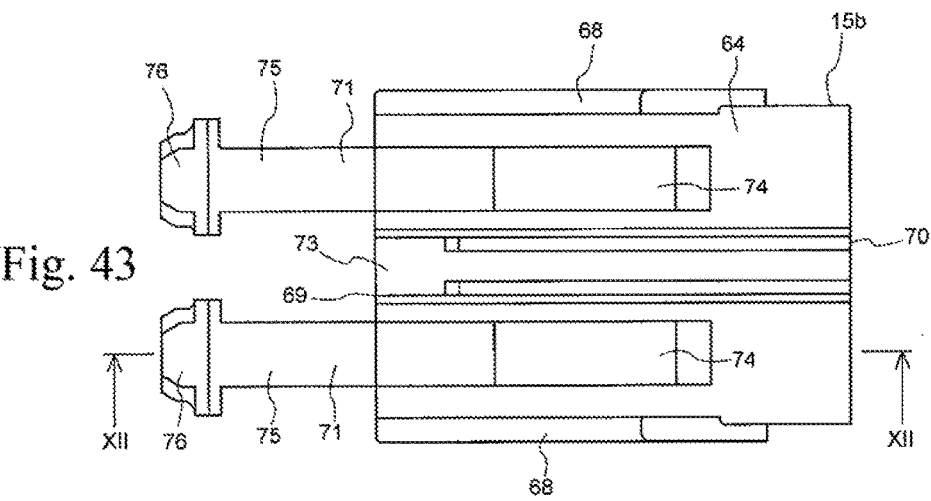
FIG. 43 is a top view of the second casing shown as another example.

FIG. 43 is a top view of the second casing 15b. FIG. 44 is a front view of the second casing 15b. FIG. 45 is a cross-sectional view cut along an arrow XII-XII in FIG. 43. The second casing 15b is made of a synthetic resin material. The second casing 15b includes a top wall 64 and a bottom wall 65 which are separately facing each other in the vertical direction and extending in the axial direction. The second casing 15a also includes side walls 66, 67 which are separately facing each other in the lateral direction and extending in the axial direction. The second casing 15a also includes a guide wall 68 extending upward from the side walls 66, 67 and extending in the axial direction.

The second casing 15b includes a front end opening 69 opened at the front end of the second casing 15b, a rear end opening 70 opened at the rear end of the second casing 15b, and a pair of engagement latches 71 located at the top wall 64 of the second casing 15b. At an approximately center of the top wall 64 of the second casing 15b, engagement-insertion projections 96 projected inward in the radial direction from the inner periphery surface of the top wall 64 are formed. At an approximately center of the bottom wall 65 of the second casing 15b, engagement-insertion projections 96 projected inward in the radial direction from the inner periphery surface of the bottom wall 65 are formed. At a tip of the center of the top wall 64 of the second casing 15b, an engagement-insertion key 73 extending in the axial direction is formed.

The engagement latches 71 are laterally separated with each other by a predetermined length and extending straightly in the axial direction in parallel with each other. The engagement latches 71 include a connection portion 74 connected to the top wall 64 of the second casing 15b and a free portion 75 extending in the axial direction from the connection portion 74 to be exposed (extended) from the front end opening 69 by a predetermined length forward in the axial direction. An engagement key 76 is formed on a tip of the free portion 75. The free portion 75 has a flexibility and capable of being elastically deformed downward.

The second casing 15b can house the first casing 14b in a state that the top wall 64 of the second casing 15b faces to the top wall 51 of the first casing 14b and the bottom wall 65 of the second casing 15b faces to the bottom wall 52 of the first casing 14b. On the contrary, the second casing 15b can house the first casing 14b in a state that the top wall 64 of the second casing 15b faces to the bottom wall 52 of the first casing 14b and the bottom wall 65 of the second casing 15b faces to the top wall 51 of the first casing 14b. The second casing 15b can house the first casing 14b in a state that the first casing 14b is vertically reversed.

Figure 47:
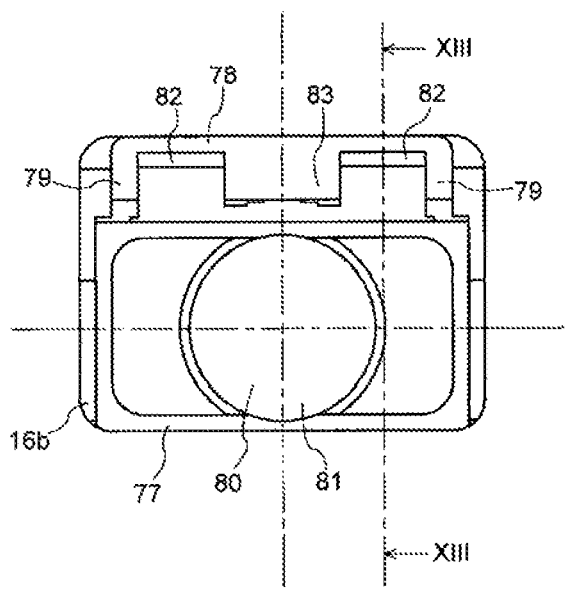
FIG. 47 is a front view of the slider of FIG. 46.
Figure 48:
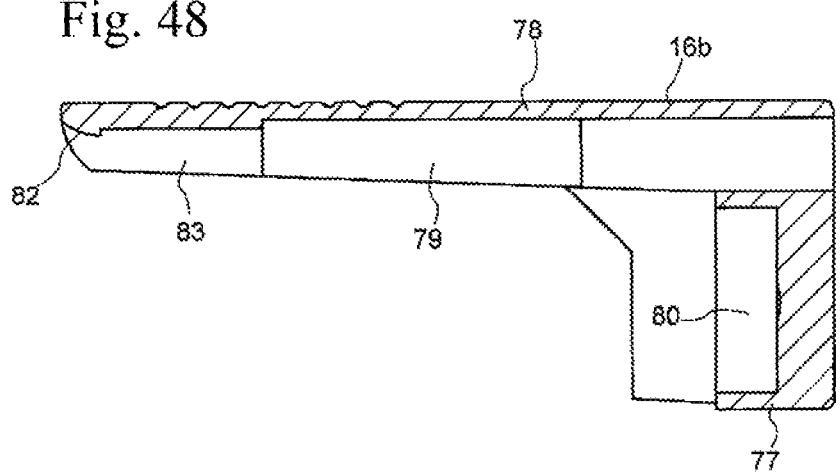
FIG. 48 is a cross-sectional view cut along an arrow XIII-XIII in FIG. 47.

FIG. 46 is a perspective view of the slider 16b. FIG. 47 is a front view of the slider 16b. FIG. 48 is a cross-sectional view cut along an arrow XIII-XIII in FIG. 47. The slider 16b is made of a synthetic resin material. The slider 16b includes a box 77 connected to the rear end portion of the second casing 15b, a sliding top wall 78 (sliding plate) extending forward in the axial direction from a top portion of the box 77, and a guide wall 79 extending downward and in the axial direction from both sides of the sliding top wall 78. The slider 16b includes a front end opening 80 opened at the front end of the box 77 and a rear end opening 81 opened at the rear end of the box 77. At both sides of the lower surface of the tip end portion of the sliding top wall 78, a pair of inclined planes 82 gradually inclined downward from the front end of the slider 16b to rearward in the axial direction is formed. At a center of the lower surface of the tip end portion of the sliding top wall 78, a key engagement portion 83 is formed to engageably insert the engagement-insertion key 73 of the top wall 64 of the second casing 15b.

The slider 16b is located at the rear side in the axial direction of the second casing 15b. The box 77 of the slider 16b is located at the rear side in the axial direction of the rear end portion of the second casing 15b. The slider 16b is connected to the second casing 15b slidably in the axial direction. In a state that the slider 16b is connected to the second casing 15b, the guide wall 79 of the slider 16b is located inside the guide wall 68 of the second casing 15b, the engagement-insertion key 73 is engageably inserted in the key engagement portion 83 of the sliding top wall 78 of the slider 16b, and the inclined planes 82 of the sliding top wall 78 of the slider 16b abuts on the upper surface of the engagement latches 71.

The slider 16b is slidable on an upper surface of the engagement latches 71 forward and backward in the axial direction. When the slider 16b is slid backward in the axial direction with respect to the second casing 15b, the inclined planes 82 of the slider 16b presses the engagement latches 71 downward and the inclined planes 82 pushes down the engagement latches 71.

The caulking ring 17 is located at the rear side in the axial direction of the pipe 91 engaged with the rear end portion of the first casing 14b. The front end portion of the caulking ring 17 is engaged with the rear end portion of the pipe 91 and inserted inside the boot 18 so that an inner peripheral surface of the caulking ring 17 is in close contact with an outer peripheral surface of the pipe 91. The boot 18 is connected to the first casing 14b via the pipe 91 and the caulking ring 17 so that an inner peripheral surface of the inner peripheral surface of the boot 18 is in close contact with an outer peripheral surface of the front end portion of the caulking ring 17. The first optical fiber core wire incorporating the first optical fiber 24a and the second optical fiber core wire incorporating the second optical fiber 24b are integrated into one in the first casing 14a to form an optical fiber cord 90. The optical fiber cord 90 is inserted in the caulking ring 17 and extended outward from the rear end of the caulking ring 17.

The procedure of rotating the first and second optical connector assemblies 11c, 11d of the optical connector plug 10B is approximately same as the procedure of the optical connector plug 10A. However, the procedure will be briefly explained below. While the second casing 15b is held, the first casing 14b is pressed forward in the axial direction to release the engagement between the engagement-insertion recesses 94 formed on the top wall 51 and the bottom wall 52 of the first casing 14b and the engagement-insertion projections 96 formed on the top wall 64 and the bottom wall 65 of the second casing 15b. Then, the first casing 14b drawn out forward in the axial direction from the second casing 15b. After the first casing 14b is drawn out from the second casing 15b, the first optical connector assembly 11a (one of the optical connector assemblies) is rotated in the clockwise direction, for example (shown in FIG. 23).

In the optical connector plug 10B, when the first optical connector assembly 11a (one of the optical connector assemblies) is rotated around its axis in the clockwise direction, the first gear 12c (one of the gears) is rotated in the clockwise direction and the intermediate gear 13 is rotated in the counterclockwise direction by the rotation of the first gear 12c. The rotational force (rotation) of the first gear 12c is transmitted to the second gear 12d (the other of the gears) by the intermediate gear 13, and the second gear 12d is rotated around its axis interlockingly with the first gear 12c in the same clockwise direction (same direction) as the first gear 12c. Thereby, the second optical connector assembly 11d is rotated in the clockwise direction.

Since the gear ratio of the gears 12c, 12d, 13 is 1:1:1, when the first optical connector assembly 11c is rotated in the clockwise direction, the second optical connector assembly 11d (the other of the optical connector assemblies) is rotated in the clockwise direction by the same rotating angle as the first optical connector assembly 11c. In the optical connector plug 10B, by using the gears 12c, 12d, 13, the other of the optical connector assemblies 11c, 11d can be rotated in the same direction as the one of the optical connector assemblies 11c, 11d. In addition, since the gear ratio of the gears 12c, 12d, 13 is 1:1:1, the rotation range from the starting point to the finishing point of the rotation can be the same between the first and second optical connector assemblies 11c, 11d. When one of the optical connector assemblies 11c, 11d is rotated, the other of the optical connector assemblies 11c, 11d can be rotated to the same position as the one of the optical connector assemblies 11c, 11d.

When the first and second optical connector assemblies 11c, 11d are rotated in the clockwise direction by a half-rotation (180°) (half-rotation from the starting point to the finishing point), the abutting projection 93 (rotating angle regulating unit) formed on the first and second gears 12c, 12d abuts on the rotation regulating projection 95 (rotating angle regulating unit) formed on the first and second gear housing portions 59, 60 of the first casing 14b. Thus, the rotation of the first and second optical connector assemblies 11c, 11d in the clockwise direction is stopped.

After the first and second optical connector assemblies 11c, 11d are rotated in the clockwise direction by a half-rotation (180°), the second casing 15b (including the slider 16b) is rotated in the clockwise direction (or the counterclockwise direction) by a half-rotation (180°) (shown in FIG. 24). When the second casing 15b is rotated by a half-rotation (180°), the top wall 64 of the second casing 15b is positioned at the bottom wall 52 side of the first casing 14b and the bottom wall 65 of the second casing 15b is positioned at the top wall 51 side of the first casing 14b.

Then, the second casing 15b is moved forward in the longitudinal direction toward the first casing 14b, the first casing 14b is pressed (housed) inside the second casing 15b so that the bottom wall 52 of the first casing 14b faces to the top wall 64 of the second casing 15b and the top wall 51 of the first casing 14b faces to the bottom wall 65 of the second casing 15b. Thus, the engagement-insertion projections 96 of the top wall 64 and the bottom wall 65 of the second casing 15b are engageably inserted in the engagement-insertion recesses 94 of the top wall 51 and the bottom wall 52 of the first casing 14b. The polarity reversal method for reversing the polarity of the duplex optical connector plug 10B is performed by simultaneously rotating the first and second optical connector assemblies 11c, 11d in the clockwise direction by a half-rotation (180°).

After the polarity of the duplex optical connector plug 10B is reversed, the engagement between the engagement-insertion recesses 94 and the engagement-insertion projections 96 is released, the first casing 14b is drawn out forward in the axial direction from the second casing 15b, and the second optical connector assembly 11d (one of the optical connector assemblies) is rotated in the counterclockwise direction. When the second optical connector assembly 11d (one of the optical connector assemblies) is rotated around its axis in the counterclockwise direction, the second gear 12d (one of the gears) is rotated in the counterclockwise direction, and the intermediate gear 13 is rotated in the clockwise direction by the rotation of the second gear 12d. The rotational force (rotation) of the second gear 12d is transmitted to the first gear 12c (the other of the gears) by the intermediate gear 13, and the first gear 12c is rotated around its axis interlockingly with the second gear 12d in the same counterclockwise direction (same direction) same as the second gear 12d. Thereby, the first optical connector assembly 11a is rotated in the counterclockwise direction.

Since the gear ratio of the gears is 1, when the second optical connector assembly 11d is rotated in the counterclockwise direction, the first optical connector assembly 11a is rotated in the counterclockwise direction by the same rotating angle as second optical connector assembly 11d. When the first and second optical connector assemblies 11c, 11d are rotated in the counterclockwise direction by a half-rotation (180°) (half-rotation from the starting point to the finishing point), the abutting projection 93 (rotating angle regulating unit) abuts on the rotation regulating projection 95 (rotating angle regulating unit). Thus, the rotation of the first and second optical connector assemblies 11c, 11d in the counterclockwise direction is stopped.

After the first and second optical connector assemblies 11c, 11d are rotated in the counterclockwise direction by a half-rotation (180°), the second casing 15b (including the slider 16b) is rotated in the clockwise direction (or the counterclockwise direction) by a half-rotation (180°). When the second casing 15b is rotated by a half-rotation, the top wall 64 of the second casing 15b is positioned at the top wall 51 side of the first casing 14b and the bottom wall 65 of the second casing 15b is positioned at the bottom wall 52 side of the first casing 14b.

Then, the second casing 15b is moved forward in the longitudinal direction toward the first casing 14b, the first casing 14b is pressed (housed) inside the second casing 15b so that the top wall 51 of the first casing 14b faces to the top wall 64 of the second casing 15b and the bottom wall 52 of the first casing 14b faces to the bottom wall 65 of the second casing 15b. Thus, the engagement-insertion projections 96 are engageably inserted in the engagement-insertion recesses 94. The polarity reversal method for reversing the polarity of the duplex optical connector plug 10B is performed by simultaneously rotating the first and second optical connector assemblies 11c, 11d in the counterclockwise direction by a half-rotation (180°).

By performing the polarity reversal method, when one of the first and second optical connector assemblies 11c, 11d is rotated around its axis from the starting point to the finishing point of the rotation by a half-rotation (180°), the other of the optical connector assemblies 11c, 11d is interlockingly rotated around its axis from the starting point to the finishing point of the rotation by a half-rotation (180°) in the same direction as the one of the optical connector assemblies 11c, 11d. Thereby, the polarity of the duplex optical connector plug 10B can be reversed.

In order to connect the duplex optical connector plug 10A, 10B with the optical connector adapter, the first and second optical connector assemblies 11a, 11b or the first and second optical connector assemblies 11c, 11d are inserted inside the optical connector adapter from insertion opening of the optical connector adapter. When the first and second optical connector assemblies 11a, 11b or the first and second optical connector assemblies 11c, 11d are inserted into the optical connector adapter, the free portion 75 of the engagement latches 71 extending forward in the axial direction from the top wall 64 of the second casings 15 enters in the optical connector adapter, the engagement key 76 of the free portion 75 of the engagement latches 71 is engaged with the key engagement portion of the optical connector adapter. Thus, the first and second optical connector assemblies 11a, 11b or the first and second optical connector assemblies 11c, 11d are maintained to be inserted in the optical connector adapter.

In the state that the engagement key 76 of the free portion 75 of the engagement latches 71 is engaged with the key engagement portion of the optical connector adapter, the sliders 16a, 16b are not slid backward in the axial direction with respect to the second casings 15a, 15b. In a state that the sliders 16a, 16b are not slid backward in the axial direction with respect to the second casings 15a, 15b, the engagement latches 71 are maintained to be engaged with the optical connector adapter. In order to release the connection between the optical connector plug 10 and the optical connector adapter, the slider 16a or the slider 16b is slid backward in the axial direction from the state that the engagement key 76 of the free portion 75 of the engagement latches 71 is engaged with the key engagement portion of the optical connector adapter.

When the slider 16a or the slider 16b is slid backward in the axial direction, the inclined planes 82 of the sliding top wall 78 of the sliders 16a, 16b pushes down the engagement latches 71. Thereby, the engagement key 76 of the free portion 75 of the engagement latches 71 is moved to the lower side of the key engagement portion of the optical connector adapter, and the engagement key 76 is removed from the key engagement portion of the optical connector adapter. Thus, the engagement state of the engagement key 76 of the free portion 75 of the engagement latches 71 with respect to the key engagement portion of the optical connector adapter is released. Since the engagement state of the engagement key 76 of the free portion 75 of the engagement latches 71 with respect to the key engagement portion of the optical connector adapter is released, the first and second optical connector assemblies 11a, 11b or the first and second optical connector assemblies 11c, 11d can be pulled out from the inside of the optical connector adapter.

In the duplex optical connector plugs 10A, 10B, when one of the first and second optical connector assemblies 11a, 11b or one of the first and second optical connector assemblies 11c, 11d is rotated around its axis in the clockwise direction or the counterclockwise direction, the other of the optical connector assemblies 11a, 11b, 11c, 11d is interlockingly and simultaneously rotated around its axis in the same direction (clockwise direction or counterclockwise direction) as the one of the optical connector assemblies 11a, 11b, 11c, 11d by the same rotating angle. Thus, only by rotating one of the first and second optical connector assemblies 11a, 11b or the first and second optical connector assemblies 11c, 11d, the other of the connector assemblies 11a, 11b, 11c, 11d can be simultaneously rotated in the same direction as the one of optical connector assemblies 11a, 11b, 11c, 11d by the same rotating angle.

In the duplex optical connector plugs 10A, 10B, the first and second optical connector assemblies 11a, 11b or the first and second optical connector assemblies 11c, 11d are simultaneously rotated in the same direction by the same rotating angle. Thus, the first and second optical connector assemblies 11a, 11b or the first and second optical connector assemblies 11c, 11d can be simultaneously rotated by one rotating operation (one action). Therefore, labor and time can be saved compared to the case of separately rotating the optical connector assemblies 11a, 11b or the first and second optical connector assemblies 11c, 11d.

In the duplex optical connector plugs 10A, 10B (polarity reversal method), the rotating angle of the first and second optical connector assemblies 11a, 11b or the first and second optical connector assemblies 11c, 11d from the starting point to the finishing point of the rotation is limited to the half-rotation (180°) by using the rotating angle regulating unit (abutting projection 50 and rotation regulating projection 57a, abutting projection 93 and rotation regulating projection 95). For example, when reversing the polarity of the optical connector assemblies 11a, 11b or the first and second optical connector assemblies 11c, 11d, the polarity of the optical connector plug 10A, 10B can be surely and accurately reversed by stopping the rotation at the position of being rotated by a half-rotation (180°) in the clockwise direction. On the contrary, the polarity of the optical connector plug 10A, 10B can be certainly and accurately returned to the original state by rotating the clockwisely rotated optical connector assemblies 11a, 11b or the first and second optical connector assemblies 11c, 11d in the counterclockwise direction by a half-rotation (180°).

In the duplex optical connector plugs 10A, 10B, for example, when reversing the polarity of the optical connector assemblies 11a, 11b or the first and second optical connector assemblies 11c, 11d, the polarity of the optical connector assemblies 11a, 11b or the first and second optical connector assemblies 11c, 11d can be reversed by rotating one of the first and second optical connector assemblies 11a, 11b or one of the first and second optical connector assemblies 11c, 11d. Otherwise, the polarity of the first and second optical connector assemblies 11c, 11d can be reversed by housing the first casings 14a, 14b in the second casing 15a, 15b in a state that the first casings 14a, 14b are vertically reversed.

In the polarity reversal method of the duplex optical connector plugs 10A, 10B, when one of the first and second optical connector assemblies 11a, 11b or the first and second optical connector assemblies 11c, 11d is rotated around its axis from the starting point to the finishing point of the rotation by a half-rotation (180°), the other of the optical connector assemblies 11a, 11b, 11c, 11d is interlockingly rotated around its axis in the same direction as the one of the optical connector assemblies 11a, 11b, 11c, 11d from the starting point to the finishing point of the rotation by a half rotation (180°). Thus, the polarity of the duplex optical connector plugs 10A, 10B can be reversed only by rotating one of the first and second optical connector assemblies 11a, 11b or the first and second optical connector assemblies 11c, 11d by a half-rotation (180°).

In the polarity reversal method, since the first and second optical connector assemblies 11a, 11b are simultaneously rotated in the same direction or the first and second optical connector assemblies 11c, 11d are simultaneously rotated in the same direction, the polarity of the optical connector plug 10A or the optical connector plug 10B can be reversed by one rotating operation (one action). Therefore, labor and time can be saved compared to the case of separately rotating the optical connector assemblies 11a, 11b or the first and second optical connector assemblies 11c, 11d to reverse the polarity of the optical connector plug 10A, 10B.

Figure 49:
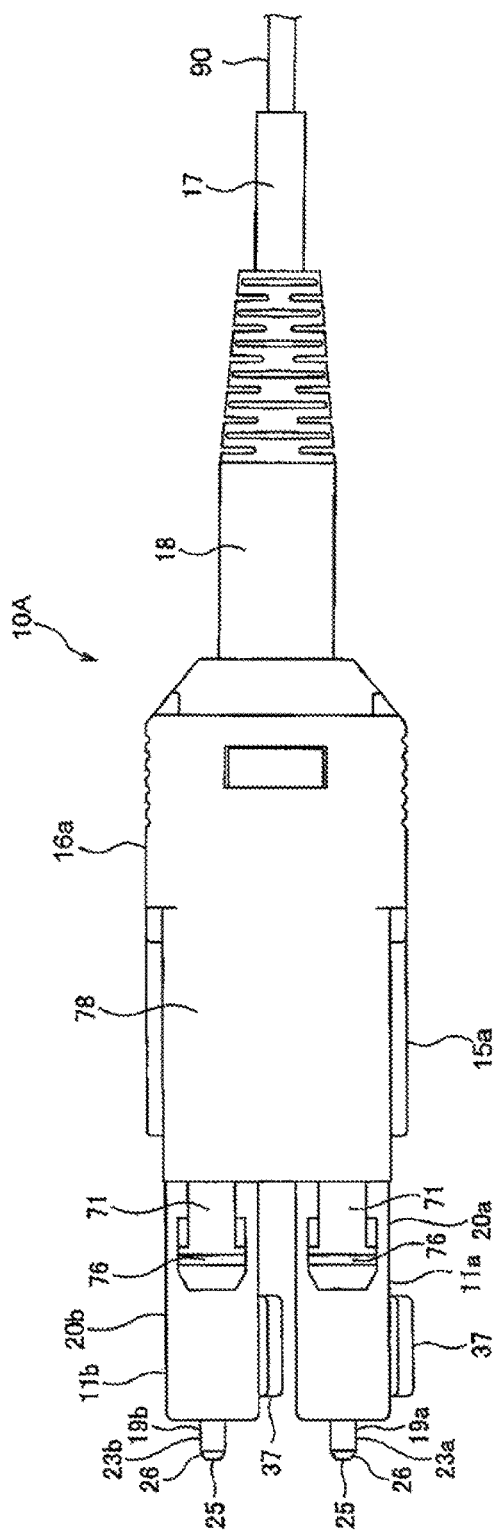
FIG. 49 is a top view showing a state that after the first and second optical connector assemblies are rotated by a quarter-rotation (90°).
Figure 50:
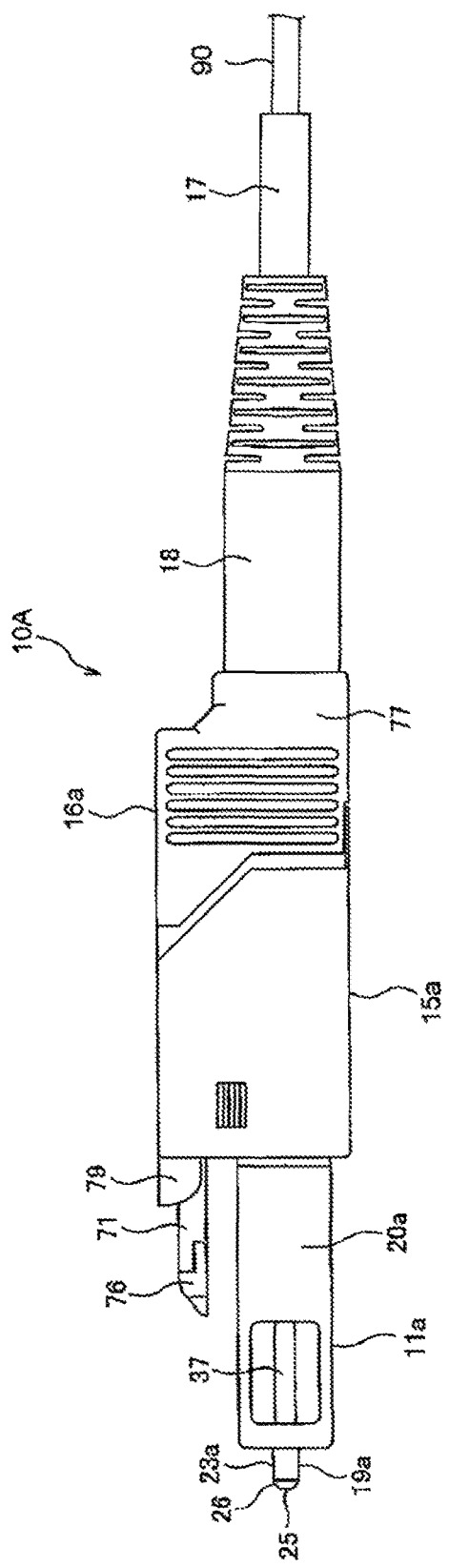
FIG. 50 is a side view in a state after the first and second optical connector assemblies are rotated by a quarter-rotation (90°).
Figure 51:
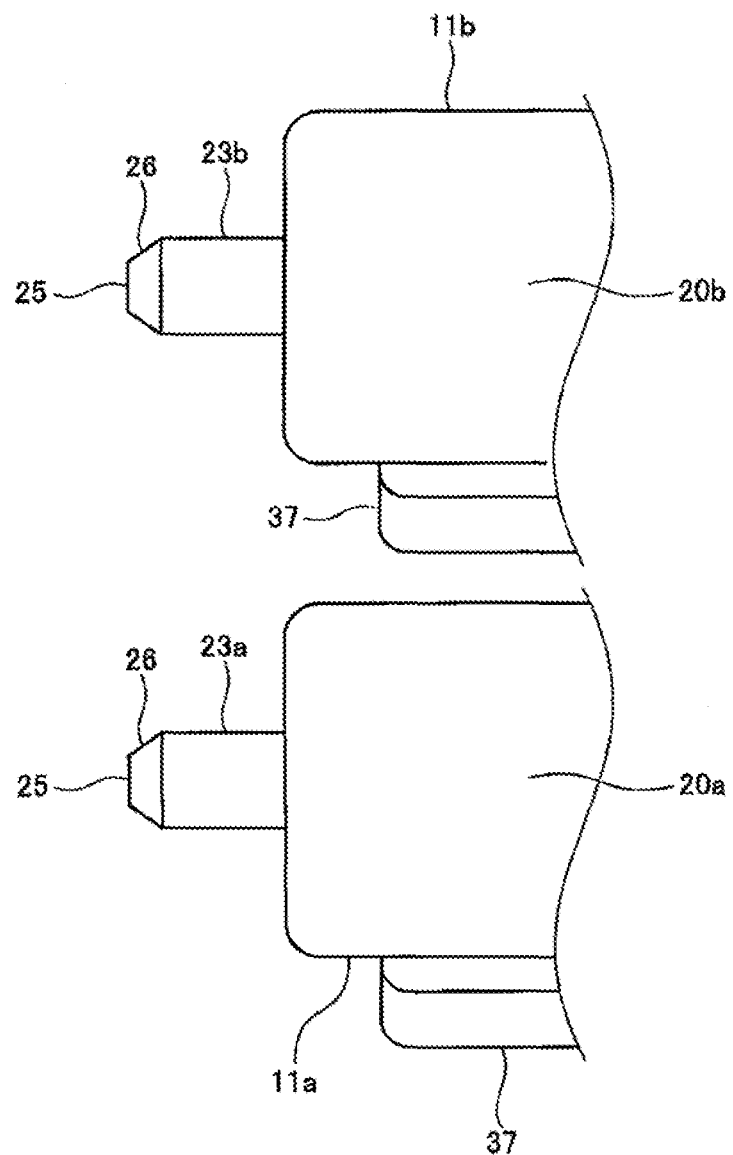
FIG. 51 is a partially enlarged view of first and second ferrules shown in the top view of FIG. 49.
Figure 52:
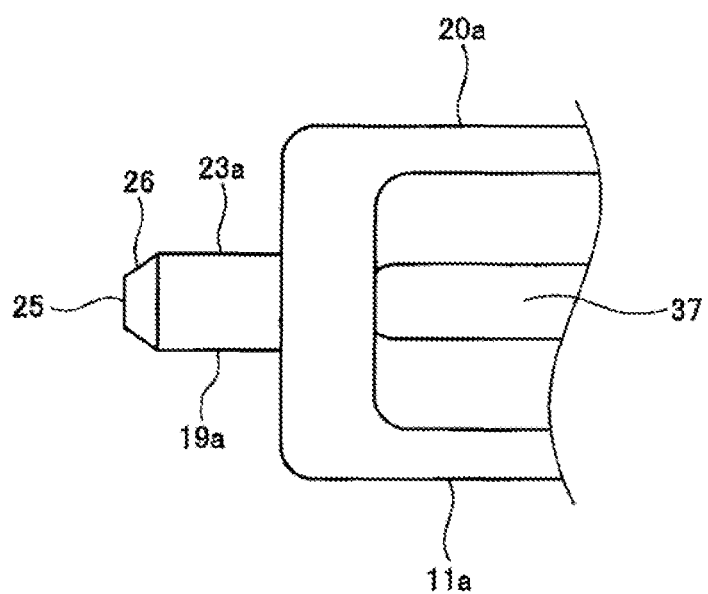
FIG. 52 is a partially enlarged view of the first ferrule shown in the side view of FIG. 50.

FIG. 49 is a top view showing a state that after the first and second optical connector assemblies 11a, 11b are rotated by a quarter-rotation (90°). FIG. 50 is a side view in a state after the first and second optical connector assemblies 11a, 11b are rotated by a quarter-rotation (90°). FIG. 51 is a partially enlarged view of the first and second ferrules 19a, 19b shown in the top view of FIG. 49. FIG. 52 is a partially enlarged view of the first ferrule 19a shown in the side view of FIG. 50. With reference to the above drawings (including FIGS. 53 to 59), the ferrule polishing method concerning the present invention will be explained in detail below. Although the ferrule polishing method is illustrated by using the optical connector plug 10A as an example in FIGS. 49 to 59, the ferrule polishing method using the optical connector plug 10B as an example is same as the method of using the optical connector plug 10A. Accordingly, the optical connector plug 10B is included in the following explanation of the ferrule polishing method.

In the ferrule polishing method, the capillary 23a, 23b of the first and second ferrules 19a, 19b of the optical connector plug 10A or the optical connector plug 10B are simultaneously polished by angled polishing (polished obliquely). In the first and second optical connector assemblies 11a, 11b of the optical connector plug 10 in the state of FIG. 1, for example, the first optical connector assembly 11a (one of the optical connector assemblies) is rotated around its axis in the clockwise direction by a quarter-rotation (90°) or the first optical connector assembly 11c (one of the optical connector assemblies) is rotated around its axis in the clockwise direction by a quarter-rotation (90°). Because of this, the first and second optical connector assemblies 11a, 11b or the first and second optical connector assemblies 11c, 11d are rotated in the clockwise direction by a quarter-rotation (90°) as shown in FIGS. 49, 50. Before polishing the first and second ferrules 19a, 19b by angled polishing, the tip surface 25 of the first and second ferrules 19a, 19b is a surface extending perpendicularly to the radial direction.

When the first optical connector assembly 11a (one of the optical connector assemblies) or the first optical connector assembly 11c (one of the optical connector assemblies) is rotated around its axis from the starting point of the rotation in the clockwise direction by a quarter-rotation (90°), the first gear 12a (one of the gears) or the first gear 12c (one of the gears) is rotated in the clockwise direction, and the intermediate gear 13 is rotated in the counterclockwise direction by the rotation of the first gear 12a or the first gear 12c. The rotational force (rotation) of the first gear 12a or the first gear 12c is transmitted to the second gear 12b (the other of the gears) or the second gear 12d (the other of the gears) by the intermediate gear 13, and the second gear 12b, 12d is rotated around its axis interlockingly with the first gear 12a, 12c in the clockwise direction which is the same direction as the first gear 12a, 12c. Thereby, the second optical connector assembly 11b or the second optical connector assembly 11d is rotated from the starting point of the rotation in the clockwise direction by a quarter-rotation (90°).

Figure 53:
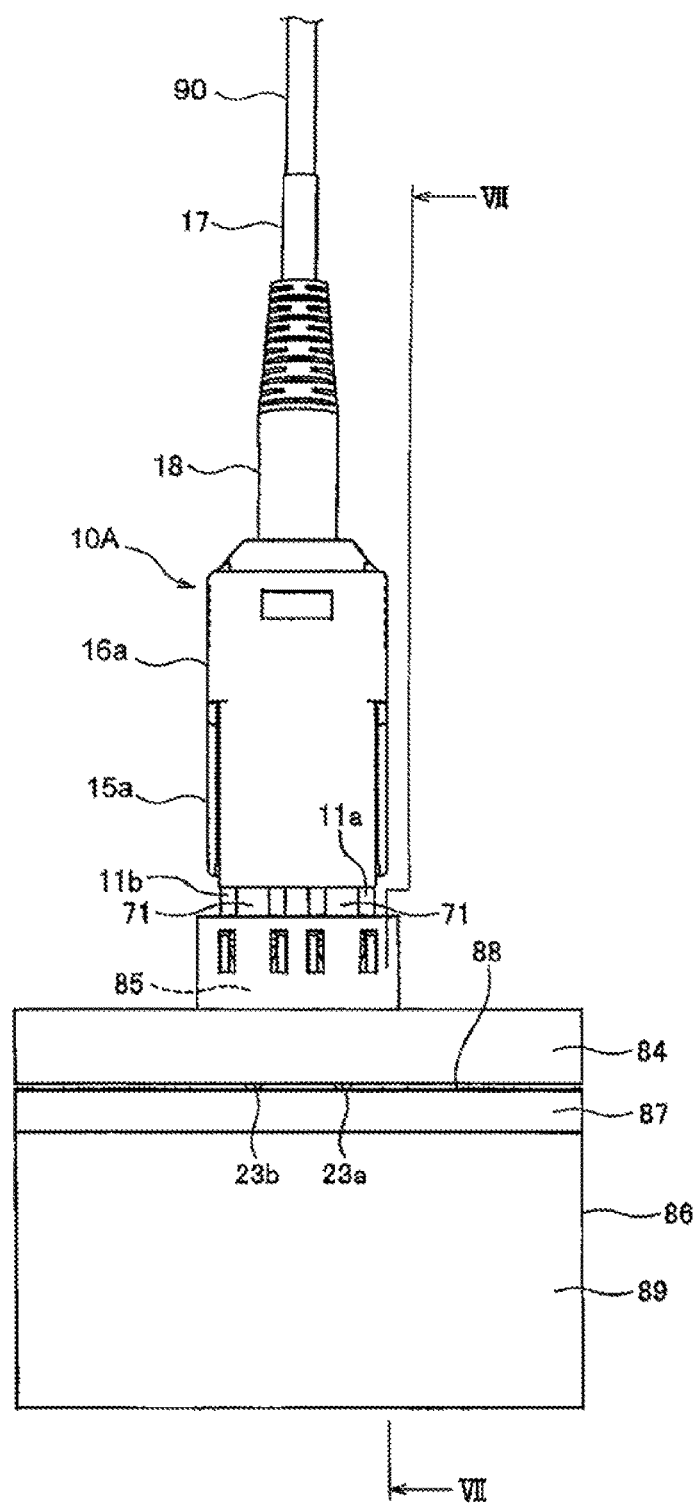
FIG. 53 is a top view of the optical connector plug in a state of being installed on an optical fiber ferrule polishing holder.
Figure 54:
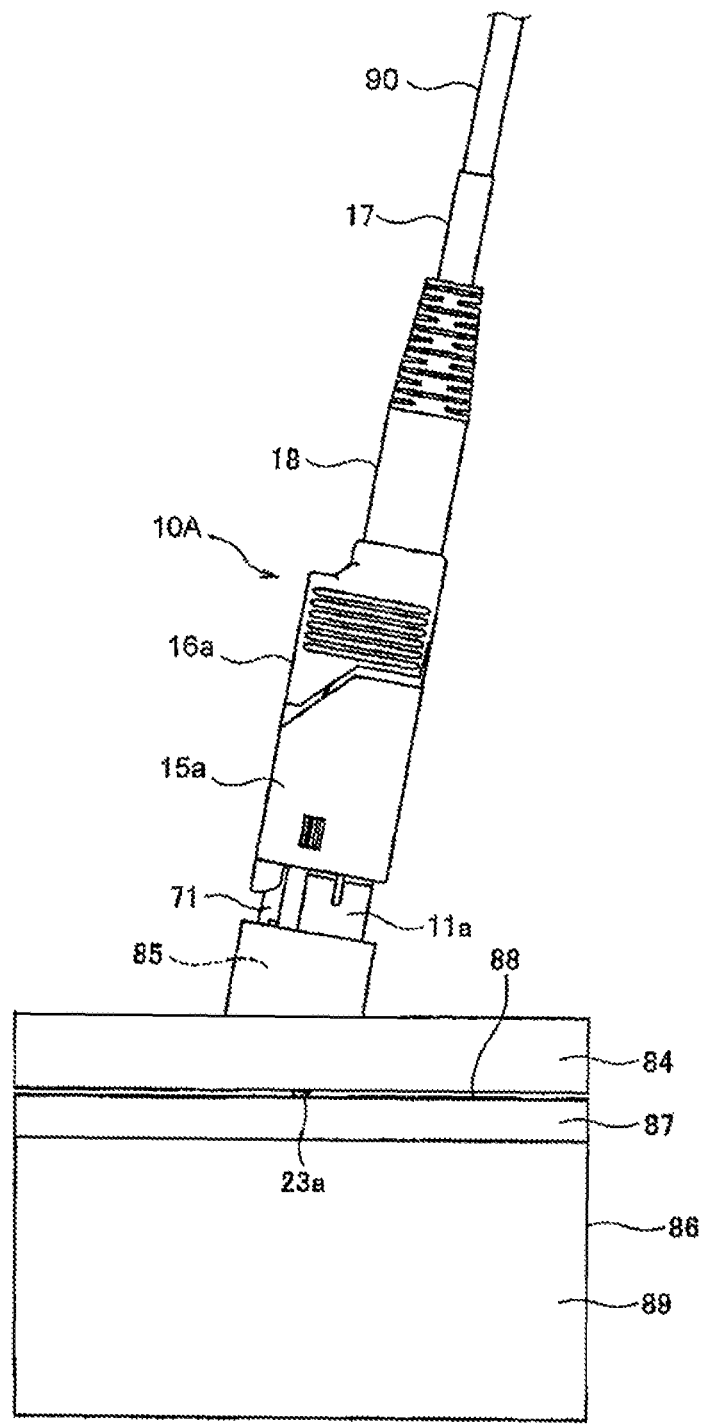
FIG. 54 is a side view of the optical connector plug in a state of being installed on the optical fiber ferrule polishing holder.
Figure 55:
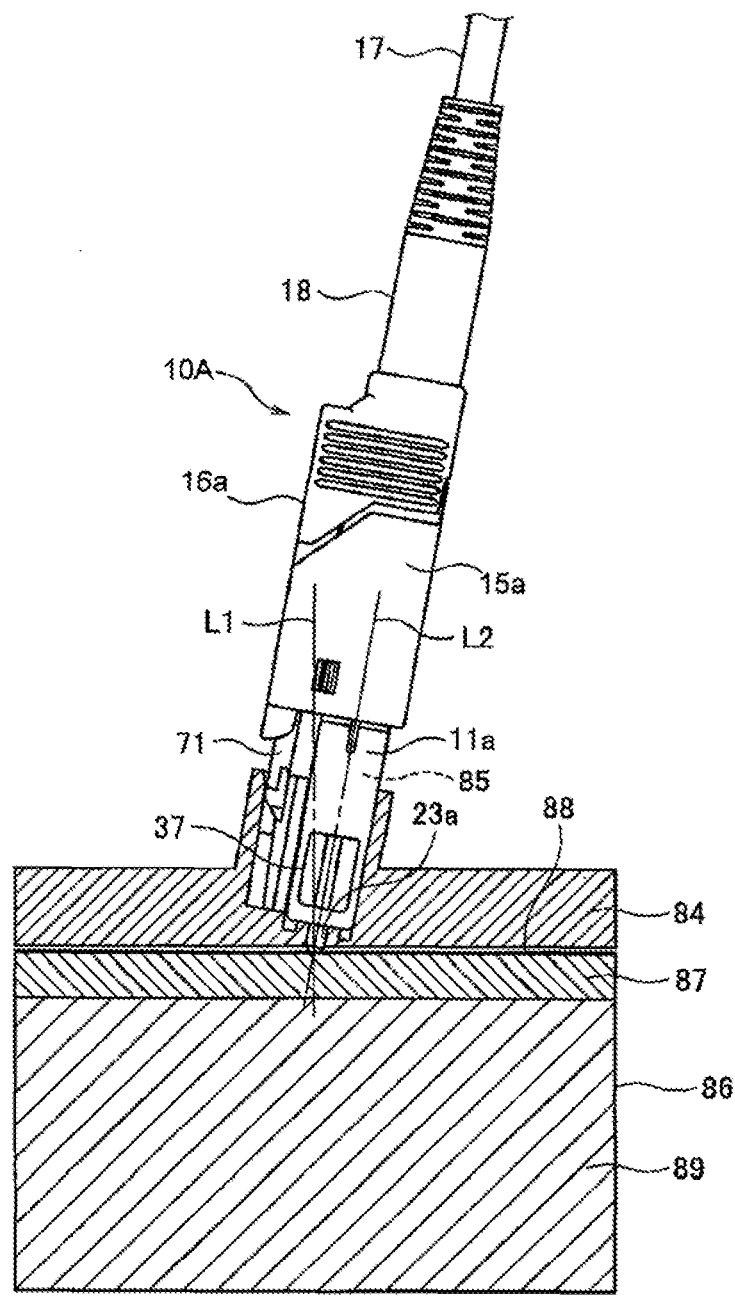
FIG. 55 is a cross-sectional view cut along an arrow XIV-XIV in FIG. 53.

FIG. 53 is a top view of the optical connector plugs 10A, 10B in a state of being installed on the optical fiber ferrule polishing holder 84. FIG. 54 is a side view of the optical connector plugs 10A, 10B in a state of being installed on the optical fiber ferrule polishing holder 84. FIG. 55 is a cross-sectional view cut along an arrow XIV-XIV in FIG. 53. In FIGS. 53 to 55, an optical fiber ferrule polishing device 86 is partly shown. In FIG. 55, only the optical fiber ferrule polishing holder 84 and the optical fiber ferrule polishing device 86 are shown by the cross section.

In a state that the first and second optical connector assemblies 11a, 11b or the first and second optical connector assemblies 11c, 11d are rotated in the clockwise direction by a quarter-rotation (90°), the optical connector plug 10A or the optical connector plug 10B is set on a conventionally known optical fiber ferrule polishing holder 84 as shown in FIGS. 53, 54. Alternatively, the optical connector plug 10A or the optical connector plug 10B is set on the optical fiber ferrule polishing holder 84 in a state that the optical connector plug 10A or the optical connector plug 10B is assembled so that the first and second optical connector assemblies 11a, 11b or the first and second optical connector assemblies 11c, 11d are rotated in the clockwise direction by a quarter-rotation (90°). In the optical connector plug 10A, the first and second optical connector assemblies 11a, 11b are detachably inserted into a fixing recess 85 of the optical fiber ferrule polishing holder 84 and fixed to the fixing recess 85. In the optical connector plug 10B, the first and second optical connector assemblies 11c, 11d are detachably inserted into a fixing recess 85 of the optical fiber ferrule polishing holder 84 and fixed to the fixing recess 85.

When the first and second optical connector assemblies 11a, 11b of the optical connector plug 10A are fixed to the fixing recess 85 of the optical fiber ferrule polishing holder 84 or the first and second optical connector assemblies 11c, 11d of the optical connector plug 10B are fixed to the fixing recess 85 of the optical fiber ferrule polishing holder 84, an axis line L2 of the optical connector plug 10 is inclined by a predetermined angle with respect to a vertical axis L1. Thus, the optical connector plug 10A or the optical connector plug 10B is set on the optical fiber ferrule polishing holder 84 in an inclined state. The figures show a state that one of the optical connector plugs 10A, 10B is set on the optical fiber ferrule polishing holder 84. However, actually, a plurality of fixing recesses 85 is annularly arranged on the optical fiber ferrule polishing holder 84, the optical connector plugs 10A, 10B are fixed to the fixing recesses 85, and a plurality of optical connector plugs 10A, 10B is simultaneously polished.

After the optical connector plug 10A or the optical connector plug 10B is set on the optical fiber ferrule polishing holder 84, the optical fiber ferrule polishing holder 84 is set on a conventionally known optical fiber ferrule polishing device 86. When the optical fiber ferrule polishing holder 84 is set on the optical fiber ferrule polishing device 86, as shown in FIG. 55, the first capillary 23a of the first ferrule 19a abuts (contacts) on a polishing film 88 attached to a rubber pad 87 of the optical fiber ferrule polishing device 86 in an inclined state, and the second capillary 23b of the second ferrule 19b abuts (contacts) on the polishing film 88 in an inclined state. The tip surface 25 and the chamfered portion 26 of the first and second capillaries 23a, 23b abut on the polishing film 88.

After the optical fiber ferrule polishing holder 84 is set on the optical fiber ferrule polishing device 86, when the optical fiber ferrule polishing device 86 is operated, rotation and revolution motions of a polishing disc 89 of the optical fiber ferrule polishing device 86 are started, the tip surface 25 and the chamfered portion 26 of the first and second capillaries 23a, 23b are polished by angled polishing by the polishing film 88 attached to the rubber pad 87.

Figure 56:
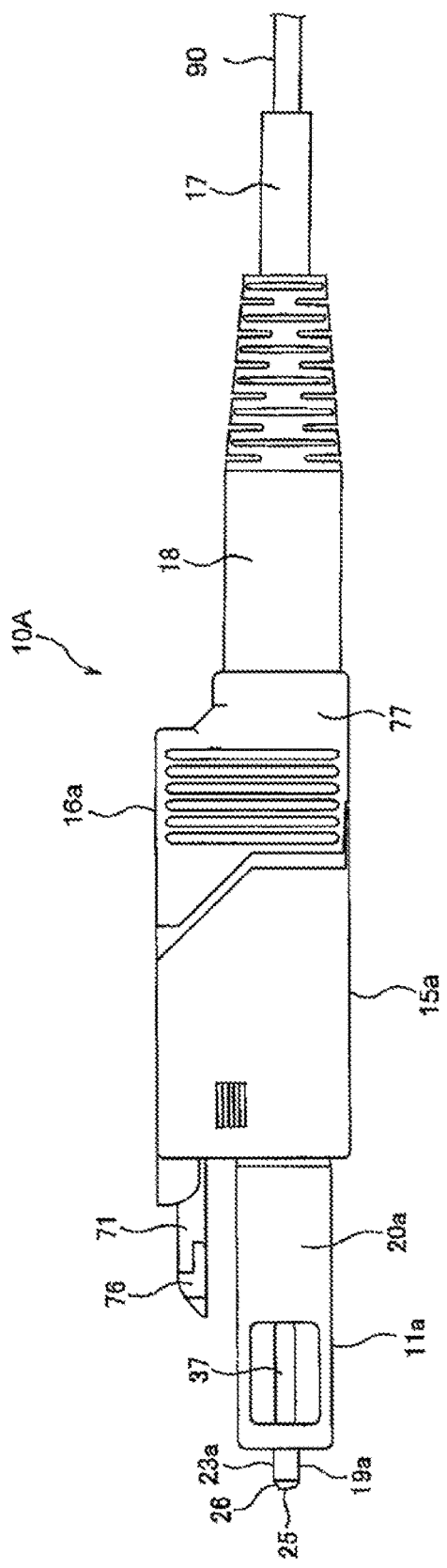
FIG. 56 is a side view of the optical connector plug in a state that after first and second capillaries are polished.
Figure 57:
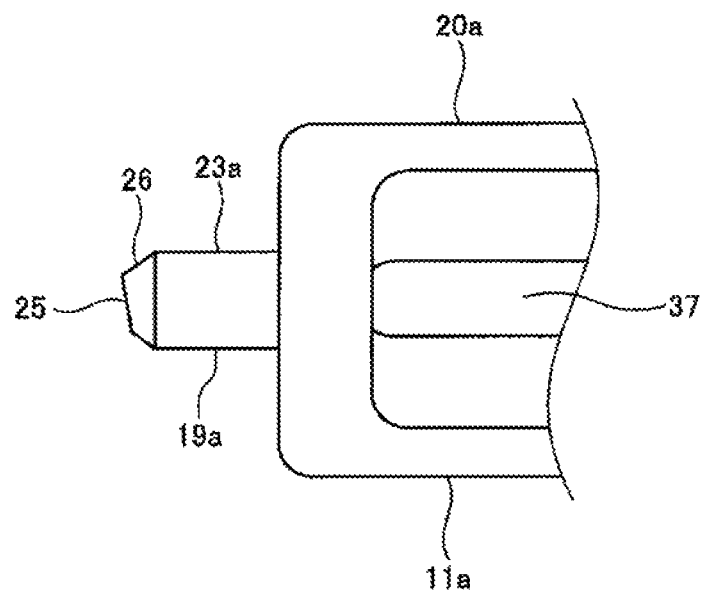
FIG. 57 is a partially enlarged view of the first ferrule shown in the side view of FIG. 56.

FIG. 56 is a side view of the optical connector plugs 10A, 10B in a state that after the first and second capillaries 23a, 23b are polished. FIG. 57 is a partially enlarged view of the first ferrule 19a shown in the side view of FIG. 56. After the tip surface 25 and the chamfered portion 26 of the first and second capillaries 23a, 23b are polished by the optical fiber ferrule polishing device 86, the first and second optical connector assemblies 11a, 11b of the optical connector plug 10A or the first and second optical connector assemblies 11c, 11d of the optical connector plug 10B are pulled out from the fixing recess 85 of the optical fiber ferrule polishing holder 84, and the optical connector plug 10A or the optical connector plug 10B is removed from the optical fiber ferrule polishing holder 84.

The angled polished tip surface 25 and chamfered portion 26 of the first capillary 23a are, as shown in FIGS. 56, 57, inclined from the top wall 33 of the first plug frame 20a or the first plug frame 20c toward the bottom wall 34 so as to gradually approach the bottom wall 34. The angled polished tip surface 25 and chamfered portion 26 of the second capillary 23b are inclined from the top wall 33 of the second plug frame 20b or the second plug frame 20d to the bottom wall 34 so as to gradually approach the bottom wall 34.

Figure 58:
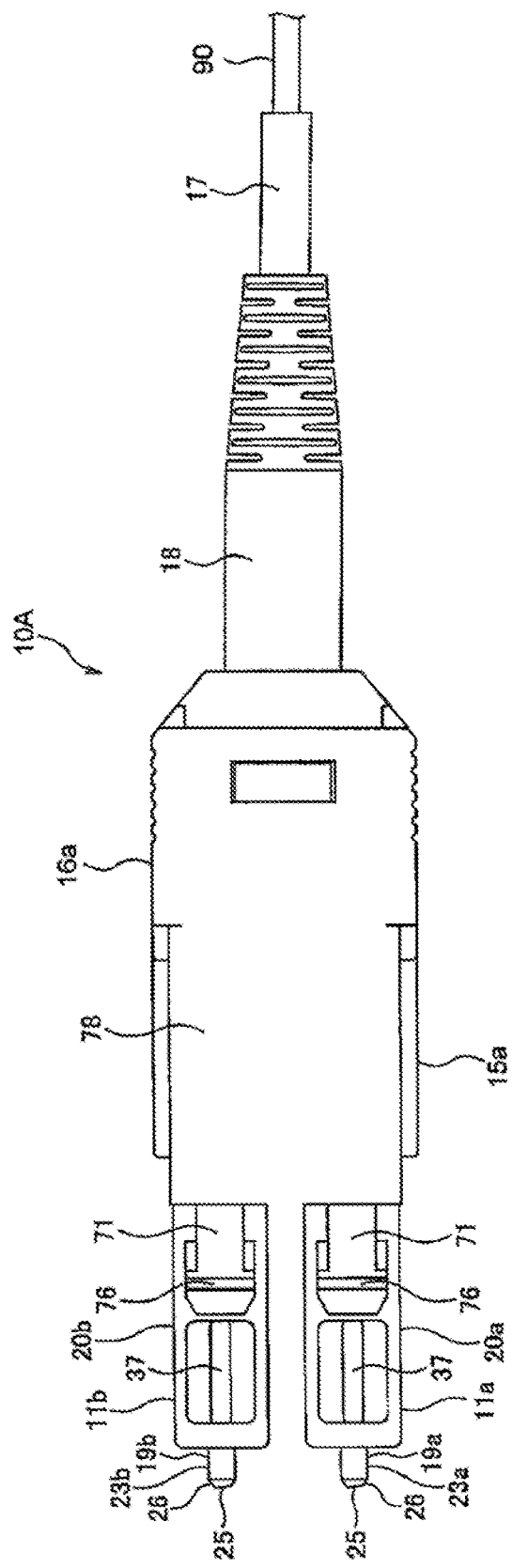
FIG. 58 is a top view of the optical connector plug in a state that after first and second capillaries are polished.
Figure 59:
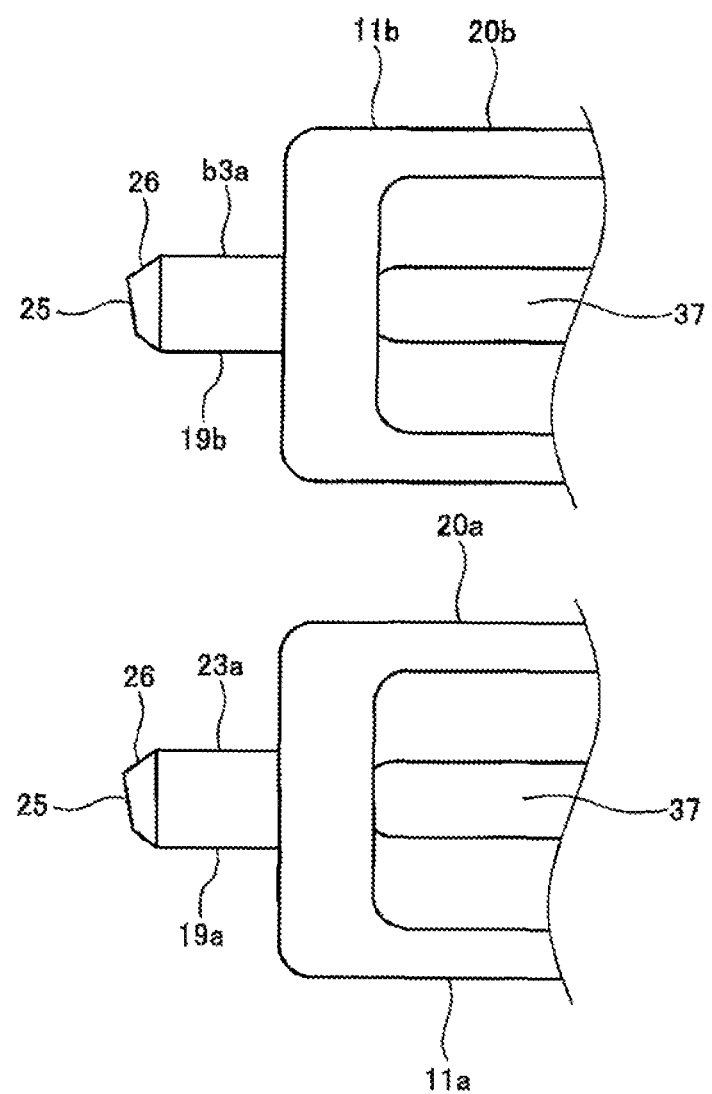
FIG. 59 is a partially enlarged view of the first and second ferrules shown in the top view of FIG. 58.

FIG. 58 is a top view of the optical connector plug 10A or the optical connector plug 10B in a state that after the first and second capillaries 23a, 23b are polished. FIG. 59 is a partially enlarged view of the first and second ferrules 19a, 19b shown in the top view of FIG. 58. After the first and second capillaries 23a, 23b are polished, for example, the second optical connector assembly 11b (one of the optical connector assemblies) or the second optical connector assembly 11d (one of the optical connector assemblies) is rotated around its axis in the counterclockwise direction by a quarter-rotation (90°) from the state of FIG. 56. Thereby, the first and second optical connector assemblies 11a, 11b or the first and second optical connector assemblies 11c, 11d are rotated in the counterclockwise direction by a quarter-rotation (90°).

When the second optical connector assembly 11b (one of the optical connector assemblies) or the second optical connector assembly 11d (one of the optical connector assemblies) is rotated around its axis in the counterclockwise direction by a quarter-rotation (90°), the second gear 12b (one of the gears) or the second gear 12d (one of the gears) is rotated in the counterclockwise direction, and the intermediate gear 13 is rotated in the clockwise direction by the rotation of the second gears 12b, 12d. The rotational force (rotation) of the second gears 12b, 12d is transmitted to the first gear 12a (the other of the gears) or the first gear 12c (the other of the gears) by the intermediate gear 13, and the first gear 12a, 12c is rotated around its axis interlockingly with the second gears 12b, 12d in the counterclockwise direction which is the same direction as the second gears 12b, 12d. Thereby, the first optical connector assembly 11a (the other of the optical connector assemblies) or the first optical connector assembly 11c (the other of the optical connector assemblies) is rotated in the counterclockwise direction by a quarter-rotation (90°).

By rotating the first and second optical connector assemblies 11a, 11b in the counterclockwise direction a quarter-rotation (90°) from the state of FIG. 56, the optical connector plug 10A is returned to the state of FIG. 1 and the optical connector plug 10B is returned to the state of the FIG. 27. The angled polished tip surface 25 and chamfered portion 26 of the first capillary 23a are, as shown in FIG. 59, inclined from the side wall 36 (one of the side walls of the first plug frame 20a) to the side wall 35 (the other of the side walls of the first plug frame 20a) so as to gradually approach the side wall 35. The angled polished tip surface 25 and chamfered portion 26 of the second capillary 23b are inclined from the side wall 36 (one of the side walls of the second plug frame 20b) to the side wall 35 (the other of the side walls of the second plug frame 20b) so as to gradually approach the side wall 35. In the optical connector plugs 10A, 10B shown in FIG. 59, the first and second capillaries 23a, 23b are obliquely inclined in the same direction.

In the ferrule polishing method of the first and second ferrules 19a, 19b, when one of the first and second optical connector assemblies 11a, 11b or one of the first and second optical connector assemblies 11c, 11d is rotated around its axis by a quarter-rotation (90°) from the starting point of the rotation, the other of the optical connector assemblies 11a, 11b, 11c, 11d is interlockingly rotated around its axis in the same direction as the one of the optical connector assemblies 11a, 11b, 11c, 11d by a quarter-rotation (90°) from the starting point of the rotation. Thus, the first and second optical connector assemblies 11a, 11b, 11c, 11d can be simultaneously rotated in the same direction by a quarter-rotation (90°) by one rotating operation (one action). Therefore, the first and second ferrules 19a, 19b can be simultaneously polished by angled polishing by polishing the first and second capillaries 23a, 23b using the optical fiber ferrule polishing device 86 in a state that the first and second optical connector assemblies 11a, 11b, 11c, 11d are rotated by a quarter-rotation (90°).

In the ferrule polishing method, labor and time of separately rotating the first and second optical connector assemblies 11a, 11b or the first and second optical connector assemblies 11c, 11d to polish the first and second ferrules 19a, 19b by angled polishing can be saved. Therefore, the first and second ferrules 19a, 19b can be rapidly and efficiently polished by angled polishing.

The invention claimed is:

1. A duplex optical connector plug, comprising:
a first optical connector assembly; and
a second optical connector assembly which is in parallel with the first optical connector assembly, wherein
the first optical connector assembly has:
a first plug frame for housing a first ferrule which holds a first optical fiber and extends in an axial direction;
a first stop ring which is engageably inserted into the first plug frame; and
a first spring which is arranged between the first ferrule and the first stop ring for biasing the first ferrule forward in the axial direction,
the second optical connector assembly has:
a second plug frame for housing a second ferrule which holds a second optical fiber and extends in the axial direction;
a second stop ring which is engageably inserted into the second plug frame; and
a second spring which is arranged between the second ferrule and the second stop ring for biasing the second ferrule forward in the axial direction,
in the duplex optical connector plug, when one of the first and second optical connector assemblies is rotated around the axis of the one of the first and second optical connector assemblies, the other of the first and second optical connector assemblies is interlockingly rotated around the axis of the other of the first and second optical connector assemblies in the same direction as the one of the first and second optical connector assemblies.

2. The duplex optical connector plug according to claim 1, wherein
a first gear extending in the axial direction is formed on the rear end portion of the first stop ring,
a second gear extending in the axial direction is formed on the rear end portion of the second stop ring,
the duplex optical connector plug includes an intermediate gear which is interposed between the first gear and the second gear, extended in the axial direction, and circumscribed to the first and second gears, and
the intermediate gear transmits a rotational force of one of the first and second gears to the other of the first and second gears and rotates the other of the first and second gears in the same direction as the one of the first and second gears.

3. The duplex optical connector plug according to claim 2, wherein
in the duplex optical connector plug, a gear ratio of the first gear, the second gear and the intermediate gear is 1:1:1.

4. The duplex optical connector plug according to claim 3, wherein
the duplex optical connector plug includes a first casing for housing:
the rear end portion of the first stop ring on which the first gear is formed;
the rear end portion of the second stop ring on which the second gear is formed; and
the intermediate gear, and
the first casing has a first gear housing portion for rotatably housing the rear end portion of the first stop ring, a second gear housing portion for rotatably housing the rear end portion of the second stop ring and an intermediate gear housing portion arranged between the first and second gear housing portions for rotatably housing the intermediate gear.

5. The duplex optical connector plug according to claim 4, wherein
the duplex optical connector plug includes a rotating angle regulating unit which regulates a rotating angle of at least one of the first and second optical connector assemblies,
the first casing has a first opening opened at the front end of the first casing for inserting the first stop ring and a second opening opened at the front end of the first casing for inserting the second stop ring,
the rotating angle regulating unit comprises:
a rotation regulating projection formed on at least one of the first and second openings, the rotation regulating projection projecting inward in the radial direction of the first and second openings; and
an abutting projection formed on a peripheral surface of at least one of the first and second stop rings, the abutting projection projecting outward in the radial direction of the peripheral surface,
in the duplex optical connector plug, the rotation of the first and second optical connector assemblies is prevented when the abutting projection abuts on the rotation regulating projection, and
a rotation range from a starting point to a finishing point of the rotation of the first and second optical connector assemblies is a half-rotation when the rotation is regulated by the rotating angle regulating unit.

6. The duplex optical connector plug according to claim 4, wherein
the duplex optical connector plug includes a rotating angle regulating unit which regulates a rotating angle of at least one of the first and second optical connector assemblies,
the rotating angle regulating unit comprises:
an abutting projection formed on at least one of the first and second gears, the abutting projection projecting outward in the radial direction of the first and second gears; and
a rotation regulating projection formed on at least one of the first gear housing portion and the second gear housing portion of the first casing, the rotation regulating projection projecting inward in the radial direction of the first gear housing portion and the second gear housing portion,
in the duplex optical connector plug, the rotation of the first and second optical connector assemblies is prevented when the abutting projection abuts on the rotation regulating projection, and
a rotation range from a starting point to a finishing point of the rotation of the first and second optical connector assemblies is a half-rotation when the rotation is regulated by the rotating angle regulating unit.

7. The duplex optical connector plug according to claim 4, wherein
the duplex optical connector plug includes a second casing for housing the first casing in the axial direction,
the second casing has a front end opening opened at the front end of the second casing and an engagement latch extending in the axial direction from a top wall of the second casing so as to be exposed forward in the axial direction from the front end opening, and
when the first and second optical connector assemblies are inserted into an optical connector adapter, the engagement latch is detachably engaged with the optical connector adapter to maintain the state that the first and second optical connector assemblies are inserted into the optical connector adapter.

8. The duplex optical connector plug according to claim 7, wherein
the second casing can house the first casing in a state that the top wall of the second casing faces to the top wall of the first casing and the bottom wall of the second casing faces to the bottom wall of the first casing or in a state that the top wall of the second casing faces to the bottom wall of the first casing and the bottom wall of the second casing faces to the top wall of the first casing.

9. The duplex optical connector plug according to claim 7, wherein
the slider has a sliding top wall which is slidable on an upper surface of the engagement latch in the axial direction, the sliding top wall having an inclined plane gradually inclined downward from the front end of the slider to rearward in the axial direction, and
in the duplex optical connector plug, when the slider is slid rearward in the axial direction with respect to the second casing, the engagement latch is pushed down by the inclined plane of the sliding top wall.

10. A duplex optical connector plug, comprising:
a first optical connector assembly; and
a second optical connector assembly which is in parallel with the first optical connector assembly, wherein
the first optical connector assembly has:
a first plug frame for housing a first ferrule which holds a first optical fiber and extends in an axial direction;
a first stop ring which is engageably inserted into the first plug frame; and
a first spring which is arranged between the first ferrule and the first stop ring for biasing the first ferrule forward in the axial direction,
the second optical connector assembly has:
a second plug frame for housing a second ferrule which holds a second optical fiber and extends in the axial direction;
a second stop ring which is engageably inserted into the second plug frame; and
a second spring which is arranged between the second ferrule and the second stop ring for biasing the second ferrule forward in the axial direction,
the duplex optical connector plug has gears which transmit a rotational force of one of the first and second optical connector assemblies to the other of the first and second optical connector assemblies, and in the duplex optical connector plug, when one of the first and second optical connector assemblies is rotated around the axis of the one of the first and second optical connector assemblies, the other of the first and second optical connector assemblies is rotated around the axis of the other of the first and second optical connector assemblies by the gears interlockingly with a rotation of the one of the first and second optical connector assemblies.

11. The duplex optical connector plug according to claim 10, wherein
the gears comprise:
a first gear which is formed on the rear end portion of the first stop ring and extended in the axial direction;
a second gear which is formed on the rear end portion of the second stop ring and extended in the axial direction; and
an intermediate gear which is interposed between the first gear and the second gear, extended in the axial direction, and circumscribed to the first and second gears, and
the intermediate gear transmits a rotational force of one of the first and second gears to the other of the first and second gears and rotates the other of the first and second gears in the same direction as the one of the first and second gears.

12. A polarity reversal method for reversing a polarity of a duplex optical connector plug, the duplex optical connector plug comprising:
a first optical connector assembly; and
a second optical connector assembly which is in parallel with the first optical connector assembly, wherein
the first optical connector assembly has:
a first plug frame for housing a first ferrule which holds a first optical fiber and extends in an axial direction;
a first stop ring which is engageably inserted into the first plug frame; and
a first spring which is arranged between the first ferrule and the first stop ring for biasing the first ferrule forward in the axial direction,
the second optical connector assembly has:
a second plug frame for housing a second ferrule which holds a second optical fiber and extends in the axial direction;
a second stop ring which is engageably inserted into the second plug frame; and
a second spring which is arranged between the second ferrule and the second stop ring for biasing the second ferrule forward in the axial direction,
the polarity reversal method comprising the step of rotating one of the first and second optical connector assemblies around the axis of the one of the first and second optical connector assemblies from a starting point to a finishing point of a rotation by a half-rotation, wherein
the other of the first and second optical connector assemblies is rotated around the axis of the other of the first and second optical connector assemblies interlockingly with the rotation of the one of the first and second optical connector assemblies from the starting point to the finishing point of the rotation by a half-rotation in the same direction as the one of the first and second optical connector assemblies, and
the polarity of the duplex optical connector plug is reversed by the rotation of the first and second optical connector assemblies.

13. The polarity reversal method of the duplex optical connector plug according to claim 12, wherein
in the duplex optical connector plug, a first gear extending in the axial direction is formed on the rear end portion of the first stop ring, a second gear extending in the axial direction is formed on the rear end portion of the second stop ring, and an intermediate gear which is interposed between the first gear and the second gear and extended in the axial direction is circumscribed to the first and second gears,
in the polarity reversal method, the first and second optical connector assemblies are rotated from the starting point to the finishing point of the rotation by a half-rotation and the polarity of the duplex optical connector plug is reversed by transmitting a rotational force of the one of the first and second gears to the other of the first and second gears using the intermediate gear to rotate both the first and second gears in the same direction by a half-rotation.

14. A polarity reversal method for reversing a polarity of a duplex optical connector plug, the duplex optical connector plug comprising:
a first optical connector assembly; and
a second optical connector assembly which is in parallel with the first optical connector assembly, wherein
the first optical connector assembly has:
a first plug frame for housing a first ferrule which holds a first optical fiber and extends in an axial direction;
a first stop ring which is engageably inserted into the first plug frame; and
a first spring which is arranged between the first ferrule and the first stop ring for biasing the first ferrule forward in the axial direction,
the second optical connector assembly has:
a second plug frame for housing a second ferrule which holds a second optical fiber and extends in the axial direction;
a second stop ring which is engageably inserted into the second plug frame; and
a second spring which is arranged between the second ferrule and the second stop ring for biasing the second ferrule forward in the axial direction, wherein
the duplex optical connector plug has gears which transmit a rotational force of the one of the first and second optical connector assemblies to the other of the first and second optical connector assemblies, and
the polarity reversal method comprising the step of rotating one of the first and second optical connector assemblies around the axis of the one of the first and second optical connector assemblies from a starting point to a finishing point of a rotation by a half-rotation, wherein
the other of the first and second optical connector assemblies is rotated around the axis of the other of the first and second optical connector assemblies by the gears interlockingly with the rotation of the one of the first and second optical connector assemblies from the starting point to the finishing point of the rotation by a half-rotation in the same direction as the one of the first and second optical connector assemblies, and
the polarity of the duplex optical connector plug is reversed by the rotation of the first and second optical connector assemblies.

15. The polarity reversal method of the duplex optical connector plug according to claim 14, wherein
the gears comprise:

a first gear which is formed on the rear end portion of the first stop ring and extended in the axial direction;
a second gear which is formed on the rear end portion of the second stop ring and extended in the axial direction; and
an intermediate gear which is interposed between the first gear and the second gear, extended in the axial direction, and circumscribed to the first and second gears,
the intermediate gear transmits a rotational force of one of the first and second gears to the other of the first and second gears and rotates the other of the first and second gears in the same direction as the one of the first and second gears, and
in the polarity reversal method, the first and second optical connector assemblies are rotated from the starting point to the finishing point of the rotation by a half-rotation and the polarity of the duplex optical connector plug is reversed by transmitting a rotational force of the one of the first and second gears to the other of the first and second gears using the intermediate gear to rotate both the first and second gears in the same direction by a half-rotation.

16. The polarity reversal method of the duplex optical connector plug according to claim 15, wherein
the duplex optical connector plug includes a first casing having a first gear housing portion for rotatably housing the rear end portion of the first stop ring on which the first gear is formed, a second gear housing portion for rotatably housing the rear end portion of the second stop ring on which the second gear is formed, and an intermediate gear housing portion located between the first and second gear housing portions for rotatably housing the intermediate gear, and
in the polarity reversal method, the first and second optical connector assemblies are rotated from the starting point to the finishing point of the rotation by a half-rotation and the polarity of the duplex optical connector plug is reversed by transmitting the rotational force of the one of the first and second gears housed in the first and second gear housing portions to the other of the first and second gears using the intermediate gear housed in the intermediate gear housing portion to rotate both the first and second gears in the same direction by a half-rotation.

17. The polarity reversal method of the duplex optical connector plug according to claim 16, wherein
the duplex optical connector plug includes a rotating angle regulating unit which regulates a rotating angle of at least one of the first and second optical connector assemblies,
the first casing has a first opening opened at the front end of the first casing for inserting the first stop ring and a second opening opened at the front end of the first casing for inserting the second stop ring,
the rotating angle regulating unit comprises:
a rotation regulating projection formed on at least one of the first and second openings, the rotation regulating projection projecting inward in the radial direction of the first and second openings; and
an abutting projection formed on a peripheral surface of at least one of the first and second stop rings, the abutting projection projecting outward in the radial direction of the peripheral surface,
in the polarity reversal method, the rotation of the first and second optical connector assemblies is prevented and the rotation range of the first and second optical connector assemblies is limited to the half-rotation when the abutting projection abuts on the rotation regulating projection.

18. The polarity reversal method of the duplex optical connector plug according to claim 17, wherein
the second casing can house the first casing in a state that the top wall of the second casing faces to the top wall of the first casing and the bottom wall of the second casing faces to the bottom wall of the first casing or in a state that the top wall of the second casing faces to the bottom wall of the first casing and the bottom wall of the second casing faces to the top wall of the first casing, thus the polarity of the duplex optical connector plug can be reversed.

19. The polarity reversal method of the duplex optical connector plug according to claim 18, wherein
in the polarity reversal method, the first casing is drawn out forward in the axial direction from the second casing and the one of the first and second optical connector assemblies is rotated around the axis of the one of the first and second optical connector assemblies from the starting point to the finishing point of the rotation by a half-rotation, the other of the first and second optical connector assemblies is interlockingly rotated around the axis of the other of the first and second optical connector assemblies from the starting point to the finishing point of the rotation by a half-rotation, and the first casing is housed in the second casing so that the top wall of the second casing faces to the bottom wall of the first casing and the bottom wall of the second casing faces to the top wall of the first casing, thus the polarity of the duplex optical connector plug can be reversed.

20. The polarity reversal method of the duplex optical connector plug according to claim 16, wherein
the duplex optical connector plug includes a rotating angle regulating unit which regulates a rotating angle of at least one of the first and second optical connector assemblies,
the rotating angle regulating unit comprises:
an abutting projection formed on a peripheral surface of at least one of the first gear and the second gear, the abutting projection projecting outward in the radial direction of the first and second gears; and
a rotation regulating projection formed on at least one of the first gear housing portion and the second gear housing portion of the first casing, the rotation regulating projection projecting inward in the radial direction of the first gear housing portion and the second gear housing portion,
in the polarity reversal method, the rotation of the first and second optical connector assemblies is prevented and the rotation range of the first and second optical connector assemblies is limited to the half-rotation when the abutting projection abuts on the rotation regulating projection.

* * * * *